US012032855B2

(12) United States Patent
Mitkar et al.

(10) Patent No.: US 12,032,855 B2
(45) Date of Patent: Jul. 9, 2024

(54) USING AN APPLICATION ORCHESTRATOR COMPUTING ENVIRONMENT FOR AUTOMATICALLY SCALED DEPLOYMENT OF DATA PROTECTION RESOURCES NEEDED FOR DATA IN A PRODUCTION CLUSTER DISTINCT FROM THE APPLICATION ORCHESTRATOR OR IN ANOTHER APPLICATION ORCHESTRATOR COMPUTING ENVIRONMENT

(71) Applicant: Commvault Systems, Inc., Tinton Falls, NJ (US)

(72) Inventors: Amit Mitkar, Manalapan, NJ (US); Sanjay Kumar, Morganville, NJ (US); Manas Bhikchand Mutha, Tinton Falls, NJ (US); Sumedh Pramod Degaonkar, Sammamish, WA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 17/745,731

(22) Filed: May 16, 2022

(65) Prior Publication Data
US 2023/0043336 A1 Feb. 9, 2023

Related U.S. Application Data

(60) Provisional application No. 63/276,207, filed on Nov. 5, 2021, provisional application No. 63/230,613, filed on Aug. 6, 2021.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/067* (2013.01)

(58) Field of Classification Search
None
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

U.S. Appl. No. 17/881,457, filed Aug. 4, 2022, Mitkar et al.

(Continued)

*Primary Examiner* — Daniel D Tsui
(74) *Attorney, Agent, or Firm* — Commvault Systems, Inc.

(57) ABSTRACT

Data protection resources are automatically scaled to the needs of data source(s) in an application orchestrator computing environment, such as a cluster in a Kubernetes deployment. The approach is adaptable to data sources in production clusters or application suites that are not application orchestrator deployments, such as a cloud-based database-as-a-service (DBaaS). A data storage management system protects cluster-based data with an elastic number of data protection resources (e.g., data agents, media agents), which are deployed on demand. The number of data protection resources deployed for a particular job are appropriate to the workload(s) at present and depend on a variety of scaling factors. In some embodiments, data protection resources are deployed within the same cluster as the data sources. In other embodiments, a separate infrastructure cluster provides the data protection resources on demand, (Continued)

and connects to any number and types of data sources, whether cloud-based or otherwise, without limitation.

20 Claims, 33 Drawing Sheets

(56) References Cited

U.S. PATENT DOCUMENTS

| | | | |
|---|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,123,107 A | 6/1992 | Mensch, Jr. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,638,509 A | 6/1997 | Dunphy et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,436 B2 | 12/2003 | Oshinsky et al. |
| 6,658,526 B2 | 12/2003 | Nguyen et al. |
| 6,721,767 B2 | 4/2004 | DeMeno et al. |
| 6,760,723 B2 | 7/2004 | Oshinsky et al. |
| 6,941,429 B1 | 9/2005 | Kamvyssells et al. |
| 6,959,327 B1 | 10/2005 | Vogl |
| 6,973,555 B2 | 12/2005 | Fujiwara |
| 7,000,238 B2 | 2/2006 | Nadler |
| 7,003,641 B2 | 2/2006 | Prahlad |
| 7,035,880 B1 | 4/2006 | Crescenti |
| 7,079,341 B2 | 7/2006 | Kistler et al. |
| 7,096,418 B1 | 8/2006 | Singhal |
| 7,107,298 B2 | 9/2006 | Prahlad |
| 7,130,272 B1 | 10/2006 | Gai et al. |
| 7,130,970 B2 | 10/2006 | Devassy |
| 7,143,203 B1 | 11/2006 | Altmejd |
| 7,162,496 B2 | 1/2007 | Amarendran et al. |
| 7,174,433 B2 | 2/2007 | Kottomtharayil et al. |
| 7,225,220 B2 | 5/2007 | Gonzalez et al. |
| 7,246,207 B2 | 7/2007 | Kottomtharayil |
| 7,260,633 B2 | 8/2007 | Lette |
| 7,315,923 B2 | 1/2008 | Retnamma et al. |
| 7,334,144 B1 | 2/2008 | Schlumberger |
| 7,340,616 B2 | 3/2008 | Rothman et al. |
| 7,343,356 B2 | 3/2008 | Prahlad |
| 7,343,453 B2 | 3/2008 | Prahlad |
| 7,346,751 B2 | 3/2008 | Prahlad |
| 7,366,846 B2 | 4/2008 | Boyd et al. |
| 7,386,744 B2 | 6/2008 | Barr |
| 7,389,311 B1 | 6/2008 | Crescenti et al. |
| 7,395,282 B1 | 7/2008 | Crescenti |
| 7,440,982 B2 | 10/2008 | Lu |
| 7,448,079 B2 | 11/2008 | Tremain |
| 7,454,569 B2 | 11/2008 | Kavuri |
| 7,472,079 B2 | 12/2008 | Fellenstein |
| 7,483,895 B2 | 1/2009 | Hysom |
| 7,490,207 B2 | 2/2009 | Amarendran et al. |
| 7,500,053 B1 | 3/2009 | Kavuri |
| 7,502,820 B2 | 3/2009 | Manders |
| 7,516,346 B2 | 4/2009 | Pinheiro et al. |
| 7,516,348 B1 | 4/2009 | Ofer |
| 7,526,798 B2 | 4/2009 | Chao |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,546,475 B2 | 6/2009 | Mayo et al. |
| 7,584,227 B2 | 9/2009 | Gokhale et al. |
| 7,587,570 B2 | 9/2009 | Sarkar et al. |
| 7,603,386 B2 | 10/2009 | Amarendran et al. |
| 7,606,844 B2 | 10/2009 | Kottomtharavil |
| 7,613,752 B2 | 11/2009 | Prahlad |
| 7,617,191 B2 | 11/2009 | Wilbrink et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil |
| 7,627,827 B2 | 12/2009 | Taylor et al. |
| 7,631,351 B2 | 12/2009 | Erofeev |

(56) References Cited

U.S. PATENT DOCUMENTS

| | | |
|---|---|---|
| 7,636,743 B2 | 12/2009 | Erofeev |
| 7,651,593 B2 | 1/2010 | Prahlad |
| 7,653,668 B1 | 1/2010 | Shelat |
| 7,657,550 B2 | 2/2010 | Prahlad |
| 7,660,807 B2 | 2/2010 | Prahlad |
| 7,661,028 B2 | 2/2010 | Erofeev |
| 7,668,884 B2 | 2/2010 | Prahlad |
| 7,685,269 B1 | 3/2010 | Thrasher et al. |
| 7,694,070 B2 | 4/2010 | Mogi |
| 7,734,669 B2 | 6/2010 | Kottomtharayil et al. |
| 7,739,548 B2 | 6/2010 | Goodrum et al. |
| 7,747,579 B2 | 6/2010 | Prahlad et al. |
| 7,761,736 B2 | 7/2010 | Nguyen et al. |
| 7,765,167 B2 | 7/2010 | Prahlad |
| 7,769,616 B2 | 8/2010 | Ollivier |
| 7,778,984 B2 | 8/2010 | Zhang |
| 7,792,789 B2 | 9/2010 | Prahlad |
| 7,797,453 B2 | 9/2010 | Meier et al. |
| 7,801,864 B2 | 9/2010 | Prahlad |
| 7,809,914 B2 | 10/2010 | Kottomtharayil |
| 7,814,149 B1 | 10/2010 | Stringham |
| 7,814,351 B2 | 10/2010 | Redlich et al. |
| 7,818,082 B2 | 10/2010 | Roumeliotis et al. |
| 7,822,967 B2 | 10/2010 | Fung |
| 7,840,537 B2 | 11/2010 | Gokhale |
| 7,882,077 B2 | 2/2011 | Gokhale |
| 7,899,788 B2 | 3/2011 | Chadhok et al. |
| 7,917,438 B2 | 3/2011 | Kenedy et al. |
| 7,975,061 B1 | 7/2011 | Gokhale et al. |
| 7,996,270 B2 | 8/2011 | Sundaresan |
| 8,001,277 B2 | 8/2011 | Mega |
| 8,037,028 B2 | 10/2011 | Prahlad |
| 8,065,166 B2 | 11/2011 | Maresh |
| 8,108,427 B2 | 1/2012 | Prahlad |
| 8,112,605 B2 | 2/2012 | Kavuri |
| 8,134,727 B1 | 3/2012 | Shmunis |
| 8,140,786 B2 | 3/2012 | Bunte |
| 8,156,086 B2 | 4/2012 | Lu et al. |
| 8,170,995 B2 | 5/2012 | Prahlad et al. |
| 8,219,524 B2 | 7/2012 | Gokhale |
| 8,229,954 B2 | 7/2012 | Kottomtharayil |
| 8,230,195 B2 | 7/2012 | Amarendran et al. |
| 8,266,406 B2 | 9/2012 | Kavuri |
| 8,285,681 B2 | 10/2012 | Prahlad |
| 8,296,534 B1 | 10/2012 | Gupta et al. |
| 8,307,177 B2 | 11/2012 | Prahlad |
| 8,316,091 B2 | 11/2012 | Hirvela et al. |
| 8,321,688 B2 | 11/2012 | Auradkar |
| 8,352,608 B1 | 1/2013 | Keagy et al. |
| 8,364,652 B2 | 1/2013 | Vijayan et al. |
| 8,364,802 B1 | 1/2013 | Keagy et al. |
| 8,370,307 B2 | 2/2013 | Wolfe |
| 8,370,542 B2 | 2/2013 | Lu et al. |
| 8,396,838 B2 | 3/2013 | Brockway et al. |
| 8,407,190 B2 | 3/2013 | Prahlad |
| 8,417,697 B2 | 4/2013 | Ghemawat et al. |
| 8,429,630 B2 | 4/2013 | Nickolov |
| 8,434,131 B2 | 4/2013 | Varadharajan et al. |
| 8,510,573 B2 | 8/2013 | Muller |
| 8,527,549 B2 | 9/2013 | Cidon |
| 8,566,362 B2 | 10/2013 | Mason et al. |
| 8,578,120 B2 | 11/2013 | Attarde et al. |
| 8,612,439 B2 | 12/2013 | Prahlad |
| 8,626,741 B2 | 1/2014 | Vijakumar et al. |
| 8,635,184 B2 | 1/2014 | Hsu et al. |
| 8,660,038 B1 | 2/2014 | Pascazio |
| 8,674,823 B1 | 3/2014 | Contrario et al. |
| 8,683,103 B2 | 3/2014 | Ripberger |
| 8,706,867 B2 | 4/2014 | Vijayan |
| 8,707,070 B2 | 4/2014 | Muller |
| 8,769,048 B2 | 7/2014 | Kottomtharayil |
| 8,780,400 B2 | 7/2014 | Shmunis |
| 8,799,242 B2 | 8/2014 | Leonard et al. |
| 8,849,761 B2 | 9/2014 | Prahlad |
| 8,849,955 B2 | 9/2014 | Prahlad |
| 8,924,511 B2 | 12/2014 | Brand |
| 8,950,009 B2 | 2/2015 | Vijayan et al. |
| 8,954,446 B2 | 2/2015 | Vijayan et al. |
| 9,020,900 B2 | 4/2015 | Vijayan et al. |
| 9,021,282 B2 | 4/2015 | Muller et al. |
| 9,021,307 B1 | 4/2015 | Parameswaran et al. |
| 9,098,495 B2 | 8/2015 | Gokhale |
| 9,116,633 B2 | 8/2015 | Sancheti |
| 9,189,170 B2 | 11/2015 | Kripalani et al. |
| 9,195,636 B2 | 11/2015 | Smith |
| 9,239,687 B2 | 1/2016 | Vijayan et al. |
| 9,262,496 B2 | 2/2016 | Kumarasamy et al. |
| 9,286,110 B2 | 3/2016 | Mitkar |
| 9,311,121 B2 | 4/2016 | Deshpande et al. |
| 9,378,035 B2 | 6/2016 | Kripalani |
| 9,411,534 B2 | 8/2016 | Lakshman |
| 9,424,151 B2 | 8/2016 | Lakshman |
| 9,454,537 B2 | 9/2016 | Prahlad et al. |
| 9,461,881 B2 | 10/2016 | Kumarasamy |
| 9,495,404 B2 | 11/2016 | Kumarasamy et al. |
| 9,575,673 B2 | 2/2017 | Mitkar |
| 9,633,033 B2 | 4/2017 | Vijayan et al. |
| 9,639,274 B2 | 5/2017 | Maranna |
| 9,641,388 B2 | 5/2017 | Kripalani |
| 9,710,465 B2 | 7/2017 | Dornemann et al. |
| 9,798,489 B2 | 10/2017 | Lakshman |
| 9,875,063 B2 | 1/2018 | Lakshman |
| 9,959,333 B2 | 5/2018 | Kumarasamy |
| 9,977,687 B2 | 5/2018 | Kottomtharayil et al. |
| 9,983,936 B2 | 5/2018 | Dornemann et al. |
| 10,067,722 B2 | 9/2018 | Lakshman |
| 10,084,873 B2 | 9/2018 | Dornemann |
| 10,162,528 B2 | 12/2018 | Sancheti |
| 10,210,048 B2 | 2/2019 | Sancheti |
| 10,228,962 B2 | 3/2019 | Dornemann et al. |
| 10,248,174 B2 | 4/2019 | Lakshman et al. |
| 10,248,657 B2 | 4/2019 | Prahlad et al. |
| 10,264,074 B2 | 4/2019 | Vijayan et al. |
| 10,296,368 B2 | 5/2019 | Dormemann et al. |
| 10,310,953 B2 | 6/2019 | Vijayan et al. |
| 10,346,259 B2 | 7/2019 | Gokhale et al. |
| 10,379,598 B2 | 8/2019 | Muller |
| 10,387,266 B2 | 8/2019 | Kumarasamy et al. |
| 10,601,837 B1 | 3/2020 | Sharma |
| 10,613,939 B2 | 4/2020 | Mitkar et al. |
| 10,684,924 B2 | 6/2020 | Kilaru et al. |
| 11,218,450 B2 | 1/2022 | Polimera et al. |
| 11,321,188 B2 | 5/2022 | Mitkar et al. |
| 11,477,165 B1 | 10/2022 | McDowall |
| 11,822,949 B2 | 11/2023 | Shepherd |
| 2002/0035511 A1 | 3/2002 | Haji |
| 2002/0083079 A1 | 6/2002 | Meier et al. |
| 2002/0095609 A1 | 7/2002 | Tokunaga |
| 2002/0129047 A1 | 9/2002 | Cane |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg |
| 2004/0210724 A1 | 10/2004 | Koning et al. |
| 2005/0076251 A1 | 4/2005 | Barr |
| 2005/0268121 A1 | 12/2005 | Rothman et al. |
| 2005/0289414 A1 | 12/2005 | Adya |
| 2006/0058994 A1 | 3/2006 | Ravi |
| 2006/0101174 A1 | 5/2006 | Kanamaru |
| 2006/0190775 A1 | 8/2006 | Aggarwal et al. |
| 2006/0206507 A1 | 9/2006 | Dahbour |
| 2006/0224846 A1 | 10/2006 | Amarendran |
| 2006/0236073 A1 | 10/2006 | Soules |
| 2006/0242356 A1 | 10/2006 | Mogi et al. |
| 2006/0245411 A1 | 11/2006 | Chen et al. |
| 2006/0251067 A1 | 11/2006 | Desanti |
| 2007/0073970 A1 | 3/2007 | Yamazaki |
| 2007/0079156 A1 | 4/2007 | Fujimoto |
| 2007/0101173 A1 | 5/2007 | Fung |
| 2007/0168606 A1 | 7/2007 | Takai |
| 2007/0234302 A1 | 10/2007 | Suzuki |
| 2008/0005168 A1 | 1/2008 | Huff et al. |
| 2008/0010521 A1 | 1/2008 | Goodrum et al. |

(56) References Cited

U.S. PATENT DOCUMENTS

| | | |
|---|---|---|
| 2008/0147460 A1 | 6/2008 | Ollivier |
| 2008/0162592 A1 | 7/2008 | Huang |
| 2008/0183891 A1 | 7/2008 | Ni |
| 2008/0228771 A1 | 9/2008 | Prahlad |
| 2008/0244032 A1 | 10/2008 | Gilson |
| 2008/0244177 A1 | 10/2008 | Crescenti |
| 2008/0256384 A1 | 10/2008 | Branson et al. |
| 2008/0270461 A1 | 10/2008 | Gordon |
| 2008/0301479 A1 | 12/2008 | Wood |
| 2009/0077443 A1 | 3/2009 | Nguyen et al. |
| 2009/0198677 A1 | 8/2009 | Sheehy |
| 2009/0198825 A1 | 8/2009 | Miller |
| 2009/0210464 A1 | 8/2009 | Chiang-Lin |
| 2009/0268903 A1 | 10/2009 | Bojinov et al. |
| 2009/0282020 A1 | 11/2009 | McSheffrey |
| 2009/0287665 A1 | 11/2009 | Prahlad |
| 2009/0319534 A1 | 12/2009 | Gokhale |
| 2009/0327477 A1 | 12/2009 | Madison, Jr. |
| 2010/0023722 A1 | 1/2010 | Tabbara |
| 2010/0064033 A1 | 3/2010 | Travostino |
| 2010/0070448 A1 | 3/2010 | Omoigui |
| 2010/0070466 A1 | 3/2010 | Prahlad |
| 2010/0070474 A1 | 3/2010 | Lad |
| 2010/0070725 A1 | 3/2010 | Prahlad |
| 2010/0082672 A1 | 4/2010 | Kottomtharayil |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0190478 A1 | 7/2010 | Brewer |
| 2010/0235333 A1 | 9/2010 | Bates |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0332401 A1 | 12/2010 | Prahlad |
| 2010/0333116 A1 | 12/2010 | Prahlad |
| 2011/0010518 A1 | 1/2011 | Kavuri et al. |
| 2011/0022642 A1 | 1/2011 | DeMilo et al. |
| 2011/0040824 A1 | 2/2011 | Harm |
| 2011/0055161 A1 | 3/2011 | Wolfe |
| 2011/0191544 A1 | 8/2011 | Naga et al. |
| 2011/0276713 A1 | 11/2011 | Brand |
| 2011/0277027 A1 | 11/2011 | Hayton et al. |
| 2012/0054626 A1 | 3/2012 | Odenheimer |
| 2012/0084262 A1 | 4/2012 | Dwarampudi et al. |
| 2012/0110186 A1 | 5/2012 | Kapur et al. |
| 2012/0131645 A1 | 5/2012 | Harm |
| 2012/0150818 A1 | 6/2012 | Retnamma et al. |
| 2012/0240183 A1 | 9/2012 | Sinha |
| 2012/0304277 A1 | 11/2012 | Li et al. |
| 2013/0007245 A1 | 1/2013 | Malik et al. |
| 2013/0035795 A1 | 2/2013 | Pfeiffer et al. |
| 2013/0125198 A1 | 5/2013 | Ferguson et al. |
| 2013/0238572 A1 | 9/2013 | Prahlad et al. |
| 2013/0238969 A1 | 9/2013 | Smith |
| 2013/0262385 A1 | 10/2013 | Vibhor et al. |
| 2013/0297902 A1 | 11/2013 | Collins et al. |
| 2013/0326279 A1 | 12/2013 | Chavda et al. |
| 2014/0189432 A1 | 7/2014 | Gokhale et al. |
| 2014/0196038 A1 | 7/2014 | Kottomtharavil et al. |
| 2014/0201140 A1 | 7/2014 | Vibhor |
| 2014/0201157 A1 | 7/2014 | Pawar et al. |
| 2014/0283010 A1 | 9/2014 | Rutkowski et al. |
| 2014/0380014 A1 | 12/2014 | Moyer |
| 2015/0074536 A1 | 3/2015 | Varadharajan et al. |
| 2015/0113055 A1 | 4/2015 | Vijayan et al. |
| 2015/0127967 A1 | 5/2015 | Dutton |
| 2015/0154039 A1 | 6/2015 | Zada et al. |
| 2015/0198995 A1 | 7/2015 | Muller et al. |
| 2015/0378763 A1 | 12/2015 | Hassine et al. |
| 2016/0100013 A1 | 4/2016 | Vijayan et al. |
| 2016/0142485 A1 | 5/2016 | Mitkar et al. |
| 2016/0350391 A1 | 12/2016 | Vijayan et al. |
| 2016/0352588 A1 | 12/2016 | Subbarayan et al. |
| 2017/0039218 A1 | 2/2017 | Prahlad |
| 2017/0126807 A1 | 5/2017 | Vijayan et al. |
| 2017/0168903 A1 | 6/2017 | Dornemann et al. |
| 2017/0185488 A1 | 6/2017 | Kumarasamy et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0115525 A1 | 4/2018 | Chou et al. |
| 2018/0137139 A1 | 5/2018 | Bangalore et al. |
| 2018/0253361 A1 | 9/2018 | Dhatrak |
| 2018/0276085 A1 | 9/2018 | Mitkar et al. |
| 2018/0285202 A1 | 10/2018 | Bhagi et al. |
| 2018/0285205 A1 | 10/2018 | Mehta et al. |
| 2018/0285383 A1 | 10/2018 | Nara |
| 2018/0359255 A1 | 12/2018 | Stair et al. |
| 2018/0373597 A1 | 12/2018 | Rana |
| 2018/0375938 A1 | 12/2018 | Vijayan et al. |
| 2019/0095253 A1 | 3/2019 | Curtis |
| 2019/0179805 A1 | 6/2019 | Prahlad et al. |
| 2019/0182325 A1 | 6/2019 | Vijayan et al. |
| 2019/0278662 A1 | 9/2019 | Nagrale et al. |
| 2019/0303246 A1 | 10/2019 | Gokhale et al. |
| 2020/0034240 A1 | 1/2020 | Natanzon et al. |
| 2020/0034248 A1 | 1/2020 | Nara |
| 2020/0073574 A1 | 3/2020 | Pradhan |
| 2020/0233845 A1 | 7/2020 | Dornemann et al. |
| 2020/0319694 A1 | 10/2020 | Mohanty et al. |
| 2020/0319978 A1 | 10/2020 | Smith-Uchida et al. |
| 2020/0351347 A1 | 11/2020 | Chang et al. |
| 2021/0011811 A1 | 1/2021 | Balcha |
| 2021/0011812 A1 | 1/2021 | Mitkar et al. |
| 2021/0011816 A1 | 1/2021 | Mitkar et al. |
| 2021/0075768 A1 | 3/2021 | Polimera et al. |
| 2021/0089359 A1 | 3/2021 | Culp |
| 2021/0103499 A1 | 4/2021 | Alluboyina et al. |
| 2021/0271565 A1 | 9/2021 | Bhavanarushi et al. |
| 2021/0311758 A1 | 10/2021 | Cao |
| 2021/0311760 A1 | 10/2021 | Oki |
| 2021/0311762 A1 | 10/2021 | Shepherd |
| 2021/0311763 A1 | 10/2021 | Beard |
| 2021/0311764 A1 | 10/2021 | Rosoff |
| 2021/0311792 A1 | 10/2021 | Rosoff |
| 2021/0314310 A1 | 10/2021 | Cao |
| 2022/0004417 A1 | 1/2022 | Sinha |
| 2022/0035662 A1 | 2/2022 | Wiggers |
| 2022/0107846 A1 | 4/2022 | Culp |
| 2022/0200965 A1 | 6/2022 | Polimera et al. |
| 2022/0415199 A1 | 12/2022 | Venkatasubramanyam |
| 2023/0071714 A1 | 3/2023 | Feng |
| 2023/0115438 A1 | 4/2023 | Ethan |
| 2023/0142346 A1 | 5/2023 | Menezes |
| 2023/0214305 A1 | 7/2023 | Hockey |
| 2023/0281082 A1 | 9/2023 | Hoang |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 817040 | 1/1998 |
| EP | 0899662 | 3/1999 |
| EP | 0981090 | 2/2000 |
| WO | WO 95/13580 | 5/1995 |
| WO | WO 99/12098 | 3/1999 |
| WO | 2006052872 | 11/2005 |

OTHER PUBLICATIONS

Enabling Kubernetes etcd Key Value Store Backups, retrieved Jun. 17, 2022, in 3 pages. (https://documentation.commvault.com/2022e/essential/148980_enabling_kubernetes_etcd_key_value_store_backups.html).

Restoring a Kubernetes etcd Snapshot to a File System, retrieved Jun. 17, 2022, in 2 pages. (https://documentation.commvault.com/2022e/essential/148992_restoring_kubernetes_etcd_snapshot_to_file_system.html).

(56) References Cited

OTHER PUBLICATIONS

Backing Up etcd On Demand for Kubernetes, retrieved Jun. 17, 2022, in 2 pages. (https://documentation.commvault.com/2022e/essential/148983_backing_up_etcd_on_demand_for_kubernetes.html).
Configuration for Kubernetes etcd SSL Certificates, retrieved Jun. 17, 2022, in 3 pages. (https://documentation.commvault.com/2022e/essential/150065_configuration_for_kubernetes_etcd_ssl_certificates.html).
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Bates, S. et al., "Sharepoint 2007 User's Guide," pp. 1-88, 2007, Springer-Verlag New York, Inc., 104 pages.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chiappetta, Marco, "ESA Enthusiast System Architecture," <http://hothardware.com/Articles/NVIDIA_ESA_Enthusiast_System_Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," IEEE, Jun. 12-16, 1994, pp. 124-126.
Gait, J., "The Optical File Cabinet: A Random-Access File System For Write-Once Optical Disks," IEEE Computer, vol. 21, No. 6, pp. 11-22 (Jun. 1988).
International Search Report and Written Opinion for PCT/US2011/054374, dated May 2, 2012, 9 pages.
Jander, M., "Launching Storage-Area Net," Data Communications, US, McGraw Hill, NY, vol. 27, No. 4 (Mar. 21, 1998), pp. 64-72.
Microsoft Corporation, "How NTFS Works," Windows Server TechCenter, updated Mar. 28, 2003, internet accessed Mar. 26, 2008, 26 pages.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversussplit.html>, internet accessed on Jul. 14, 2008, 2 pages.
Trilio. "TrilioVault 3.2 Documentation." https://doc.trilio.io/openstack/3.2/documentation/sphinx-doc/build/html/, Sections 1, 2, and 4, Mar. 2019 in 73 pages.
Velero. "Documentation." Nov. 2019. https://velero.io/docs/v1.2.0. Sections: "How Velero Works", "Backup Storage Locations and vol. Snapshot Locations", "Restic Integration", "Disaster recovery", "Cluster migration", and "Restore Reference".
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized ISCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wikipedia, "Cloud computing," <http://en.wikipedia.org/wiki/Cloud_computing>, internet accessed Jul. 8, 2009, 13 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.

(56) References Cited

OTHER PUBLICATIONS

Wikipedia, "Logical vol. Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.
Ardagna et al., "Scalability Patterns for Platform-as-a-Service", IEEE Fifth International Conference on Cloud Computing, 2012, pp. 718-725.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.
Huff, KL, "Data Set Usage Sequence Number," IBM Technical Disclosure Bulletin, vol. 24, No. 5, Oct. 1981 New York, US, pp. 2404-2406.
Ohoussou et al., "Autonomous Agent Based Intrusion Detection in Virtual Computing Environment", 2010 IEEE International Conference on Wireless Communications, Networking, and Information Security, 2010, pp. 682-686.

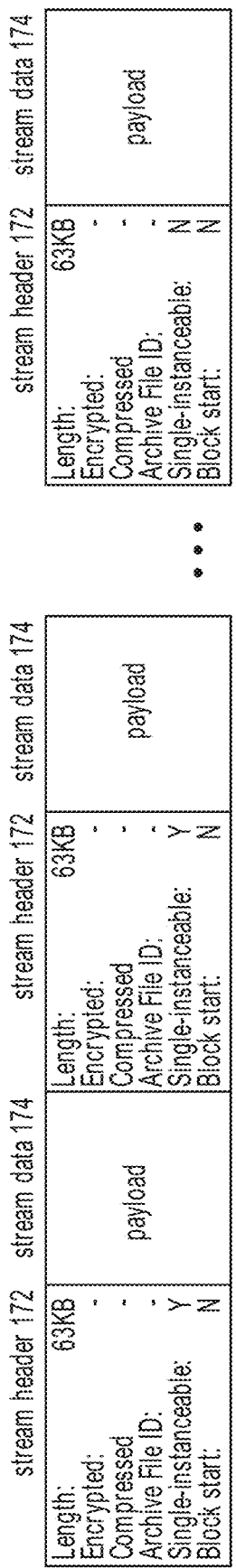
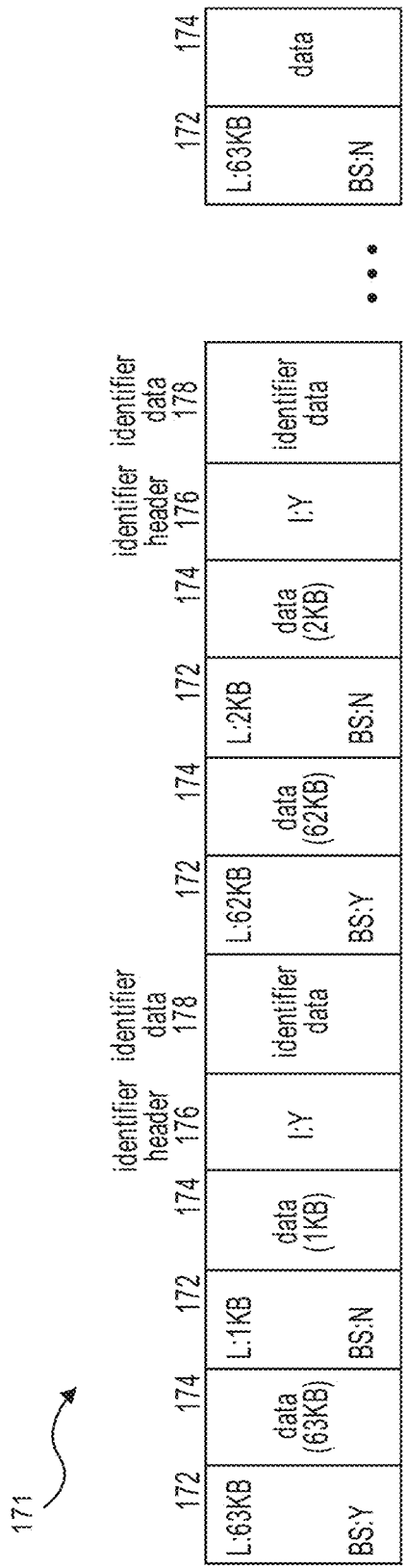
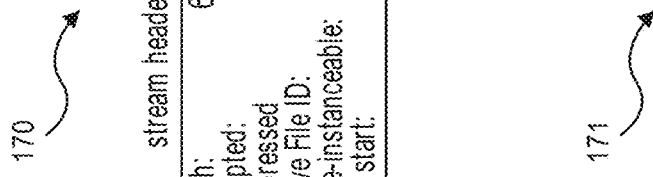

USING AN APPLICATION ORCHESTRATOR COMPUTING ENVIRONMENT FOR AUTOMATICALLY SCALED DEPLOYMENT OF DATA PROTECTION RESOURCES NEEDED FOR DATA IN A PRODUCTION CLUSTER DISTINCT FROM THE APPLICATION ORCHESTRATOR OR IN ANOTHER APPLICATION ORCHESTRATOR COMPUTING ENVIRONMENT

INCORPORATION BY REFERENCE TO ANY PRIORITY APPLICATIONS

This application claims the benefit of priority to U.S. Provisional Patent Application No. 63/230,613 filed on Aug. 6, 2021, and additionally claims the benefit of priority to U.S. Provisional Patent Application No. 63/276,207 filed on Nov. 5, 2021, which are incorporated by reference in their entireties herein. Any and all applications for which a foreign or domestic priority claim is identified in the Application Data Sheet of the present application are hereby incorporated by reference in their entireties under 37 C.F.R. 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a routine schedule. The company may similarly protect computing systems used by its employees, such as those used by an accounting department, marketing department, engineering department, and so forth.

Given the rapidly expanding volume of data under management, companies seek innovative techniques for managing data growth and the expense of protecting their ever-growing amount of data. A streamlined approach is needed for protecting data generated in application orchestrator computing environments, such as Kubernetes clusters, whether the cluster operates in a cloud computing environment or non-cloud.

SUMMARY

The present inventors devised an approach that scales data protection resources to the corresponding needs of data that is present in an application orchestrator computing environment, such as a cluster in a Kubernetes deployment. The disclosed approach is suitable for data sources in cloud, non-cloud, and/or hybrid cloud computing environments, without limitation. The disclosed approach is applicable and adaptable to a variety of data sources, and will protect data that is generated and maintained in production clusters that are not application orchestrator deployments, such as a cloud-based database-as-a-service (DBaaS), a cloud-based office productivity suite like Microsoft Office 365, and/or a non-cloud virtual machine farm such as VMWare VCenter, etc., without limitation.

An illustrative data storage management system, which is responsible for protecting cluster-based data, provides for an elastic number of data agents to be deployed on demand for storage operations such as backup jobs. The number selected for a particular storage operation is appropriate to the workloads operating in the cluster that need to be protected at present. The number is based on a variety of scaling factors that relate to characteristics of the source data, characteristics of cluster resources, a recovery point objective (RPO), available network throughput, expense profiles of the resources being deployed, and/or any combination thereof, without limitation. The illustrative data storage management system also controls certain threshold maxima to prevent deploying an overabundance of resources that might exceed cost budgets and/or service level agreements. The illustrative data storage management system is managed by a storage manager computing device that controls storage operations within the system, maintains storage policies, and communicates with media agents and with data agents deployed in one or more application orchestrator clusters. The storage manager operates outside of, and may interoperate with, multiple different clusters.

In an example Kubernetes deployment, a Kubernetes cluster comprises any number of application(s) that generate data stored within the cluster. A data-generating cluster or a cluster that comprises data to be protected is referred to herein as a "production cluster." Data sources in the production cluster need to be protected by the illustrative data storage management system. Accordingly, the data storage management system initially deploys a containerized data agent as a pod within the cluster. An example data agent, without limitation, is an enhanced Virtual Server Agent (VSA) from Commvault Systems, Inc. of Tinton Falls, NJ The first or initial data agent deployed in the production cluster is designated a "coordinator data agent." The "coordinator" designation may be made expressly by the storage manager or may be implicit or by default. The coordinator data agent receives notice that the storage manager, or another component, has initiated a storage operation (e.g., a backup job) in the production cluster. The coordinator data agent is responsible for auto-scaling how many backup resources, including data agents, are deployed to perform the storage operation. Accordingly, the coordinator data agent analyzes the data source(s) and applies scaling factors to determine whether more data agents are needed. If more data agents are needed, the coordinator data agent causes them to be deployed, as containerized applications, in additional pods within the production cluster. These are referred to herein as "additional data agents" and/or "on-demand data agents," as contrasted to the coordinator data agent, which is persistent. The coordinator data agent then distributes tasks to the on-demand data agents, and in some cases also distributes one or more tasks to itself, in order to execute the pending storage operation. On completion of the storage operation, the coordinator data agent tears down or causes the on-demand data agents to be taken down by the application orchestrator. This auto-scaling intelligence is illustratively implemented in the coordinator data agent and not in the storage manager, which advantageously minimizes load on the storage manager and takes advantage of the "local knowledge" about the data source(s) available to the coordinator data agent within the production cluster. The production cluster may further comprise a containerized media agent configured in the same pod or in a different pod as the data agent. Thus, a media agent accompanying an on-demand data agent is said to be an "on-demand media agent" (or, collectively with the data agent "on-demand backup resources" or "on-demand data protection resources"). In some embodiments, the media agent operates outside the cluster. The media agent receives data from the data agent and generates backup data, which it stores persistently to data storage resources, which are preferably configures outside the production cluster. In this way, data generated in the production cluster is protected against the possibility of a cluster failure or data corruption therein. In some embodiments, backup data is stored within the production cluster and may be replicated therefrom to other locations, without limitation. Thus, the illustrative data storage management system is responsible for obtaining the source data, processing it into backup data, storing the backup data to suitable persistent storage, and tracking the backup data for future use and/or lifecycle management.

The illustrative data storage management system is further enhanced to minimize bursty and unpredictable processing loads on the storage manager, which may be caused by deploying on-demand data agents. Accordingly, the system performs certain predictive operations when a production cluster is initially administered for "auto-scale." On detecting auto-scale enablement in configuration settings, the system automatically pre-configures any number of "client entities," i.e., administers configuration information prior to on-demand data agents being deployed. For the moment, they are "phantom clients," which are created by the storage manager but not operational. The storage manager creates, signs, and assigns a security certificate and a unique client ID for each phantom client before any on-demand data agents are instantiated and deployed. The storage manager performs these predictive operations at a time separate from launching the storage operation, presumably a time of reduced processing load when it has plenty of cycles to handle the client creation process. When the storage operation is initiated and the on-demand data agents are instantiated in the cluster, each on-demand data agent must register as a client with the storage manager. Registration is a realtime operation. In embodiments where the phantom clients were pre-configured, the registration is much faster, as the storage manager assigns a pre-existing signed security certificate and client ID to each on-demand data agent rather than going through the more laborious client creation process. Once registered, each on-demand data agent is ready to assume the responsibilities and/or tasks assigned to it by the coordinator data agent. When the coordinator data agent tears down the pods comprising on-demand data agents, the client IDs revert to the storage manager for re-use in a later storage operation.

In some embodiments, the illustrative data storage management system maintains a separate "infrastructure cluster" that is distinct from and operates outside of the production cluster that comprises the data sources. In some embodiments, the infrastructure cluster (a/k/a "auto-scale backup group") operates within an application orchestrator framework (e.g., Kubernetes) and within the same computing environment as the production cluster, e.g., within the same cloud computing account. The pod comprising the coordinator data agent and companion media agent is configured within the infrastructure cluster instead of within the production cluster, thus ensuring that there is no, or virtually no, overhead for backup resources in the production cluster. After determining that it needs additional data agents for the present storage operation, the coordinator data agent requests and/or instigates on-demand data agents within the infrastructure cluster. In response, the infrastructure cluster deploys, on demand, any number of pods comprising data agents and/or media agents and can increment and decrement their number on request, according to the coordinator data agent. The auto-scale logic for determining when, whether, and how many additional data agents are needed remains in the coordinator data agent. As with the in-cluster embodiments described above, the coordinator data agent distributes tasks to on-demand data agents, and in some cases also distributes one or more tasks to itself, in order to execute the present storage operation. The data agents in the infrastructure cluster are given access to the data sources in the production cluster (e.g., via the production cluster's API endpoint). On completion of the storage operation, the coordinator data agent requests and/or instructs the infrastructure cluster to tear down the on-demand pods and the on-demand data agents and/or media agents therein.

Embodiments that employ the infrastructure cluster are able to use its on-demand backup resources to service any number of production clusters without limitation, as contrasted with the in-cluster configuration in which the additional backup resources service only data sources within the same cluster. This approach is advantageous, because the infrastructure cluster's environment is declared once and implemented, and afterwards the infrastructure cluster can be employed with many and diverse production clusters, whether or not they are deployed by application orchestrator or container-orchestration platforms, whether or not they are cloud-based, or otherwise, without limitation.

The pre-configuring of phantom clients by the storage manager, based on auto-scale enablement, becomes even more valuable in multi-cluster scenarios that use the illustrative infrastructure cluster, where backup resources could be created and torn down asynchronously in very large numbers. The pre-configuration of phantom clients helps ameliorate unpredictable messaging and activity storms created by data agent auto-scaling.

Some illustrative embodiments are directed to containerized applications configured in pods operating in Kubernetes clusters, and the illustrative containers are configured as Docker containers, but the invention is not so limited. In alternative embodiments, any operating system-level virtualization platform other than Docker containers and any application orchestrator or container-orchestration system other than Kubernetes can be implemented according to principles of the present disclosure. Moreover, although Kubernetes is often referred to in the context of cloud computing environments, the invention is suitable for cloud and non-cloud implementations alike, without limitation.

Furthermore, the production clusters need not comprise or be deployed by application orchestrator or container-orchestration platforms. For example, a production cluster may be a virtual machine farm implemented as a VMWare VCenter; a cloud-based database-as-a-service (DBaaS); a cloud-based office productivity suite such as Microsoft Office 365; another non-Kubernetes cloud-based data source/application; etc., without limitation. These are referred to collectively herein as "application suites" as a convenient shorthand to avoid confusion with production clusters deployed by application orchestrators such as Kubernetes. The disclosed infrastructure cluster will protect data in these application suite production clusters by deploying backup resources suitable to the data source(s) of the application suite. The illustrative data storage management system intelligently creates and deploys configuration (e.g., YAML) files that act as templates for data agent and media agent containers in the on-demand pods of the infrastructure cluster. Thus, even if the coordinator data agent is of a type unsuitable to the production workload or production data source(s), the coordinator data agent can invoke on-demand data agents of a type that is suitable, because the auto-scale functionality of the coordinator data agent operates independently of types of data sources/workloads. Accordingly, the disclosed auto-scale approach may be applied to a variety of computing environments protected by the illustrative data storage management system.

BRIEF DESCRIPTION OF THE DRAWINGS

FIGS. 1F-1H are block diagrams illustrating suitable data structures that may be employed by the information management system.

DETAILED DESCRIPTION

Detailed descriptions and examples of systems and methods according to one or more illustrative embodiments of the present invention may be found in the section entitled AUTOMATIC SCALING OF DATA PROTECTION RESOURCES IN AN APPLICATION ORCHESTRATOR COMPUTING ENVIRONMENT SUCH AS KUBERNETES, as well as in the section entitled Example Embodiments, and also in FIGS. 3-14E herein. Furthermore, components and functionality for auto-scaling of data agent resources in an application orchestrator computing environment may be configured and/or incorporated into information management systems such as those described herein in FIGS. 1A-1H and 2A-2C.

Various embodiments described herein are intimately tied to, enabled by, and would not exist except for, computer technology. For example, deploying backup nodes and conducting backup operations described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
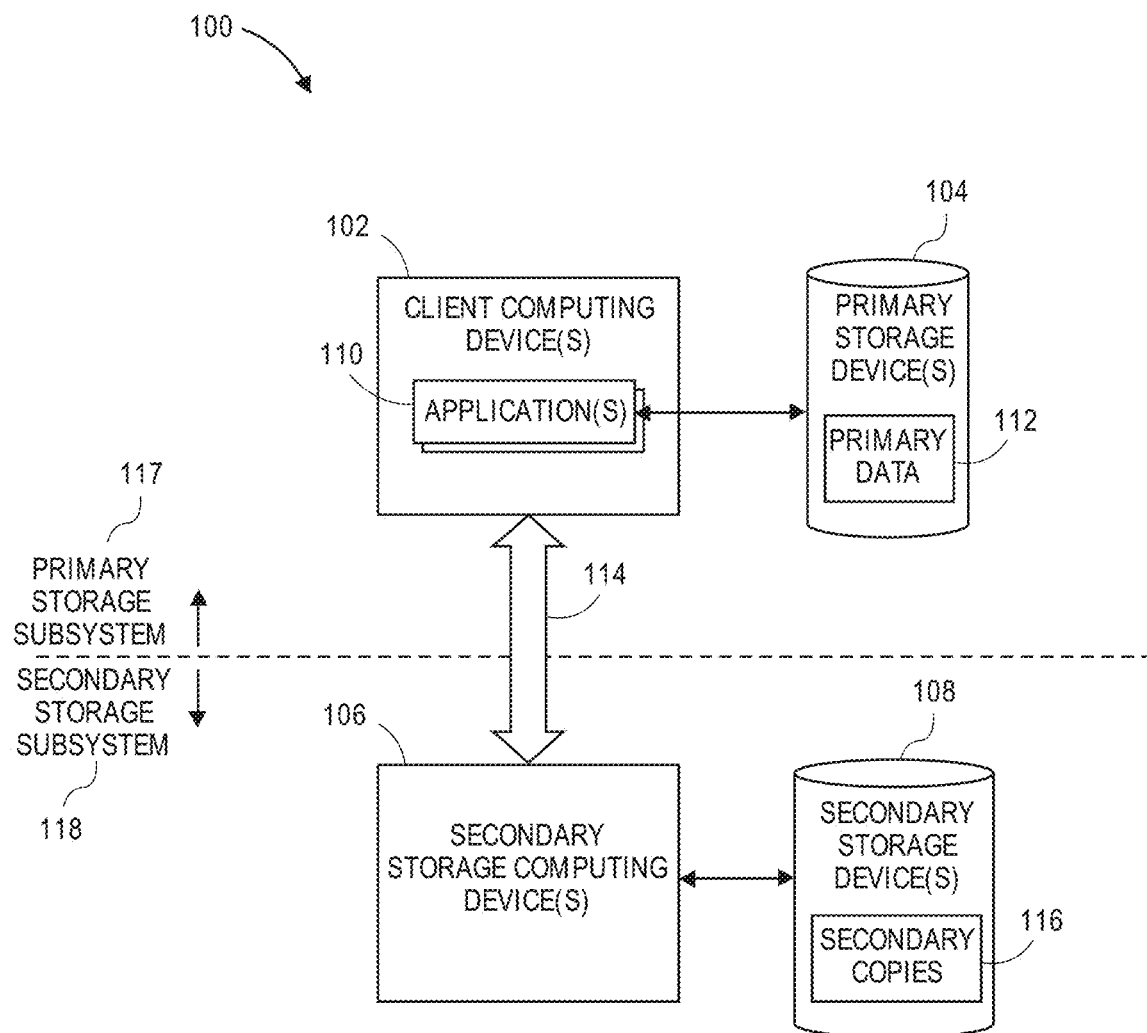
FIG. 1A is a block diagram illustrating an example information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. No. 9,444,811, entitled "Using An Enhanced Data Agent To Restore Backed Up Data Across Autonomous Storage Management Systems";
- U.S. Pat. No. 9,633,033 entitled "High Availability Distributed Deduplicated Storage System";
- U.S. Pat. No. 10,228,962 entitled "Live Synchronization and Management of Virtual Machines across Computing and Virtualization Platforms and Using Live Synchronization to Support Disaster Recovery";
- U.S. Pat. No. 10,255,143 entitled "Deduplication Replication In A Distributed Deduplication Data Storage System"
- U.S. Pat. No. 10,592,145, entitled "Machine Learning-Based Data Object Storage";
- U.S. Pat. No. 10,684,924 entitled "Data Restoration Operations Based on Network Path Information";
- U.S. Patent Pub. No. 2006/0224846, entitled "System and Method to Support Single Instance Storage Operations" now abandoned;
- U.S. Patent Pub. No. 2016/0350391 entitled "Replication Using Deduplicated Secondary Copy Data" now abandoned;
- U.S. Patent Pub. No. 2017/0235647 entitled "Data Protection Operations Based on Network Path Information" now abandoned; and
- U.S. Patent Pub. No. 2019/0108341 entitled "Ransomware Detection And Data Pruning Management".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
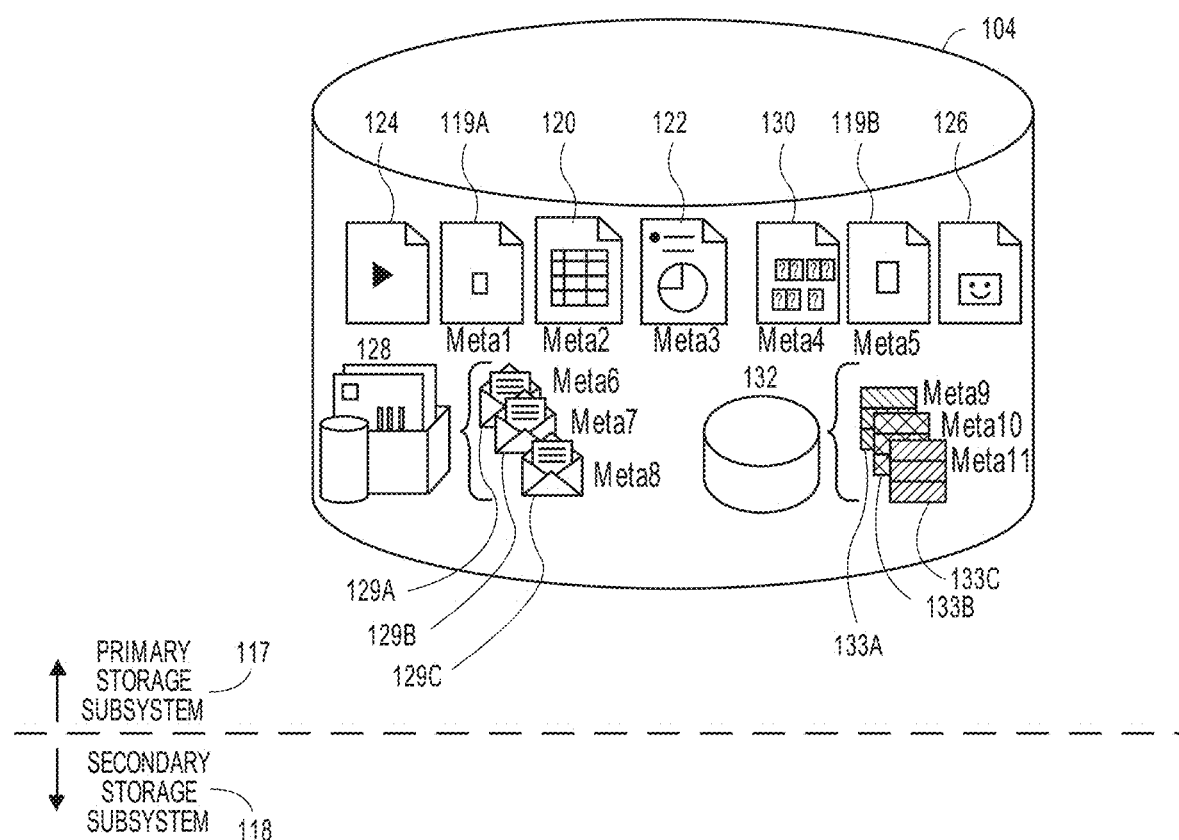
FIG. 1B is a detailed view of a primary storage device, a secondary storage device, and some examples of primary data and secondary copy data.
Figure 1B:
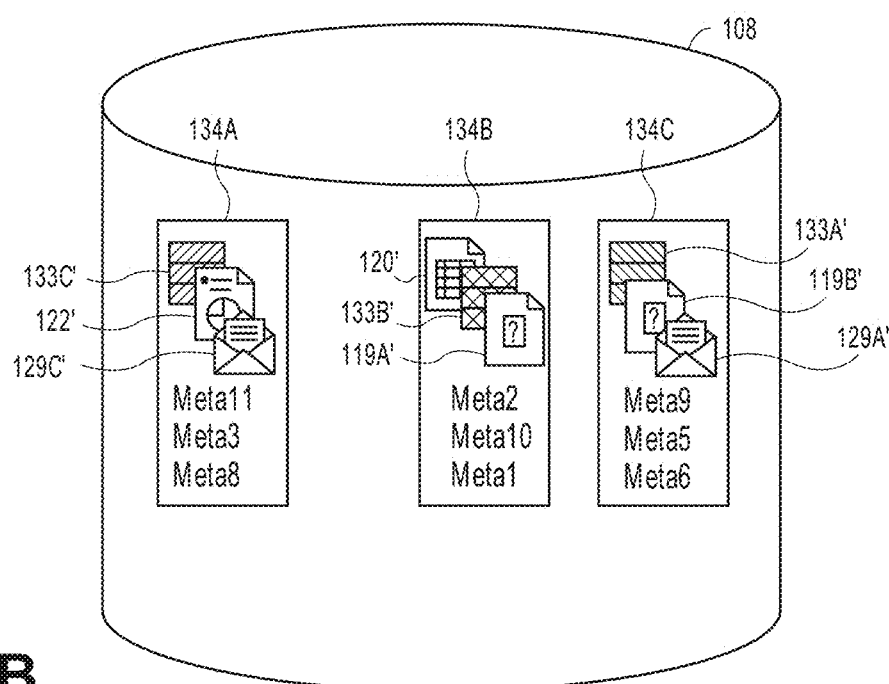
Figure 1C:
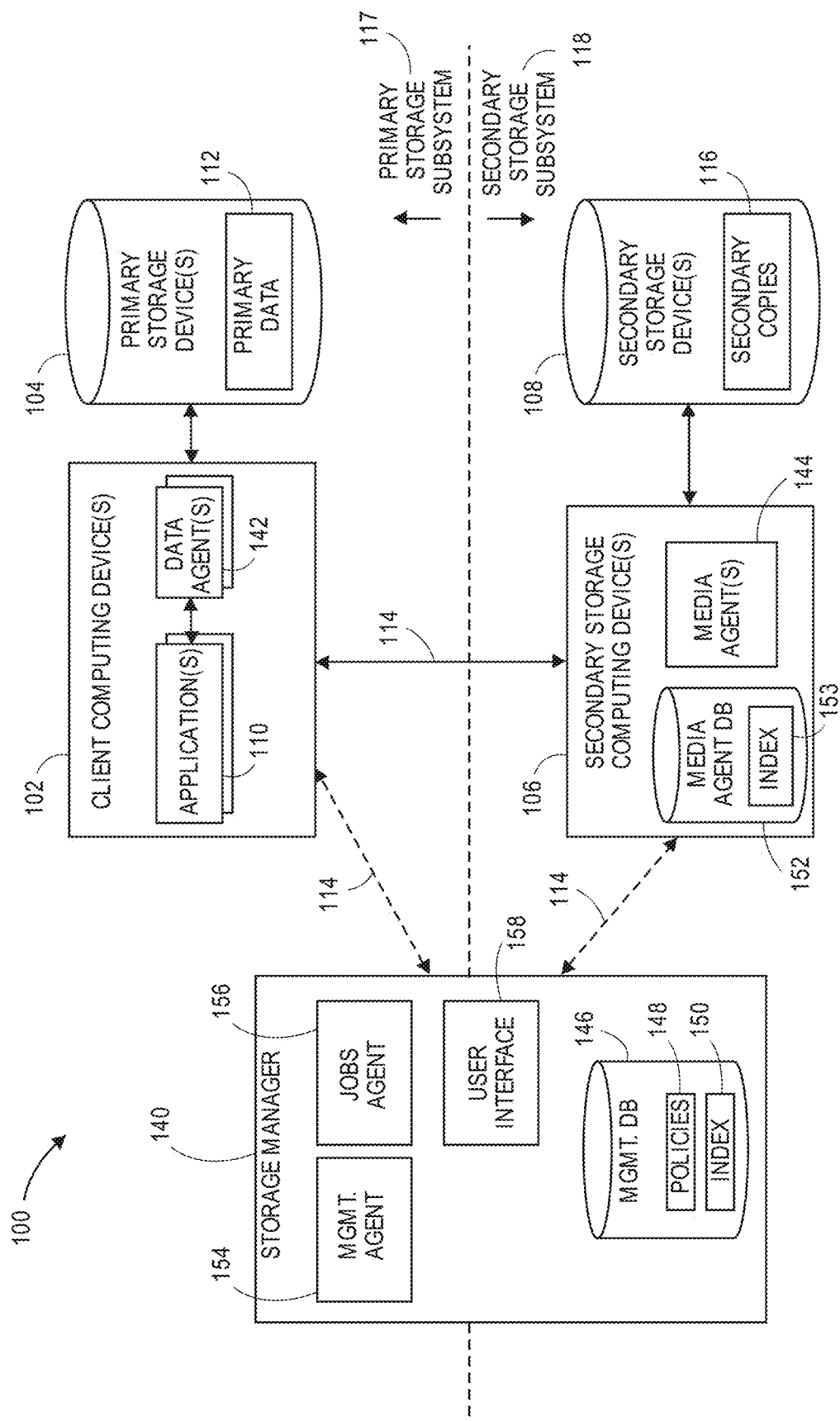
FIG. 1C is a block diagram of an example information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Example Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Example Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Example Primary Data and an Example Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Example Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
  communicating with data agents 142 and media agents 144, including transmitting instructions, messages, and/or queries, as well as receiving status reports, index information, messages, and/or queries, and responding to same;
  initiating execution of information management operations;
  initiating restore and recovery operations;
  managing secondary storage devices 108 and inventory/capacity of the same;
  allocating secondary storage devices 108 for secondary copy operations;
  reporting, searching, and/or classification of data in system 100;
  monitoring completion of and status reporting related to information management operations and jobs;
  tracking movement of data within system 100;
  tracking age information relating to secondary copies 116, secondary storage devices 108, comparing the age information against retention guidelines, and initiating data pruning when appropriate;
  tracking logical associations between components in system 100;
  protecting metadata associated with system 100, e.g., in management database 146;
  implementing job management, schedule management, event management, alert management, reporting, job history maintenance, user security management, disaster recovery management, and/or user interfacing for system administrators and/or end users of system 100;
  sending, searching, and/or viewing of log files; and
  implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144.

Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
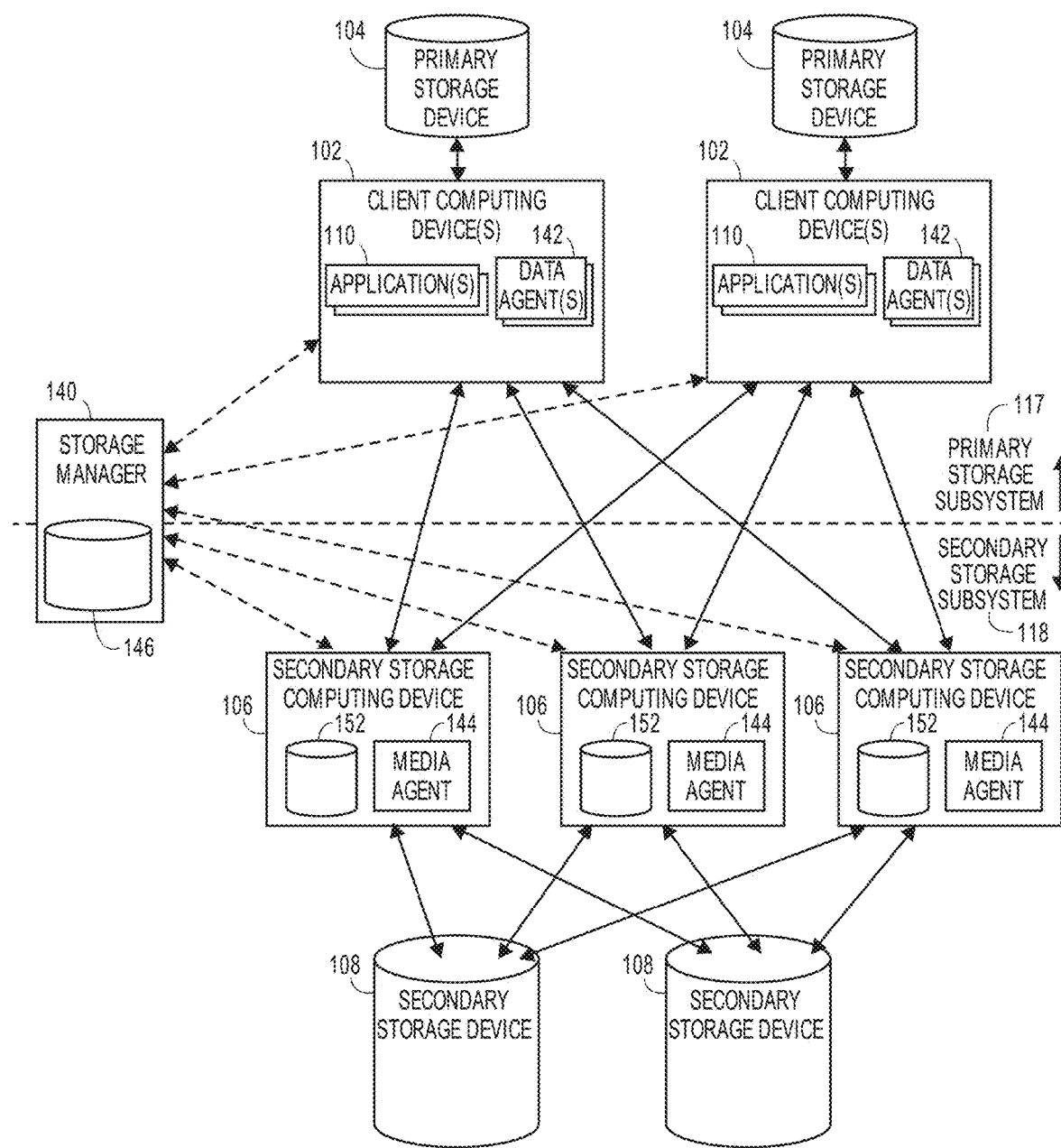
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Example Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Patent Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Example auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to mitigate recognized risks dynamically and automatically, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Example information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one example scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Example Storage Policy and Secondary Copy Operations

Figure 1E:
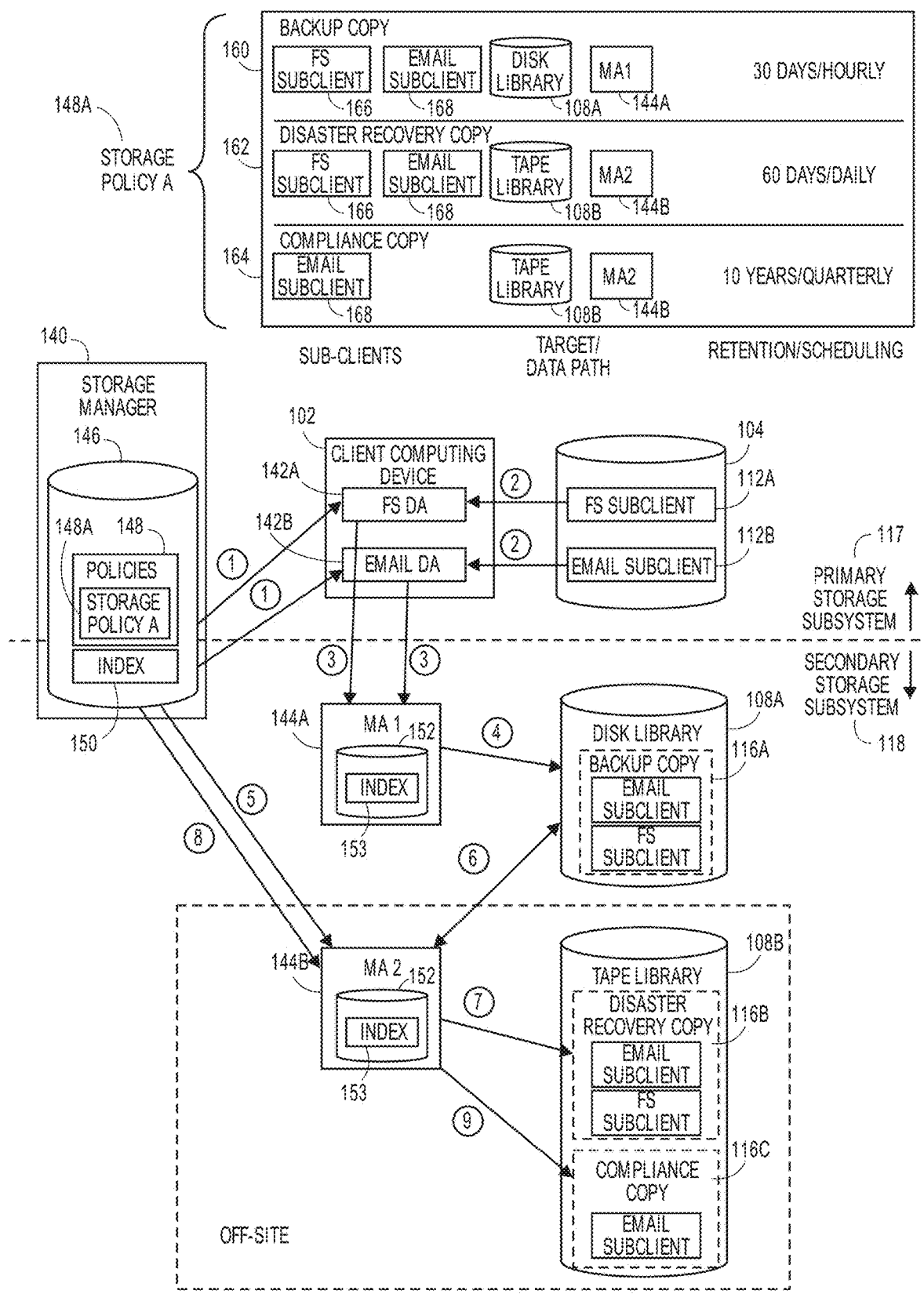
FIG. 1E illustrates certain secondary copy operations according to an example storage policy.

FIG. 1E includes a data flow diagram depicting performance of secondary copy operations by an embodiment of information management system 100, according to an example storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The example storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 1426 may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Example Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Example Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
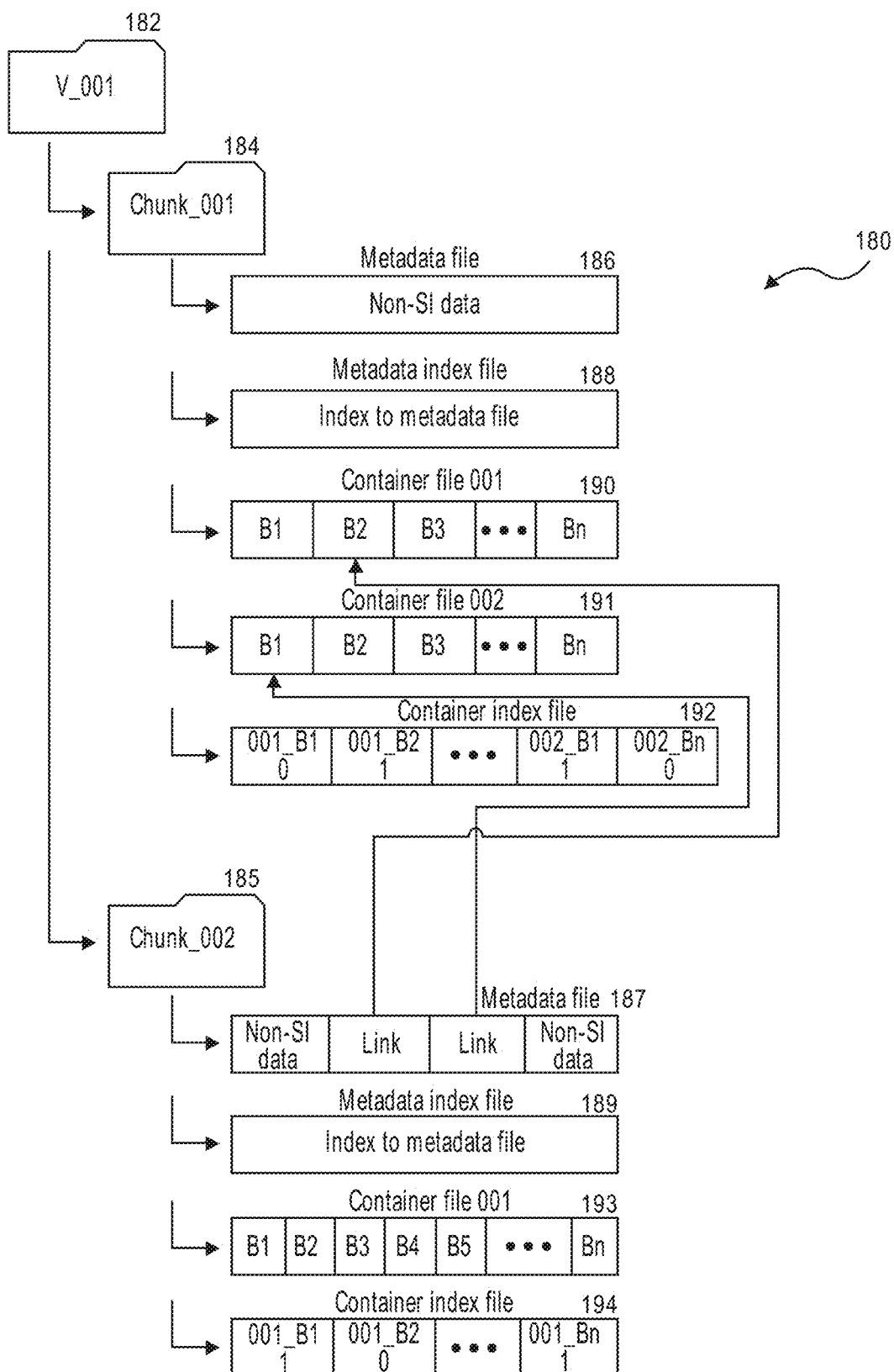

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
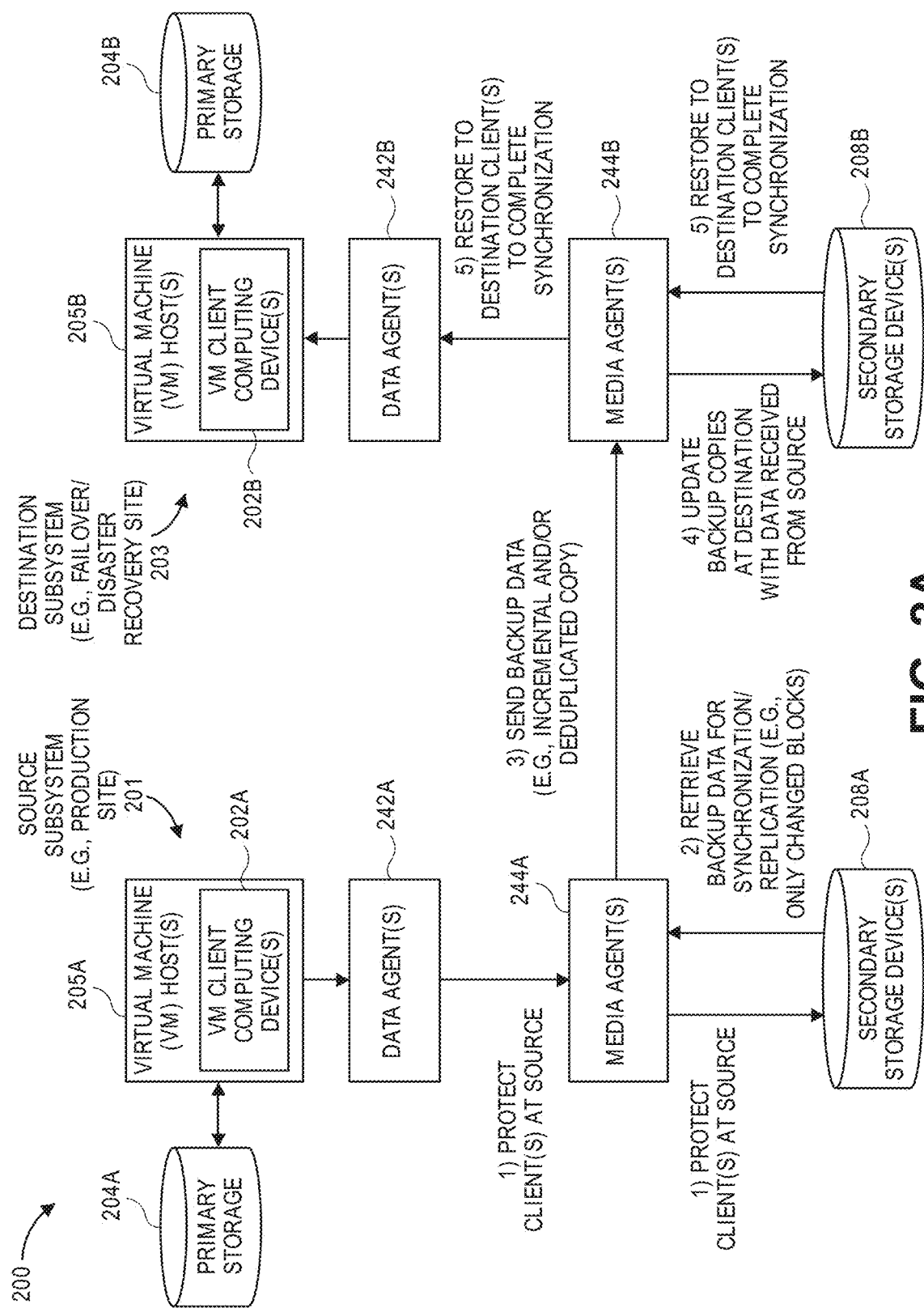
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Pat. No. 10,228,962 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. Patent Pub. No. 2016/0350391 entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
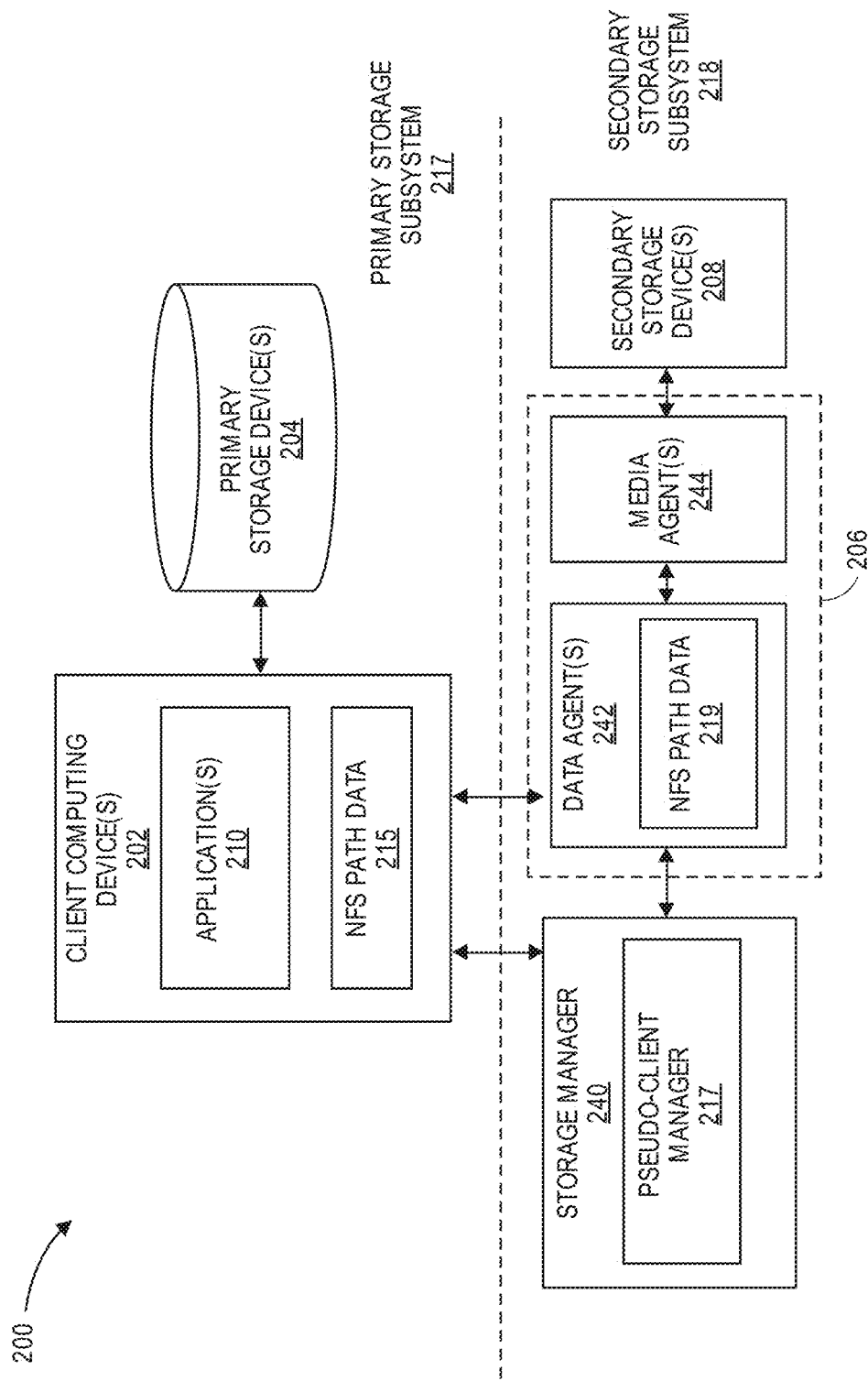
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Pub. No. 2017/0235647 entitled "Data Protection Operations Based on Network Path Information." Examples of improved data restoration scenarios based on network-path information, including using stored backups effectively as primary data sources, may be found in U.S. Pat. No. 10,684,924 entitled "Data Restoration Operations Based on Network Path Information."

Highly Scalable Managed Data Pool Architecture

Figure 2C:
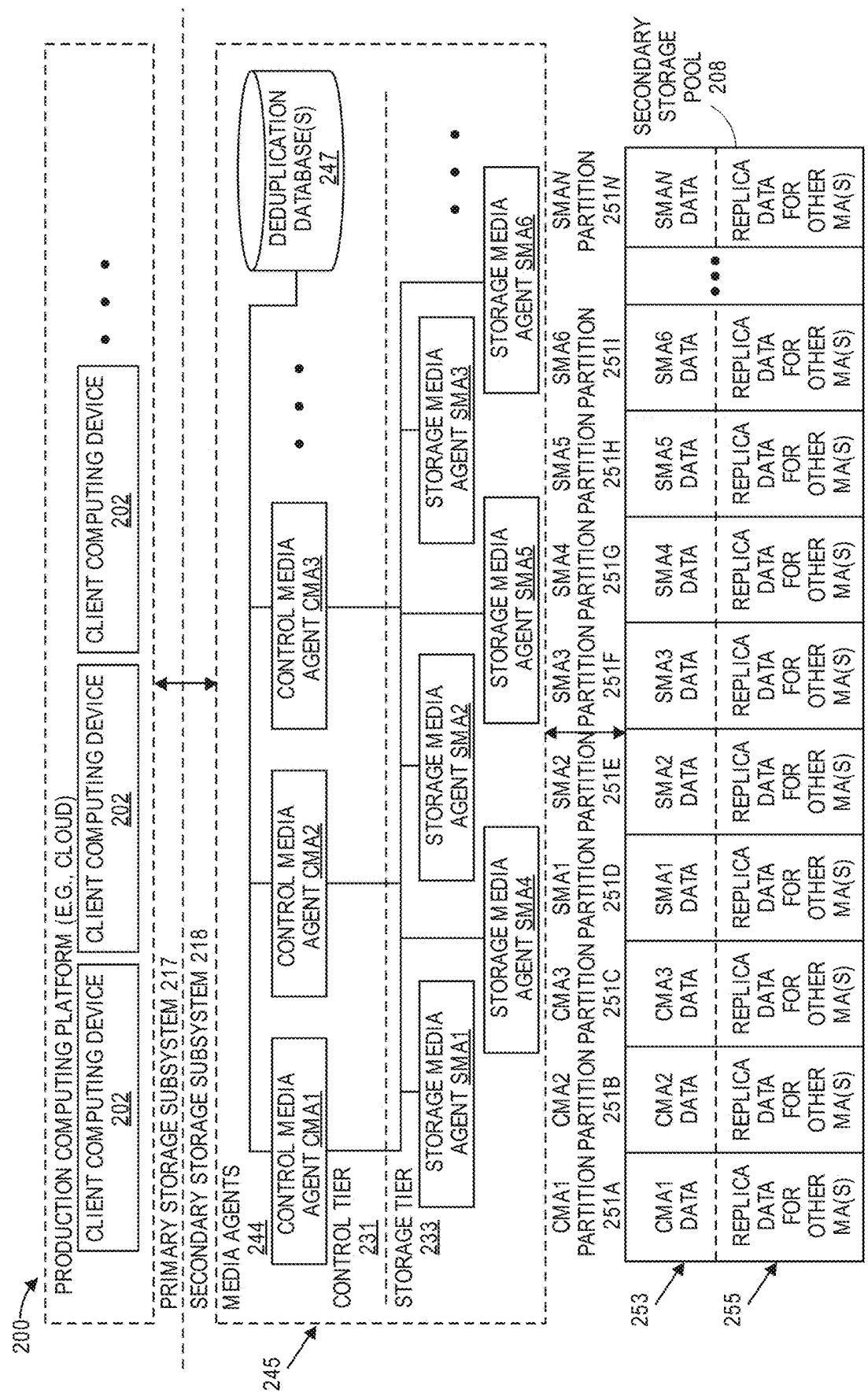
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. No. 9,633,033 entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Pat. No. 10,255,143 entitled "Deduplication Replication In A Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Cloud Computing. The National Institute of Standards and Technology (NIST) provides the following definition of Cloud Computing characteristics, service models, and deployment models:

Cloud Computing

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Essential Characteristics:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, tablets, laptops, and workstations).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid elasticity. Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service. Cloud systems automatically control and optimize resource use by leveraging a metering capability[1] at some level of abstraction appropriate to the type of service (e.g., storage, processing, bandwidth, and active user accounts). Resource usage can be monitored, controlled, and reported, providing transparency for both the provider and consumer of the utilized service.

[1] Typically this is done on a pay-per-use or charge-per-use basis.

Service Models:

Software as a Service (SaaS). The capability provided to the consumer is to use the provider's applications running on a cloud infrastructure[2]. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

[2] A cloud infrastructure is the collection of hardware and software that enables the five essential characteristics of cloud computing. The cloud infrastructure can be viewed as containing both a physical layer and an abstraction layer. The physical layer consists of the hardware resources that are necessary to support the cloud services being provided, and typically includes server, storage and network components. The abstraction layer consists of the software deployed across the physical layer, which manifests the essential cloud characteristics. Conceptually the abstraction layer sits above the physical layer.

Platform as a Service (PaaS). The capability provided to the consumer is to deploy onto the cloud infrastructure consumer-created or acquired applications created using programming languages, libraries, services, and tools supported by the provider.[3] The consumer does not manage or control the underlying cloud infrastructure including network, servers, operating systems, or storage, but has control over the deployed applications and possibly configuration settings for the application-hosting environment.

[3] This capability does not necessarily preclude the use of compatible programming languages, libraries, services, and tools from other sources.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models:

Private cloud. The cloud infrastructure is provisioned for exclusive use by a single organization comprising multiple consumers (e.g., business units). It may be owned, managed, and operated by the organization, a third party, or some combination of them, and it may exist on or off premises.

Community cloud. The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud. The cloud infrastructure is provisioned for open use by the general public. It may be owned, managed, and operated by a business, academic, or government organization, or some combination of them. It exists on the premises of the cloud provider.

Hybrid cloud. The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Source: Peter Mell, Timothy Grance (September 2011). *The NIST Definition of Cloud Computing, National Institute of Standards and Technology: U.S. Department of Commerce. Special publication* 800-145. nvlpubs.nist.gov/nistpubs/Legacy/SP/nistspecialpublication800-145.pdf (accessed 26 Apr. 2019). Cloud computing aims to allow those who consume the services (whether individuals or organizations) to benefit from the available technologies without the need for deep knowledge about or expertise with each of them. Wikipedia, Cloud Computing, en.wikipedia.org/wiki/Cloud_computing (accessed 26 Apr. 2019). "Cloud computing metaphor: the group of networked elements providing services need not be individually addressed or managed by users; instead, the entire provider-managed suite of hardware and software can be thought of as an amorphous cloud." Id.

Cloud Service Accounts and Variability in Cloud Services. Cloud service providers such as Amazon, Microsoft, Alibaba, Google, Salesforce, Cisco, etc. provide access to their particular cloud services via cloud service accounts, such as corporate accounts, departmental accounts, individual user accounts, etc. Each cloud service account typically has authentication features, e.g., passwords, certificates, etc., to restrict and control access to the cloud service. Each account also might have service level guarantees and/or other terms and conditions between the cloud service provider and the service subscriber, e.g., a company, a government agency, an individual user. A subscribing entity might have multiple accounts with a cloud service provider, such as an account for the Engineering department, an account for the Finance department, an account for the Human Resources department, other accounts for individual company users, etc., without limitation. Each cloud service account carries different authentication, even though the services subscriber is the same entity.

Different cloud service accounts might differ not just in service level guarantees, but might include different services. For example, one account might include long-term storage resources, whereas another account might be limited to ordinary data storage. For example, some accounts might have access to data processing functions supplied by the cloud service provider, such as machine learning algorithms, statistical analysis packages, etc., whereas other accounts might lack such features. Accordingly, the resources available to the user(s) of cloud service accounts can vary as between accounts, even if the accounts have the same subscriber and the same cloud service provider. Thus, the user experience and the technologies available as between cloud service accounts can vary significantly. Thus, when considering cloud computing, the specifics of cloud service accounts can play a role in the availability and/or portability of resources. Crossing account boundaries can pose technological barriers when considering migration of applications and their cloud services assets.

Cloud Availability Zones. "Availability zones (AZs) are isolated locations within . . . regions from which public cloud services originate and operate. Regions are geographic locations in which public cloud service providers' data centers reside. Businesses choose one or multiple worldwide availability zones for their services depending on business needs. Businesses select availability zones for a variety of reasons, including compliance and proximity to end customers. Cloud administrators can also choose to replicate services across multiple availability zones to decrease latency or protect resources. Admins can move resources to another availability zone in the event of an outage. Certain cloud services may also be limited to particular regions or AZs." Source: Margaret Rouse, Definition of Availability Zones, TechTarget, searchaws.techtarget.com/definition/availability-zones (accessed 26 Apr. 2019).

Here is a vendor-specific example of how cloud service availability zones are organized in the Google Cloud: "Certain [Google] Compute Engine resources live in regions or zones. A region is a specific geographical location where you can run your resources. Each region has one or more zones; most regions have three or more zones. For example, the us-central1 region denotes a region in the Central United States that has zones us-central1-a, us-central1-b, us-central1-c, and us-central1-f. Resources that live in a zone, such as instances or persistent disks, are referred to as zonal resources. Other resources, like static external IP addresses, are regional. Regional resources can be used by any resources in that region, regardless of zone, while zonal resources can only be used by other resources in the same zone. For example, disks and instances are both zonal resources. To attach a disk to an instance, both resources must be in the same zone. Similarly, if you want to assign a static IP address to an instance, the instance must be in the same region as the static IP. Only certain resources are region- or zone-specific. Other resources, such as images, are global resources that can be used by any other resources across any location. For information on global, regional, and zonal Compute Engine resources, see Global, Regional, and Zonal Resources." Source: Google Cloud Regions and Zones, cloud.google.com/compute/docs/regions-zones/ (accessed 26 Apr. 2019) (emphasis added). Accordingly, when considering cloud computing, availability zones can play a role in the availability and/or portability of resources. Crossing zone boundaries can pose technological barriers when considering migration of applications and their cloud service assets, even when the different availability zones are supplied by the same cloud service provider.

Traditional Non-Cloud ("On-Premises") Data Centers are Distinguishable from Cloud Computing. Traditional data centers generally do not have cloud computing characteristics. For example, the user experience is generally different, for example in regard to the name space(s) used for the storage, computing, and network resources. Moreover, substantial increases in resources needed by a user are not provisioned on demand. A traditional data center is physically located within the enterprise/organization that owns it. A traditional non-cloud data center might comprise computing resources such as servers, mainframes, virtual servers/clusters, etc.; and/or data storage resources, such as network-attached storage, storage area networks, tape libraries, etc. The owner of the traditional data center procures hardware, software, and network infrastructure (including making the associated capital investments); and manages going-forward planning for the data center. A traditional data center is staffed by professional Information Technology (IT) personnel, who are responsible for the data center's configuration, operation, upgrades, and maintenance. Thus, a traditional non-cloud data center can be thought of as self-managed by its owner/operator for the benefit of in-house users, as compared to cloud computing, which is managed by the cloud service provider and supplied as a service to outside subscribers. Clearly, a cloud computing service also has hardware, software, and networking infrastructure and professionals staffing it, as well as having an owner responsible for housing and paying for the infrastructure. However, the cloud computing service is consumed differently, served differently, and deployed differently compared to non-cloud data centers. Traditional non-cloud data centers are sometimes referred to as "on-premises" data centers, because their facilities are literally within the bounds of the organization that owns the data center. Cloud service providers' data centers generally are not within the bounds of the subscriber organization and are consumed "at a distance" "in the cloud." Accordingly, when considering cloud computing versus non-cloud data center deployment, the choice can play a role in the availability and/or portability of resources. Crossing boundaries between non-cloud data centers and cloud computing can pose technological barriers. For example, storing a database at a non-cloud data center might require different resources and/or access features/controls than storing the database at a cloud computing service. Thus, moving the database from the non-cloud data center to a cloud service account may require data conversion, re-configuration, and/or adaptation that go above and beyond merely copying the database. Likewise for virtual machines (VMs). Conversely, moving data, applications, VMs, and/or web services from cloud computing to a non-cloud data center also can involve data conversion, re-configuration, and/or adaptation to ensure success.

Service Models. Differences in service models, comparing non-cloud "on-premises" data centers versus IaaS versus PaaS versus SaaS, can yield different performance and cost profiles. Different service models can affect resource availability and/or portability of distributed/serverless applications, at least because the management of different resources rests with different providers and governed by different terms and conditions. See, e.g., Stephen Watts, SaaS vs PaaS vs IaaS: What's The Difference and How To Choose, BMC Blogs, BMC Software, Inc., www.bmc.com/blogs/saas-vs-paas-vs-iaas-whats-the-difference-and-how-to-choose/ (accessed 26 Apr. 2019).

Kubernetes. Kubernetes is an example of an application orchestrator computing environment (a/k/a container-or-chestration system). "Kubernetes is a portable, extensible, open-source platform for managing containerized workloads and services, that facilitates both declarative configuration and automation." https://kubernetes.io/docs/concepts/overview/what-is-kubernetes/ (accessed Jul. 20, 2021). "Kubernetes runs your workload by placing containers into Pods to run on Nodes. A node may be a virtual or physical machine, depending on the cluster. Each node is managed by the control plane and contains the services necessary to run Pods. Typically you have several nodes in a cluster . . . . The components on a node include the kubelet, a container runtime, and the kube-proxy." https://kubernetes.io/docs/concepts/architecture/nodes/ (accessed Jul. 20, 2021). "Filesystems in the Kubernetes container provide ephemeral storage, by default. This means that a restart of the pod will wipe out any data on such containers . . . . A Kubernetes Volume provides persistent storage that exists for the lifetime of the pod itself. This storage can also be used as shared disk space for containers within the pod." http://en.wikipedia.org/wiki/Kubernetes#Volumes (accessed Jul. 21, 2021). "A Pod is a group of one or more application containers (such as Docker) and includes shared storage (volumes), IP address and information about how to run." http://kubernetes.io/docs/tutorials/kubernetes-basics/explore/explore-intro/ (accessed Jul. 20, 2021). "A Pod always runs on a Node. A Node is a worker machine in Kubernetes and may be either a virtual or a physical machine, depending on the cluster. Each Node is managed by the control plane. A Node can have multiple pods, and the Kubernetes control plane automatically handles scheduling the pods across the Nodes in the cluster. The control plane's automatic scheduling takes into account the available resources on each Node" http://kubernetes.io/docs/tutorials/kubernetes-basics/explore/explore-intro/ (accessed Jul. 20, 2021). "The kubelet is the primary 'node agent' that runs on each node. It can register the node with the apiserver using one of: the hostname; a flag to override the hostname; or specific logic for a cloud provider . . . . The kubelet takes a set of PodSpecs [object that describes a pod] that are provided through various mechanisms (primarily through the apiserver) and ensures that the containers described in those PodSpecs are running and healthy." http://kubernetes.io/docs/reference/command-line-tools-reference/kubelet/ (accessed May 22, 2020).

A software container (a/k/a application container or container runtime) is an operating system-virtualization (OS-virtualization) service such as a Docker container. "Docker is a set of platform as a service (PaaS) products that use OS-level virtualization to deliver software in packages called containers. Containers are isolated from one another and bundle their own software, libraries and configuration files; they can communicate with each other through well-defined channels. Because all of the containers share the services of a single operating system kernel, they use fewer resources than virtual machines." http://en.wikipedia.org/wiki/Docker (software) (accessed Jul. 21, 2021). Kubernetes may use Docker containers in its pods, but is not limited to Docker for OS-virtualization. Software that runs in a software container is said to be containerized. "Application containerization is an OS-level virtualization method used to deploy and run distributed applications without launching an entire virtual machine (VM) for each app [application]. Multiple isolated applications or services run on a single host and access the same OS kernel. Containers work on bare-metal systems, cloud instances and virtual machines, across Linux and select Windows and Mac OSes [operating systems] . . . . Application containers include the runtime components—such as files, environment variables and libraries—necessary to run the desired software. Application containers consume fewer resources than a comparable deployment on virtual machines because containers share resources without a full operating system to underpin each app. The complete set of information to execute in a container is the image. The container engine deploys these images on hosts. The most common app containerization technology is Docker, specifically the open source Docker Engine and containers based on universal runtime runC." http://searchitoperations.techtarget.com/definition/application-containerization-app-containerization (accessed Jul. 5, 2019).

Figure 3:
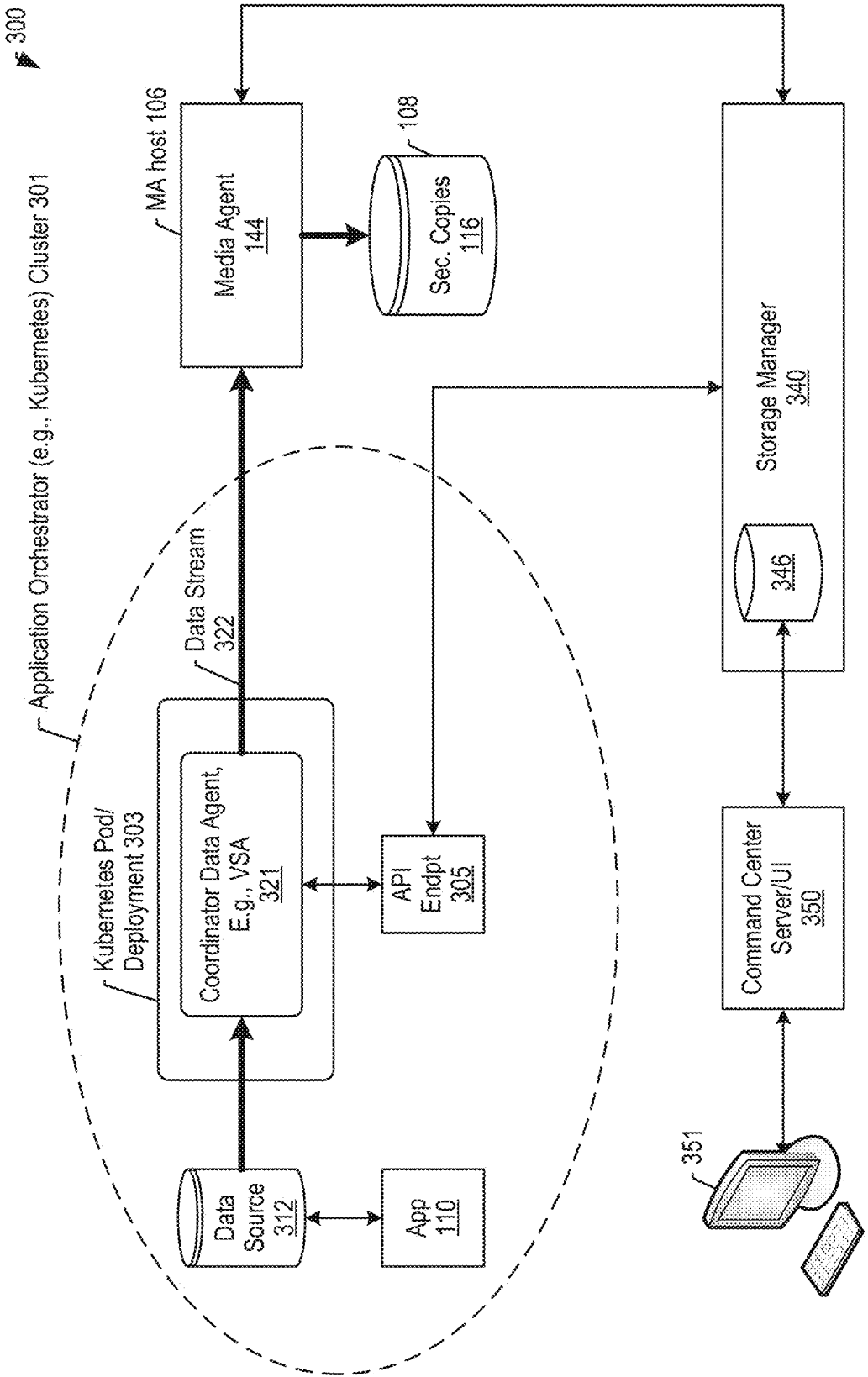
FIGS. 3-6 are block diagrams illustrating some salient portions of a data storage management system 300 for automatic scaling of data protection resources within and/or in association with an application orchestrator computing environment, according to an illustrative embodiment.

Automatic Scaling of Data Protection Resources in an Application Orchestrator Computing Environment Such as Kubernetes The illustrative embodiments comprise containerized applications configured in pod deployments operating in Kubernetes clusters, and the illustrative containers are configured as Docker containers, but the invention is not so limited. In some embodiments, so-called StatefulSets and/or DaemonSets may be deployed in place of or in addition to pods in a Kubernetes cluster according to principles of the present disclosure, without limitation. In alternative embodiments, any operating system-level virtualization platform other than Docker containers and any application orchestrator or container-orchestration system other than Kubernetes can be implemented according to principles of the present disclosure. Moreover, although Kubernetes is often referred to in the context of cloud computing environments, the invention is suitable for cloud and non-cloud implementations alike, without limitation. Thus, Kubernetes and its constituent concepts and components are used herein as illustrative examples to ease the reader's understanding of the disclosed technologies. However, the invention is not limited to Kubernetes implementations or to the Kubernetes-specific lingo used herein. Moreover, the present invention is not limited to using auto-scaling only for backup operations, although this is the example storage operation used herein, and the illustrative system may apply auto-scaling to other secondary copy operations that require on-demand data protection resources, such as archive jobs, reference copy jobs, auxiliary copy jobs, restore jobs, etc., without limitation FIGS. 3-6 are block diagrams illustrating some salient portions of a data storage management system 300 for automatic scaling of data protection resources within and/or in association with an application orchestrator computing environment, according to an illustrative embodiment. FIG. 3 is a block diagram illustrating some salient portions of system 300 and depicts: application orchestrator cluster 301 comprising API endpoint 305, application 110, data source 312, and pod/deployment 303 hosting containerized data agent 321; media agent host 106 hosting media agent 144; data storage 108 hosting secondary/backup copies 116; storage manager 340 and management database 346; command center server 350; and endpoint 351. Media agent host 106, data storage 108, secondary copies 116, and media agent 144 are described in more detail in an earlier figure. Notably, storage manager 340, media agent host 106, and data storage 108 are configured outside the application orchestrator computing environment/cluster 301 in order to ensure that secondary copies 116 are stored persistently, outside of and apart from the application orchestrator cluster after they are created, as an extra measure of data protection security, though the invention is not limited to this arrangement. The bold unidirectional arrows, originating at data source 312 to data agent 321 to media agent 144 to data storage 108, depict a logical view of a pathway taken by data in an illustrative backup operation performed by the illustrative data storage management system. Intermediate components and networks, if any, are not shown. Accordingly, data in data source 312 is transformed into one or more secondary copies 116 (e.g., backup copies) that are stored persistently outside cluster 301. Media agent 144, data storage 108, and storage manager 340 may be configured in any and/or the same setting, whether cloud-based or non-cloud, without limitation. System 300 is a data storage management system similar to system 100 and additionally comprises features for auto-scaling data protection resources as disclosed herein.

Application 110 is a containerized application that executes within cluster 301 and generates and/or consumes data stored in a data storage volume configured within cluster 301. Accordingly, the data therein is a data source 312 for the data protection operations of the disclosed data storage management system 300. Data source 312 (or "data 312") is in a primary data format that is natively accessible to application 110, which generates and/or consumes data 312. Docker is the preferred containerization service for application 110 as well as for data agents 321, 621, 721, and/or containerized media agents 144, but the invention is not so limited.

Application orchestrator cluster 301 (a/k/a "cluster 301" or "production cluster 301") executes within an application orchestrator computing environment (or container-orchestration system) such as Linode Kubernetes Engine (LKE), Google Kubernetes Engine (GKE), Azure Kubernetes Service (AKS), Amazon Web Services Elastic Kubernetes Service (EKS), etc., without limitation. Cluster 301 may be deployed in a cloud computing environment such as Google Cloud Platform (GCP) or in a non-cloud "on-premises" data center setting, without limitation. A preferred embodiment of cluster 301 is a Kubernetes cluster. Cluster 301 comprises a plurality of nodes and a control plane (not shown in this figure) consistent with Kubernetes deployments. Because it generates data (e.g., from application 110) cluster 301 is referred to herein as a "production cluster." Pod 303 (or "pod/deployment 303") is illustratively embodied as a Kubernetes pod, but in some embodiments, it may be deployed as a Kubernetes StatefulSet or a Kubernetes DaemonSet, without limitation. Pod 303 comprises data agent 321 running as a containerized application within pod 303, said to be a "containerized data agent" 321. Pod 303 is distinct from another pod that hosts application 110. Because it hosts a backup resource such as data agent 321, pod 303 may be referred to herein as "backup node" or "backup access node" 303, but this term should not be confused with a Kubernetes node, which generally refers to an underlying computing device that hosts one or more Kubernetes pods. API endpoint 305 is an application programming interface (API) server or computing device through which communications are handled into and out of cluster 301. For example, storage manager 340 communicates with data agent 321 in cluster 301 via API endpoint 305. However, it should be noted that in some embodiments, a gateway computing device (not shown here) may be interposed between storage manager 340 and cluster 301, to facilitate cloud access or other data connectivity needs, as shown in the illustrative topology screenshot of FIG. 14E.

Data agent 321 is a data agent component of the illustrative data storage management system 300. Data agent 321 is analogous to data agent 142 and is deployed as a containerized application in Kubernetes pod 303. Data agent 321 is, illustratively, embodied as a virtual server agent (VSA) in some embodiments and is associated with data source 312. Data agent 321 communicates with media agent 144 (e.g., via API endpoint 305, but for simplicity this connectivity is not shown in the present figure). Data agent 321 obtains data from data source 312, processes and formats the data, and transmits the processed data to media agent 144 via one or more data streams 322. Media agent 144 further processes and formats the data and arranges it into one or more secondary copies 116. Secondary copies 116 may be referred to herein as backup copies 116 when generated by a backup storage operation or a backup job. Media agent 144 also communicates with storage manager 340. Data agent 321 also comprises coordinator features that (i) determine how many data agents are need for the present storage operation, which is typically, but not necessarily, initiated by storage manager 340; (ii) if more agents are needed, causes a number of additional data agents and/or media agents to be deployed on demand; (iii) assigns task(s) to the additional data agents and possibly also to itself; (iv) performs the self-assigned tasks, if any; and (v) on completion of the storage operation, causes the additional data agents and/or media agents to be taken down and their host pods to be dissolved, thus completing the automatic scaling feature. Thus, data agent 321 is also referred to herein as "coordinator data agent 321." In the scenario depicted in the present figure, data agent 321 uses its coordinator features to determine that no additional data agents are required for the pending storage operation and therefore does not invoke any additional on-demand data agents. For a scenario where additional data agents are invoked on demand within cluster 301 see FIG. 5. For a scenario where additional data agents and media agents are invoked on demand from a separate infrastructure cluster see FIGS. 7A-7E.

Storage manager 340 comprises and/or executes on a computing device comprising one or more hardware processors. Storage manager 340 is analogous to storage manager 140 and additionally comprises features for auto-scaling of data protection resources as disclosed herein. For example, storage manager 340 is configured to collect administrative information about one or more production clusters such as cluster 301, including auto-scale enablement, to store the administrative information in management database 346, and to communicate with the one or more application orchestrator clusters such as cluster 301/701 and/or with data protection resources deployed therein such as data agents 321, 521, 621, and/or 721. Storage manager 340 is not depicted in subsequent figures herein for the sake of simplicity, but it is to be understood that it is part of every data storage management system 300 according to some embodiments of the present invention. Storage manager 340 logically comprises management database 346. Management database 346 is analogous to management database 146 and additionally comprises information that relates to auto-scaling of data protection resources in an application orchestrator environment, such as the examples in FIG. 8. The information is obtained via a user interface presented and managed by command center server 350, which is communicatively coupled with storage manager 340.

Command center server 350 is a computing device comprising one or more hardware processors. Command center server 350 is communicatively coupled to storage manager 340 and comprises a graphical user interface (GUI), which is served to computerized endpoints, such as endpoint 351, that make administrative entries into storage manager 340. Example screenshots of the GUI are shown in FIGS. 14A-14E. The illustrative data storage management system 300 may not comprise all the components shown in the present figure, and illustratively includes: storage manager 340, management database 346, media agent 144, and data agent 321, as well as components shown in other figures such as on-demand resources 521, 621, 721, and 144. The underlying computing devices and/or application orchestrator environment may be part of system 300 in some embodiments, may be supplied by an environment or cloud service provider in other embodiments, may belong to a customer or managed service provider that uses the illustrative data storage management system's components in yet other embodiments, and/or any combination thereof without limitation.

Figure 4:
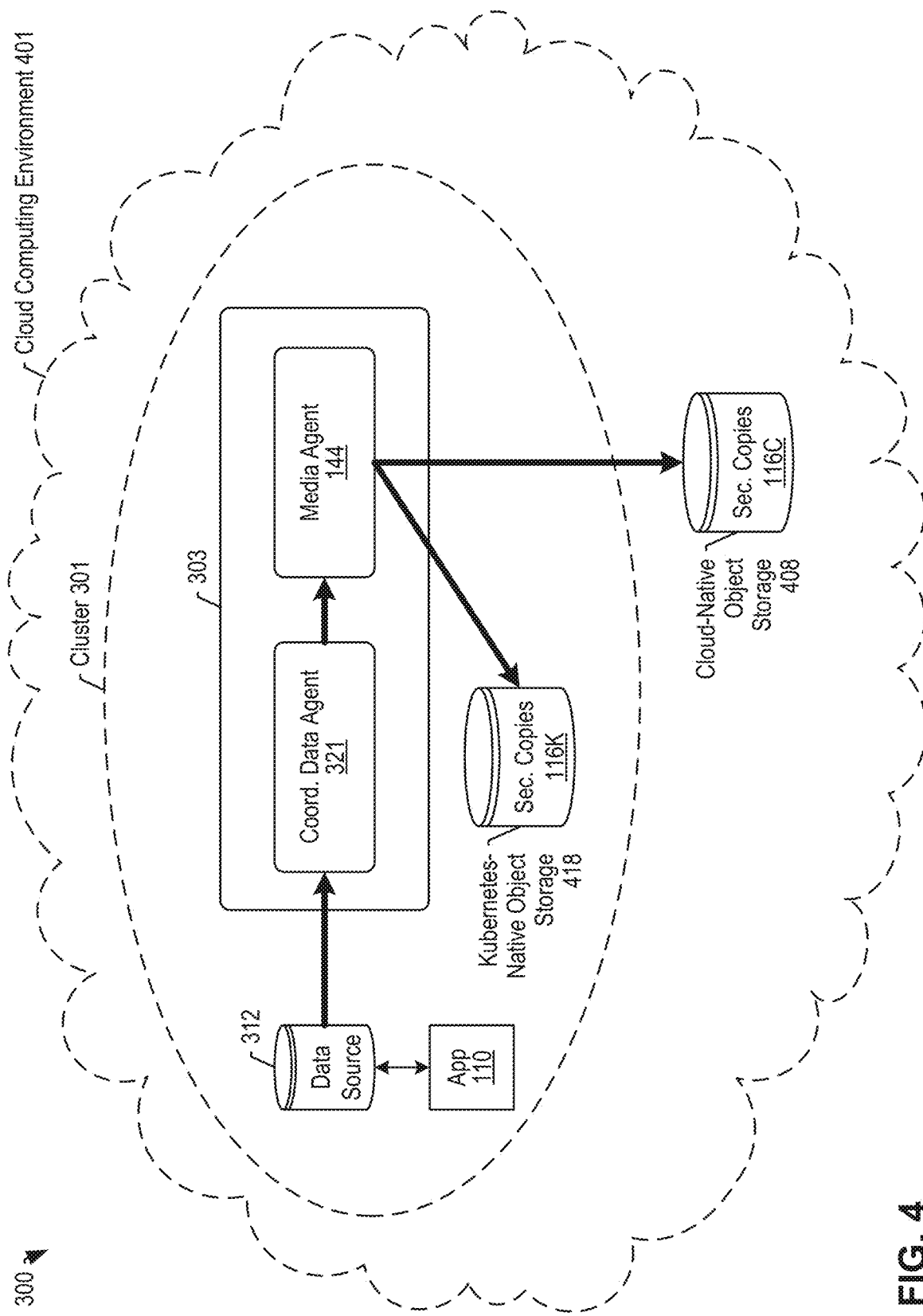

FIG. 4 is a block diagram illustrating some salient portions of data storage management system 300 according to another illustrative embodiment. The present figure depicts a configuration similar to the one shown in FIG. 3, except that (i) cluster 301 and secondary copies 116 are configured within a cloud computing environment 401, (ii) coordinator data agent 321 and media agent 144 are configured within pod 303, and (iii) some of the components of FIG. 3 are not shown here for simplicity, e.g., storage manager 340 including management database 346, command center server 350, and endpoint 351. Storage manager 340 may be configured within cloud computing environment 401 (but outside cluster 301) or outside cloud computing environment 401, without limitation. As before, the bold unidirectional arrows depict a logical view of data pathways originating at data source 312, to coordinator data agent 321, to media agent 144, and from there to secondary copies 116K within cluster 301 and/or to secondary copies 116C outside cluster 301. In the scenario depicted in the present figure, data agent 321 uses its coordinator features to determine that no additional data agents are required for the pending storage operation and therefore does not invoke any additional on-demand data agents. For a scenario where additional data agents are invoked on demand within cluster 301 see FIG. 5. For a scenario where additional data agents are invoked on demand from a separate infrastructure cluster see FIGS. 7A-7E.

Cloud computing environment 401 is a public cloud computing environment provided by a cloud computing system, e.g., Microsoft Azure, Amazon Web Services (AWS), Google Cloud, etc., without limitation; or a private cloud computing environment. Pod 303 is illustratively embodied as a Kubernetes pod that hosts containerized data agent 321 and containerized media agent 144 within the same pod, but in separate software containers. In some embodiments, data agent 321 and media agent 144 are deployed in distinct pods (not as shown here) within cluster 301. Pod 303 is distinct from another pod that hosts application 110. Cloud-native object storage 408 is a data storage resource(s) configured and operating within cloud computing environment 401 and outside cluster 301. Examples include Google Cloud Storage, Amazon Simple Storage Service (S3), etc. without limitation. Some of these cloud-native storage solutions may comprise tiers or classes that offer different levels of availability, performance, and pricing. Cloud-native object storage 408 hosts secondary copies 116C. Kubernetes-native storage 418 is a data storage resource(s) configured and operating within production cluster 301 and hosts secondary copies 116K. Secondary copies 116C and 116K may be implemented as alternative or as complementary solutions, without limitation. Secondary copies 116C and/or 116K may be replicated in other storage resources, without limitation.

Figure 5:
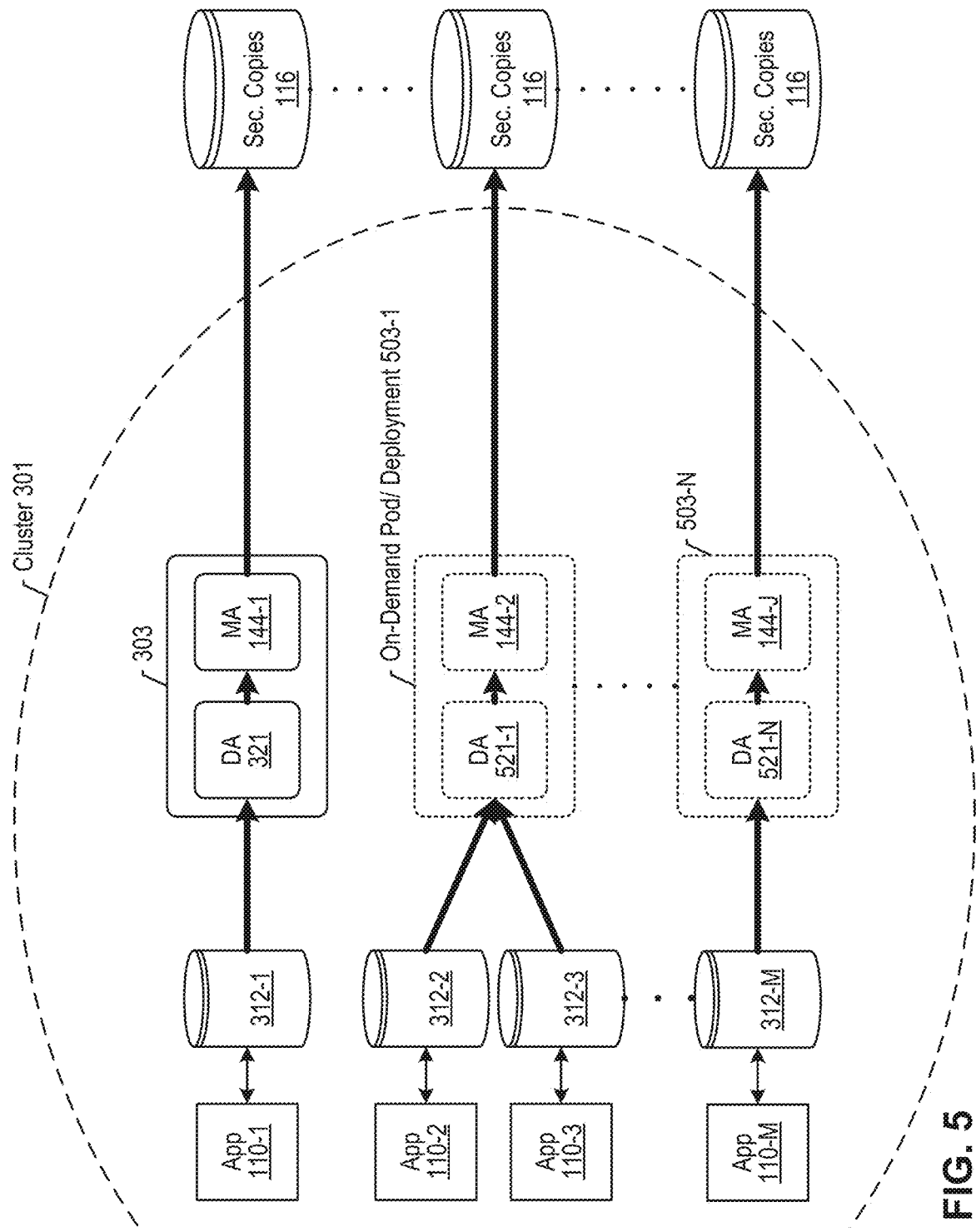

FIG. 5 is a block diagram illustrating automatic scaling of data protection resources in an application orchestrator computing environment, according to an example embodiment. This figure depicts an auto-scaling scenario within cluster 301 ("in-cluster auto-scale"). The present figure depicts a configuration similar to the one shown in FIG. 4, except that (i) cluster 301 comprises a plurality of on-demand pods 503 in addition to pod 303, each pod comprising a data agent 521 and a media agent 144, (ii) a pod is not limited to processing only one data source and some multiple data sources 312 (e.g., 312-2 and 312-3) are processed at the same pod (e.g., 503-1), and (iii) some of the components of FIG. 3 are not shown here for simplicity, e.g., storage manager 340 including management database 346, command center server 350, and endpoint 351. As before, a logical view of backup data pathways is shown by the bold unidirectional arrows originating at data sources 312 and terminating at secondary copies 116.

Data agent 321, as the "coordinator data agent," is configured to: (i) determine how many data agents are need for the present storage operation, which is typically, but not necessarily, initiated by storage manager 340; (ii) causes a number of additional data agents 521 (and preferably accompanying media agents 144 as shown here) to be deployed in pods 503 within cluster 301 on demand; (iii) assigns task(s) to itself as well as to the additional data agents 521; (iv) performs the assigned tasks; and (v) on completion of the storage operation, causes the additional data agents 521 and media agents 144 to be taken down and their host pods 503 to be dissolved. More details on the coordination role of data agent 321 are given in subsequent figures.

Pod 503 (e.g., 503-1 . . . 503-N) is illustratively embodied as a Kubernetes pod, which is distinct from pod 303, from other pods 503, if any, and from other pods that host applications 110 within cluster 301. Coordinator data agent 321 causes the pod 503 hosting data agent 521 to be dissolved when the storage operation ends, and as a result cluster 301 (e.g., using its control plane which is not shown here) may take down or disable pod 503 when it is no longer needed.

Data agents 521 (e.g., 521-1 . . . 521-N) are analogous to data agent 321 but they lack the coordinator role of data agent 321. In some embodiments, data agents 521 are identical to data agent 321, but do not use the coordinator features used by data agent 321, whereas in other embodiments data agents 521 lack the features for coordination that are configured in data agent 321. Data agents 521 are invoked on demand, based on a determination made by data agent 321. Data agent 521 is a data agent component of the illustrative data storage management system 300. In a Kubernetes cluster, data agent 521 is deployed as a containerized application in a Kubernetes pod 503. Data agent 521 is associated with data source 312, and depending on the type of data source or workload 312, data agent 521 is of a type suitable to back up and/or restore data from/to 312, e.g., virtual server agent (VSA), Office365 data agent, database-specific data agent (e.g., Oracle, etc.), etc., without limitation. Hereinafter, the terms "data source" and "workload" will be used interchangeably for simplicity. Any kind of data agent may be invoked as data agent 521, provided that it is of a type suitable to protect the corresponding data source 312. Data agent 521 obtains data from data source 312, processes and formats the data, and transmits the processed data to media agent 144 via one or more data streams 322. The number of data streams 322 need not be the same as the number of data sources 312 that are being operated upon (e.g., being backed up). Likewise, the number of data agents 521 need not be the same as the number of data sources 312. Each storage operation or job, e.g., as initiated by storage manager 340, may require a different number of on-demand data agents 521, a different number of media agents 144, and a different number of data streams 322, depending on administrative rules and parameters and further depending on scaling factors such as the examples discussed in FIG. 13. In some embodiments, cluster 301 may retain one or more pods 503 to re-use in a subsequent job, whether based on its own logic (e.g., in a component of a control plane, not shown here) or based on express instructions from coordinator data agent 321. See also block 912 of FIG. 9.

Figure 6:
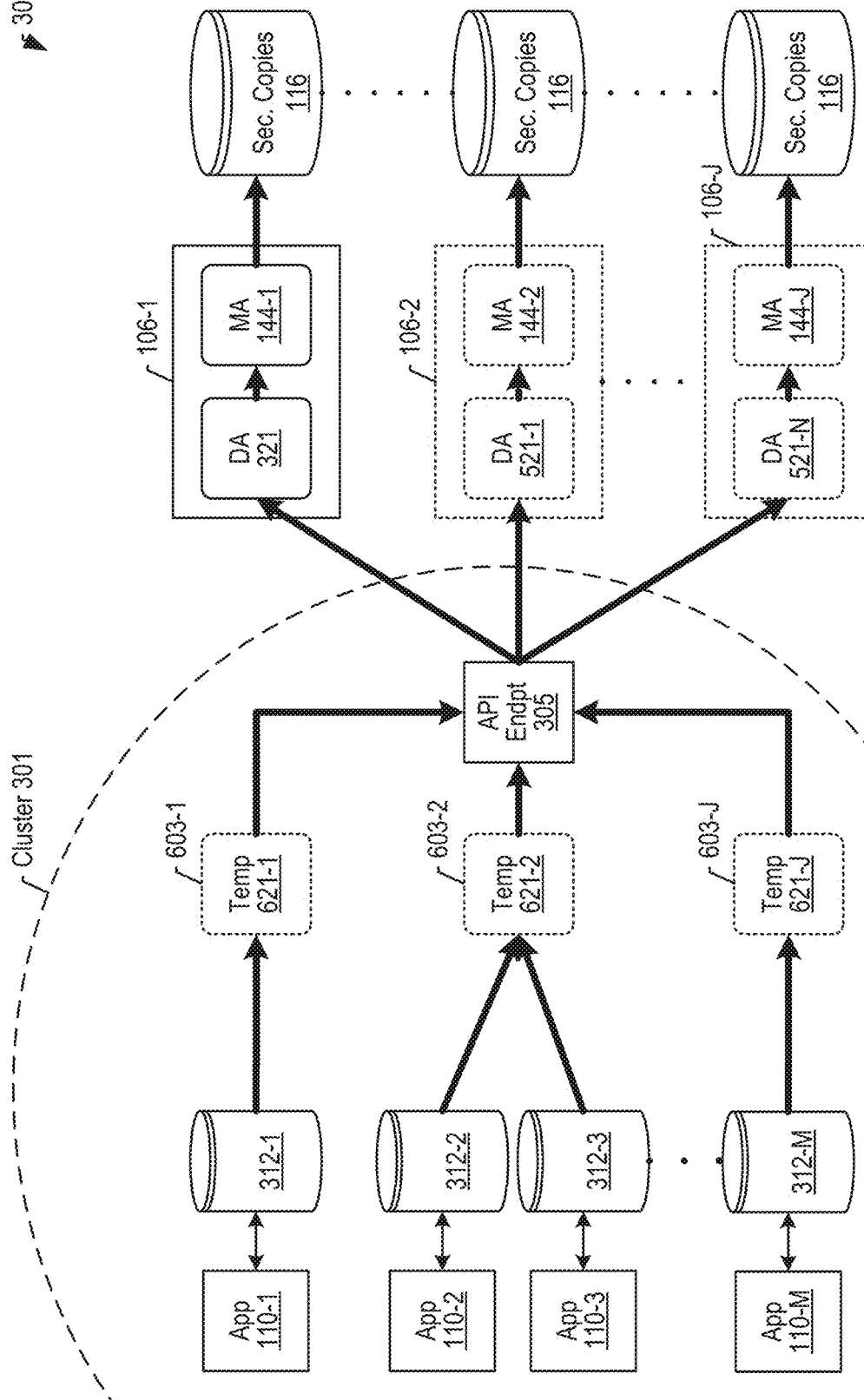

FIG. 6 is a block diagram illustrating automatic scaling of data protection resources in a configuration associated with an application orchestrator computing environment, according to an example embodiment. This figure depicts an auto-scaling scenario using data protection resources outside cluster 301, e.g., in a non-cloud data center. The present figure depicts a configuration similar to the one shown in FIG. 5, except that (i) auto-scaled data protection resources 321, 521, and 144 are hosted by secondary storage computing devices 106 outside of cluster 301, (ii) temporary pods 603, each comprising a data agent 621, are deployed within cluster 301 to access and extract data from data source 312 for backup, (iii) access into and out of cluster 301 is via API endpoint 305, and (iv) some of the components of FIG. 3 are not shown here for simplicity, e.g., storage manager 340 including management database 346, command center server 350, and endpoint 351. As before, a logical view of backup data pathways are shown by the bold unidirectional arrows originating at data sources 312 traveling via temporary data agent 621 and API endpoint 305 to a corresponding data agent (e.g., coordinator data agent 321 and/or on-demand data agent 521) to a media agent 144 and finally being stored as a secondary copy 116.

Pod 603 (e.g., 603-1, 603-2 . . . 603-J) is illustratively embodied as a Kubernetes pod that hosts a containerized data agent 621, which is invoked on a temporary basis in order to provide data agents outside of cluster 301 with access to data sources 312. Coordinator data agent 321 causes the pod 603 that hosts data agent 621 to be dissolved when the storage operation ends, and as a result cluster 301 (e.g., using its control plane not shown here) may take down, dissolve, and/or disable pod 603 when it is no longer needed. Data agents 621 (e.g., 621-1 . . . 621-J) are analogous to data agent 321/521 to the extent that they comprise the features needed to gain access to data source(s) 312 as instructed by a corresponding data agent 321/521 outside cluster 301. Thus, in some embodiments, data agents 621 lack some of the functionality of data agents 142, 321, and/or 521. Data agent(s) 621 are invoked on demand, based on a determination made by data agent 321. Data agent 621 is a data agent component of the illustrative data storage management system. Data agent 621 is deployed as a containerized application in a Kubernetes pod 603. Data agent 621 is associated with data source 312 and therefore is of a type suitable to access and extract data from data source 312. Access into and out of cluster 301 is by way of API endpoint 305, and access to data sources 312 is by way of a temporary data agent 621 operating in a pod 603. However, in some embodiments, a data source-specific method may be implemented where the external data agent 521 can directly connect to a corresponding data source 312 within cluster 301 and pull data from the data source without making use of temporary data agent 621.

Figure 7A:
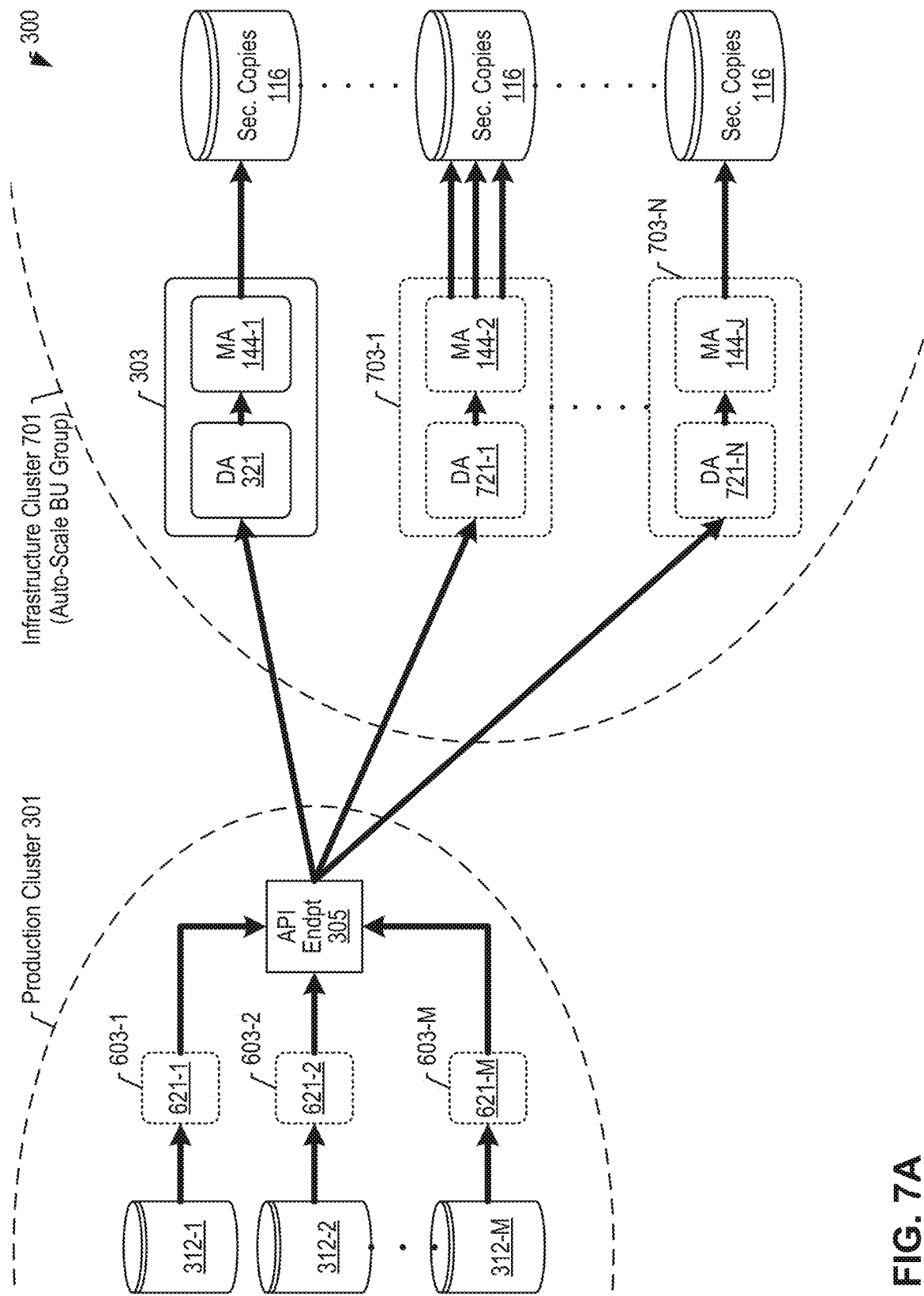
FIG. 7A is a block diagram illustrating a logical view of data paths when using an application orchestrator computing environment (infrastructure cluster) for deploying data protection resources needed for data generated in another application orchestrator computing environment (production cluster), according to another example embodiment.

FIG. 7A is a block diagram illustrating a logical view of data paths when using an application orchestrator computing environment ("infrastructure cluster") for deploying data protection resources needed for data generated in another application orchestrator computing environment (production cluster), according to another example embodiment. This figure depicts an auto-scaling scenario that uses an infrastructure cluster 701 that is separate from the production cluster 301 hosting data sources 312. The present figure depicts a configuration similar to the one shown in FIG. 6, except that (i) there are two distinct clusters, 301 and 701; (ii) cluster 301 is a "production cluster" that comprises data sources 312 and temporary data agents 621, (iii) a separate cluster 701 operates as an "infrastructure cluster" that comprises a plurality of on-demand pods 703 comprising data agents 721 and on-demand media agents 144, and (iv) some of the components of FIG. 3 are not shown here for simplicity, e.g., storage manager 340 including management database 346, command center server 350, and endpoint 351. As before, a logical view of backup data pathways is shown by the bold unidirectional arrows originating at data sources 312 and terminating at secondary copies 116.

Data agent 321, as the "coordinator data agent," is configured to: (i) determine how many data agents are need for the present storage operation, which is typically, but not necessarily, initiated by storage manager 340; (ii) cause a number of additional pods 703 to deployed within infrastructure cluster 701, each one preferably comprising data agent 721 and media agent 144; (iii) cause a number of temporary data agents 621 to be deployed in pods 603 within cluster 301; (iv) assign task(s) to itself as well as to the additional data agents 721; (v) perform the assigned tasks; and (vi) on completion of the storage operation, cause pods 603 and 703 to be dissolved. More details on the coordination role of data agent 321 are given in subsequent figures. As in FIG. 6, access into and out of cluster 301 is by way of API endpoint 305, and access to data sources 312 is by way of a temporary data agent 621 operating in a pod 603. However, in some embodiments, a data source-specific method may be implemented where the external data agent 721 can directly connect to a corresponding data source 312 within cluster 301 and pull data from the data source without making use of temporary data agent 621.

Figure 7B:
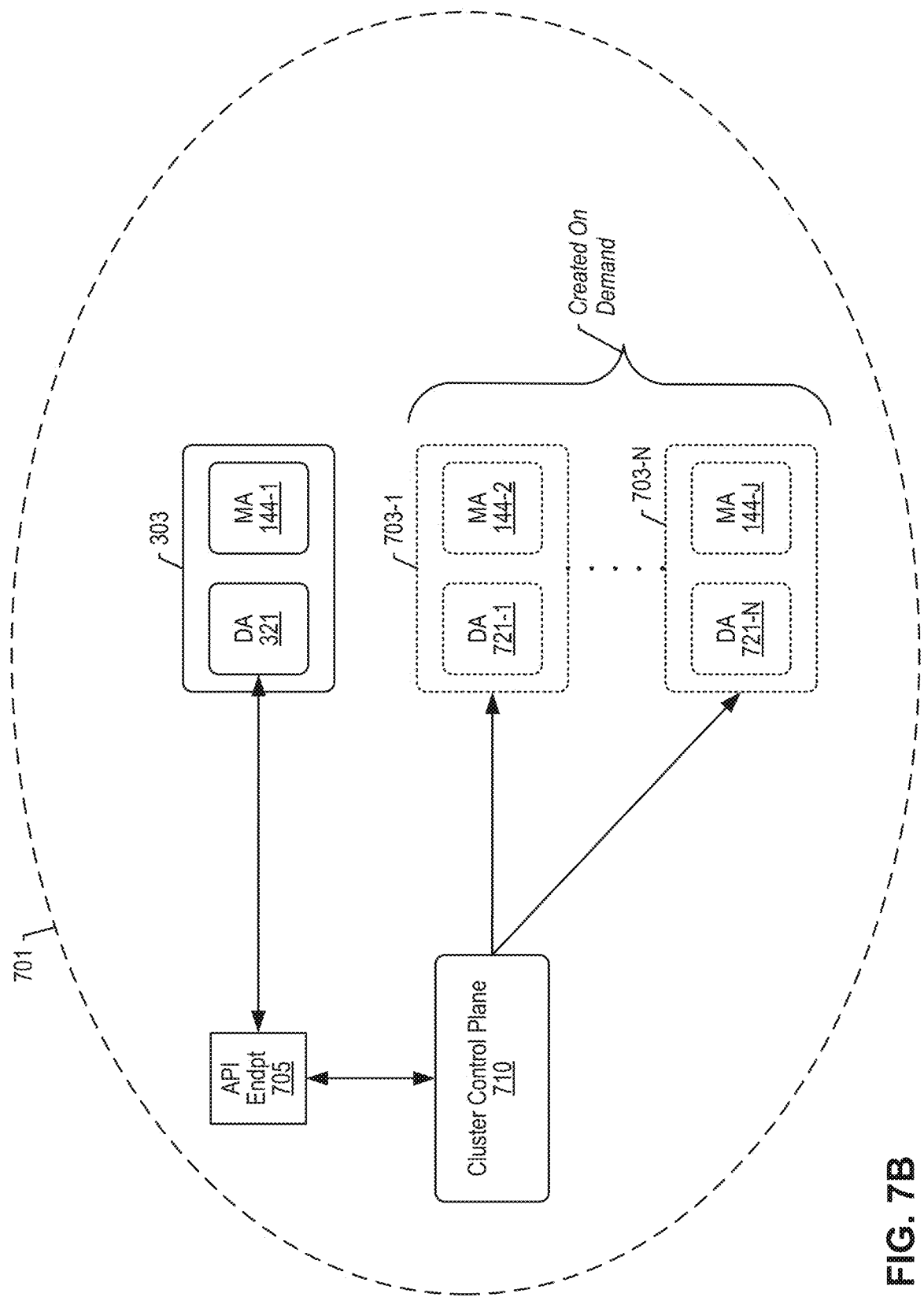
FIG. 7B is a block diagram illustrating some salient portions of the infrastructure cluster of FIG. 7A.

In the depicted scenario, the illustrative data storage management system 300 creates and maintains a separate infrastructure cluster 701 that operates outside of the production cluster 301, which comprises the data sources 312. The infrastructure cluster 701 operates within the same computing environment as the production cluster, e.g., within the same cloud computing account. The coordinator data agent 321, after determining that it needs additional data agents for the present job, requests and/or instigates these additional resources from the infrastructure cluster, e.g., by communicating with a control plane of cluster 701 as shown in FIG. 7B. The infrastructure cluster 701 can deploy any number of pods 703 populated with data agents 721 and/or media agents 144 and can increment and decrement their number as requested. The auto-scale logic for determining when, whether, and how many additional data agents are needed remains in the coordinator data agent 321. As with the in-cluster embodiments described in FIG. 5, the coordinator data agent 321 distributes backup tasks to the additional data agents, and in some cases also to itself, in order to execute the pending storage operation. Embodiments that employ the infrastructure cluster 701 are able to use its on-demand data protection resources to service any number of production clusters without limitation, as contrasted with the in-cluster configuration in which the additional data agents can service only data sources within the same cluster.

Application orchestrator cluster 701 (a/k/a "infrastructure cluster" or "auto-scale backup group") executes within an application orchestrator computing environment (or container-orchestration system) preferably the same as cluster 301, e.g., Linode Kubernetes Engine (LKE), Google Kubernetes Engine (GKE), Azure Kubernetes Service (AKS), Amazon Web Services Elastic Kubernetes Service (EKS), etc., without limitation. Cluster 701 may be deployed in a cloud computing environment such as Google Cloud Platform (GCP) or in a non-cloud "on-premises" data center setting, without limitation, preferably the same as cluster 301. A preferred embodiment of cluster 701 is a Kubernetes cluster. Cluster 701 comprises a plurality of nodes and a control plane (not shown in this figure, but see FIG. 7B).

Pod 703 (e.g., 703-1 ... 703-N) is illustratively embodied as a Kubernetes pod that hosts containerized data agent 721 and containerized media agent 144. Each storage operation or job, typically initiated by storage manager 340, may require a different number of on-demand data agents (e.g., 721), a different number of media agents 144, and a different number of data streams 322, depending on administrative rules and parameters and further depending on scaling factors such as the examples shown in FIG. 13. Data agents 721 (e.g., 721-1 ... 721-N) are analogous to data agent 521 to the extent that they comprise the features needed to gain access to data source(s) 312 and/or corresponding data agents 621 as instructed by a data agent 321 in infrastructure cluster 701. Thus, in some embodiments, data agents 721 lack some of the functionality of data agents 142 and/or 321. Data agent(s) 721 are invoked on demand, based on a determination made by data agent 321. Data agent 721 is a data agent component of the illustrative data storage management system 300. In a Kubernetes cluster, data agent 721 is deployed as a containerized application in a Kubernetes pod 703. Data agent 721 is associated with data source 312 and therefore is of a type suitable to access and/or extract and/or process data source 312.

FIG. 7B is a block diagram illustrating some salient portions of infrastructure cluster 701 of FIG. 7A, including: pod 303 hosting data agent 321 and media agent 144-1; on-demand pods 703 each one hosting a data agent 721 and media agent 144; API endpoint 705; and cluster control plane 710. In the scenario depicted here, coordinator data agent 321 needs to invoke additional data protection resources for a pending job, e.g., data agent(s) 721 and media agent(s) 144. To do so, coordinator data agent 321 gains access to cluster control plane 710 via API endpoint 705 to request that additional pods 703 be instantiated each one hosting a data agent 721 and media agent 144. Control plane 710 handles a multitude of services for cluster 701 according to the Kubernetes model. In some embodiments, API endpoint 705 is part of control plane 710, but is shown here separately to ease the reader's understanding of the present disclosure. Control plane 710 may provide services using one or more master nodes that provide: communications and coordination among cluster components, a cluster store, a controller manager, a scheduler, a cloud controller manager, etc. Kubernetes control planes are well known in the art. In the present embodiment, control plane 710 receives instructions or requests from coordinator data agent 321 in cluster 701. The instructions or requests pertain to on-demand data protection resources such as data agents 721 and media agents 144. For example, coordinator data agent 321 may request a number of on-demand data agents 721 from control plane 710. The request may comprise a configuration file (e.g., YAML file 804) to be used as a template by control plane 710 for each data agent 721 and/or media agent 144 to be added to cluster 701. In response, control plane 710 may deploy a pod 703 populated with the data agent 721 and media agent 144 per the YAML file. After the storage operation ends, coordinator data agent 321 requests control plane 710 to take down or deactivate the on-demand resources and/or their host pod 703. Control plane 710 complies. In some embodiments, infrastructure cluster 701 may retain one or more pods 703 and/or data agents 721 and/or media agents 144 to re-use in a subsequent job, whether based on its own logic or based on express instructions from coordinator data agent 321.

Figure 7C:
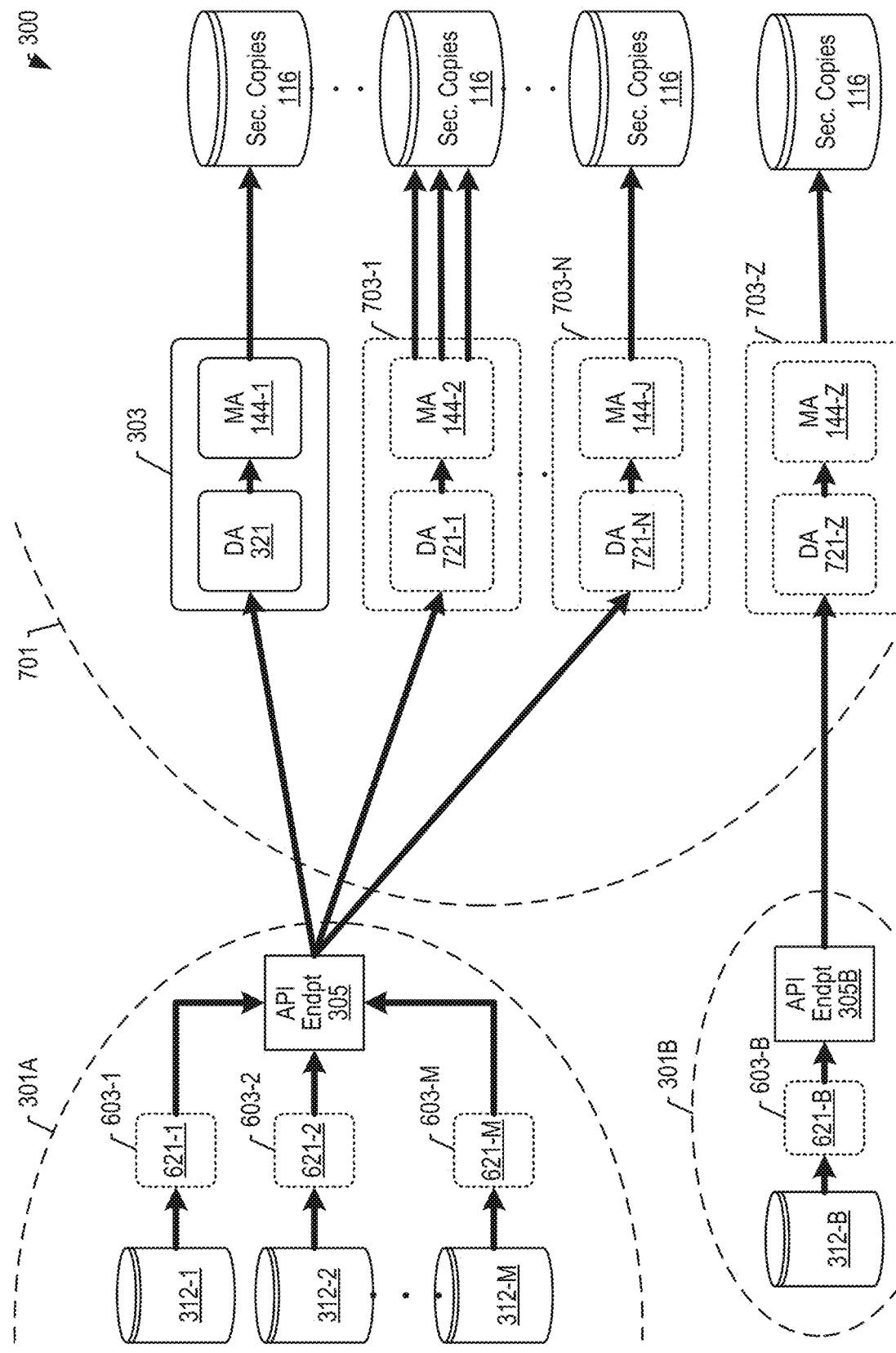
FIG. 7C is a block diagram illustrating an infrastructure cluster 701 interoperating with a plurality of production clusters 301.

FIG. 7C is a block diagram illustrating an infrastructure cluster 701 interoperating with a plurality of production clusters 301, e.g., 301A, 301B. As before, some of the components of FIG. 3 are not shown here for simplicity, e.g., storage manager 340, management database 346, command center server 350, and endpoint 351. The present figure is similar to FIG. 7A, except that: more than one production cluster 301 is served by data protection resources deployed in infrastructure cluster 701. Thus, in addition to the elements depicted in FIG. 7A, the present figure depicts: production cluster 301B comprising data source 312-B, API endpoint 305B, and temporary data agent 621-B hosted by pod 603-B; and pod 703-Z deployed in infrastructure cluster 701 hosting on-demand data agent 721-Z and on-demand media agent 144-Z, which are associated with cluster 301B. The auto-scale logic for determining when, whether, and how many additional data agents are needed remains in the coordinator data agents 321.

Infrastructure cluster 701 will protect data in different kinds of production clusters 301 (i.e., where the applications 110 and/or workloads generate different kinds of data sources 312) by deploying backup resources suitable to the data source. The illustrative data storage management system 300 intelligently creates and deploys configuration (e.g., YAML) files that act as templates for data agent and media agent containers in the on-demand pods 703. Thus, even if the coordinator data agent 321 is of a type unsuitable to the production data source 312, it can invoke on-demand data agents 621/721 of a type that is suitable, because the auto-scale functionality of the coordinator data agent is independent of data source types. Accordingly, the disclosed auto-scale approach may be applied to a variety of data source and computing environments protected by the illustrative data storage management system 300. Furthermore, the production clusters need not be or comprise application orchestrator or container-orchestration platforms. For example, a production cluster may be a virtual machine farm implemented as a VMWare VCenter; a cloud-based database-as-a-service (DBaaS); a cloud-based office productivity suite such as Microsoft Office 365; another non-Kubernetes cloud-based data source/application; etc., without limitation. Examples of how an infrastructure cluster 701 may protect non-Kubernetes production clusters are given in FIGS. 7D and 7E.

Figure 7D:
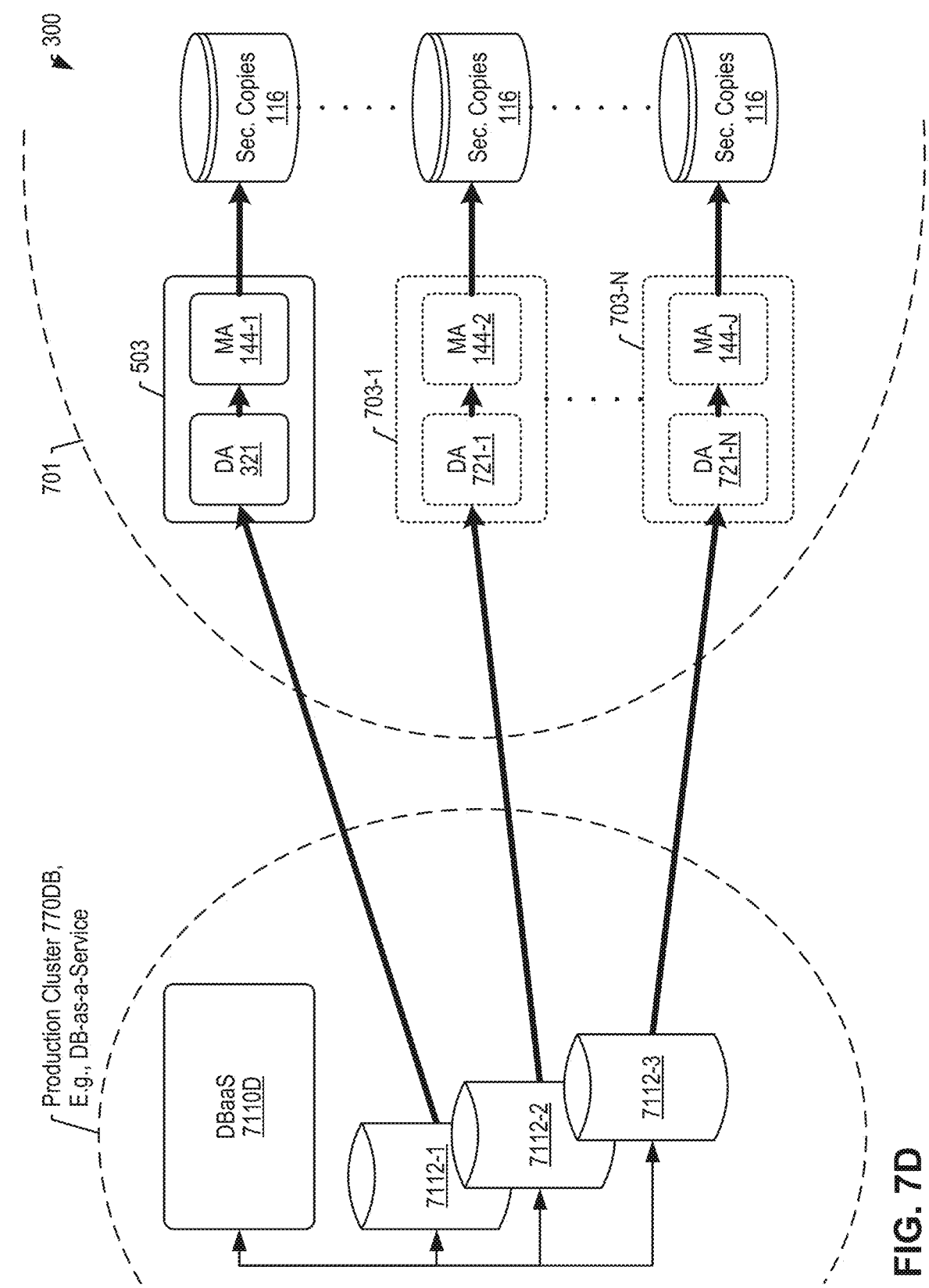
FIGS. 7D-7E depict block diagrams of an infrastructure cluster 701 interoperating with example production clusters that are not application orchestrator/Kubernetes deployments.
Figure 7E:
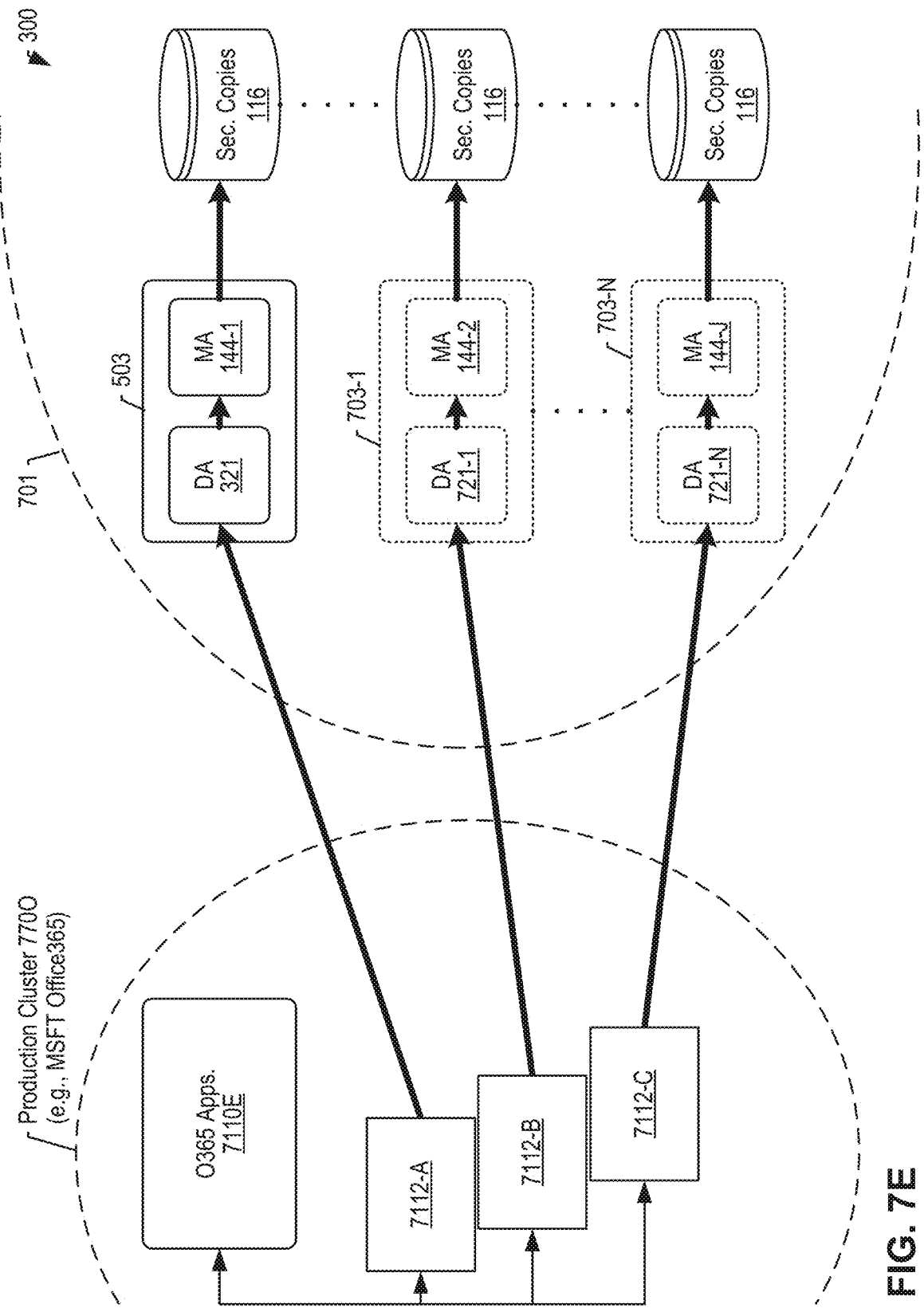

FIGS. 7D-7E depict block diagrams of an infrastructure cluster 701 interoperating with example production clusters 770 that are not application orchestrator/Kubernetes deployments. While each such production cluster will have its own configuration, unique to its own particular deployment, the present disclosure will refer generally to an other-than-Kubernetes cluster as production cluster 770. FIG. 7D depicts, according to an illustrative embodiment, a block diagram of infrastructure cluster 701 interoperating with a production cluster 770DB that comprises a database-as-a-service deployment, which is not an application orchestrator/Kubernetes deployment. The present figure depicts: secondary copies 116, which may be stored within or outside infrastructure cluster 701, without limitation; infrastructure cluster 701 comprising pod 503 and any number of on-demand pods 703; production cluster 770DB comprising a database-as-a-service (DBaaS) 7110D and database data sources 7112-1, 7112-2, and 7112-3. Data agents 321 and 721 obtain access to the data sources 7112, process the source data, and transmit it to media agents 144, which generate and store secondary copies 116. Storage policies govern what processing and storage choices are applied. FIG. 7E depicts, according to an illustrative embodiment, a block diagram of infrastructure cluster 701 interoperating with a production cluster 770O that comprises an office productivity suite deployment (e.g., Microsoft Office 365), which is not an application orchestrator/Kubernetes deployment. The present figure depicts: secondary copies 116, which may be stored within or outside infrastructure cluster 701, without limitation; infrastructure cluster 701 comprising pod 503 and any number of on-demand pods 703; production cluster 770O comprising Office 365 applications 7110E and data sources 7112-A, 7112-B, and 7112-C. Data agents 321 and 721 obtain access to the data sources 7112, process the source data, and transmit it to media agents 144, which generate and store secondary copies 116. Storage policies govern what processing and storage choices are applied. As before, the auto-scale logic for determining when, whether, and how many additional data agents 721 are needed remains in the coordinator data agent 321. Coordinator data agent 321 distributes backup tasks to the additional data agents 721, and in some cases also to itself, in order to execute the pending storage operation.

Figure 8:
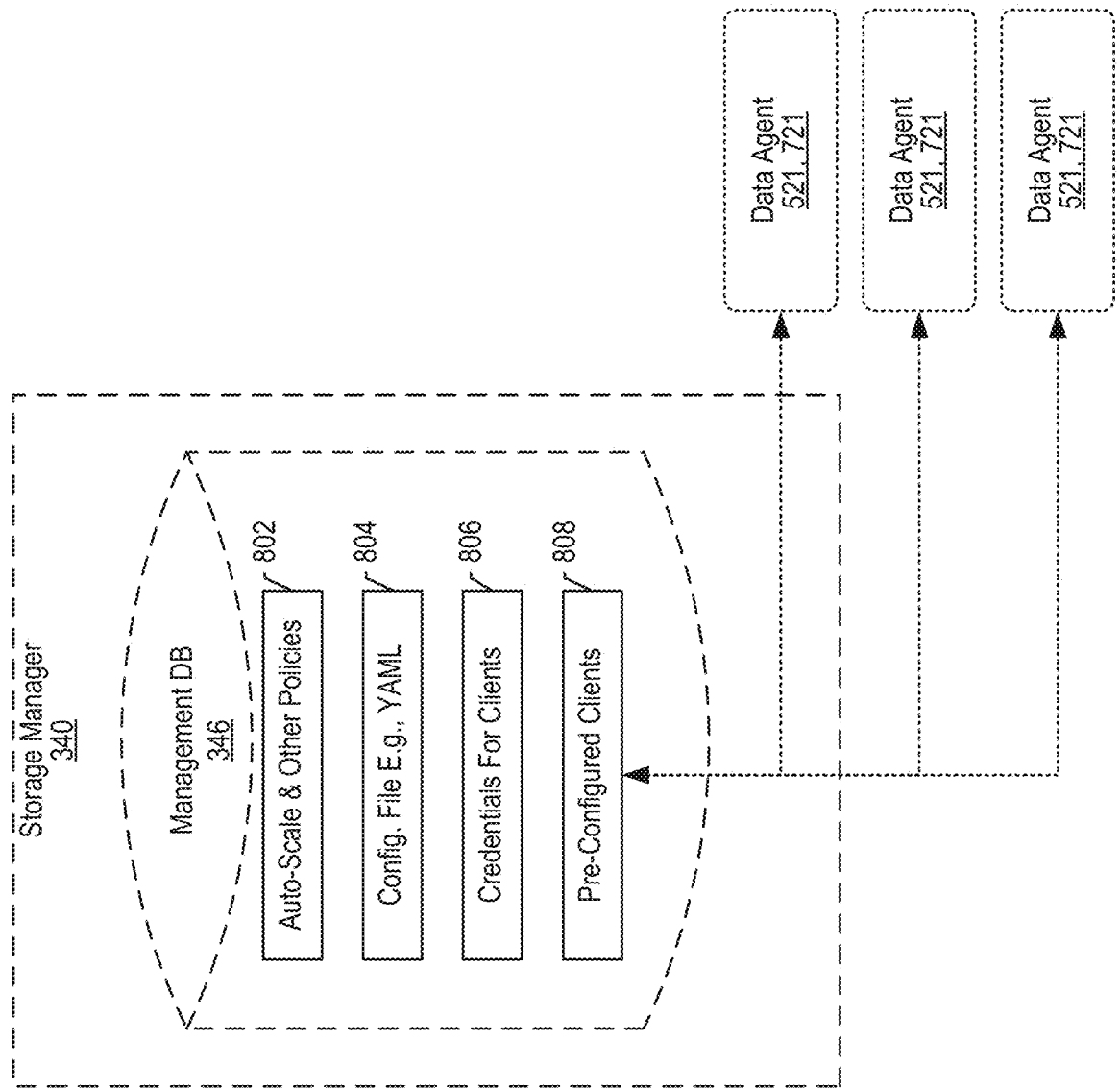
FIG. 8 is a block diagram illustrating a logical view of salient information maintained at a management database of a storage manager of a data storage management system, according to an illustrative embodiment.

FIG. 8 is a block diagram illustrating a logical view of salient information maintained at a management database 346 of a storage manager 340 of data storage management system 300, according to an illustrative embodiment. The present figure depicts storage manager 340, which logically comprises management database 346, which comprises information illustratively organized as data structures 802, 804, 806, and 808.

Data structure 802 comprises one or more auto-scale and other policies that govern cluster(s) 301. For example, when a cluster 301 is auto-scale enabled through administrative options (see, e.g., screenshot example in FIG. 14C), the auto-scale enablement is stored here. When storage manager 340 initiates a storage operation (e.g., backup, archive, replicate, restore, etc.) involving coordinator data agent 321, storage manager 340 informs the coordinator data agent that auto-scale is enabled for the subject cluster 301. Data structure 804 comprises one or more configuration files that act as templates for instantiating and containerizing on-demand data agents 521/621/721. In a Kubernetes environment, the template file is written in YAML, which is a data serialization language. YAML is well known in the art, and the invention is not limited to YAML configuration files. Data structure 806 comprises credentials, such as signed security certificates that are pre-configured and signed by storage manager 340 in support of auto-scale enabled clusters 301.

Data structure 808 comprises a plurality of pre-configured client entities (a/k/a "phantom clients"). The illustrative data storage management system 300 is further enhanced to minimize bursty and unpredictable processing loads on the storage manager caused by deploying on-demand data agents. Accordingly, system 300 detects and acts when a production cluster is administered for "auto-scale." On detecting auto-scale enablement in configuration settings, the system (e.g., using storage manager 340) automatically pre-configures any number of "client entities," i.e., creates configuration information prior to on-demand data agents being deployed. For the moment, they are administered "phantom clients" created by storage manager 340 and maintained in management database 346. The storage manager 340 creates, signs, and assigns a security certificate and a unique client ID (e.g., 806) for each phantom client before any of the additional data agents are instantiated and deployed. The storage manager 340 performs these pre-configuration operations at a time separate from launching the storage operation, presumably a time of reduced processing load when it has plenty of cycles to handle the client creation and security settings. When the storage operation is initiated and the additional data agents 521/721 are instantiated, each additional data agent must register as a client with storage manager 340. In some embodiments data agents 621 also must register as clients, but in other embodiments they operate under the control of coordinator data agent 321 and/or data agent 521/721 and are not directly visible to storage manager 340 and thus need not register as distinct clients therewith. Registration is a realtime operation. In embodiments where the phantom clients were pre-configured at the storage manager, the registration is much faster, as the storage manager assigns a pre-existing signed security certificate and client ID (e.g., 806) to each on-demand data agent rather than going through the more laborious client creation process. Once registered, each on-demand data agent is ready to assume the responsibilities and/or tasks assigned to it by the coordinator data agent. When the coordinator data agent tears down the additional pods comprising the on-demand data agents, the client IDs revert to the storage manager for re-use in a later storage operation.

Figure 9:
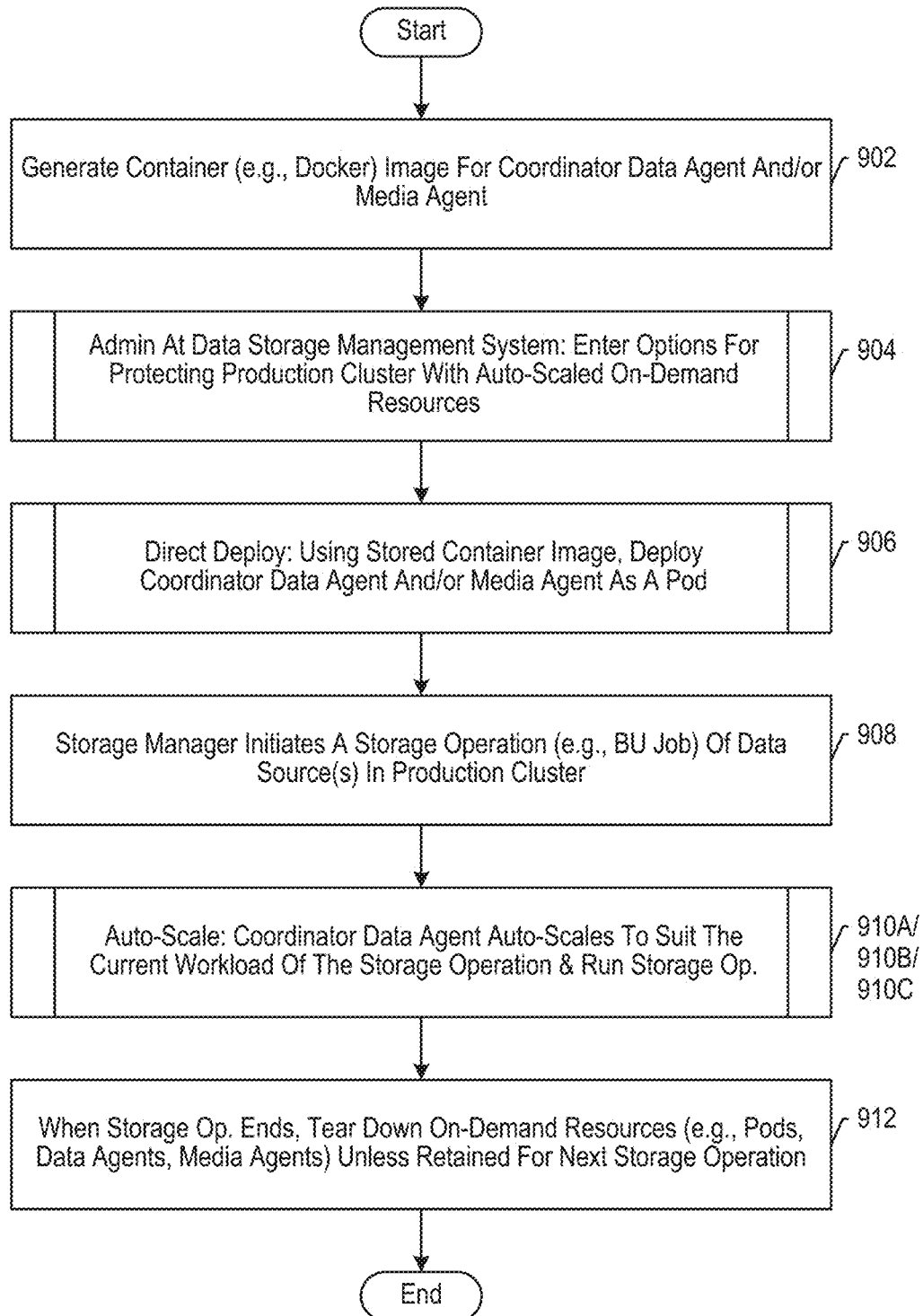
FIG. 9 depicts some salient operations of a method 900 according to an illustrative embodiment.

FIG. 9 depicts some salient operations of a method 900 according to an illustrative embodiment. Method 900 is performed by the illustrative data storage management system 300 and components thereof, unless otherwise stated. Unless otherwise noted in the subsequent figures, operations, actions, features, and/or configurations that apply to production cluster 301 also apply to production cluster 770 (e.g., 770DB, 770O). Therefore, for simplicity, production cluster 770 will not be called out as a rule in this and the subsequent figures, except to distinguish it from production cluster 301.

At block 902, a container (e.g., Docker) image for data agent 321, e.g., virtual server agent (VSA), is created. The container image is pushed to a public registry and/or saved at storage manager 340. Regardless of the type of data agent, the image must comprise the coordination functionality disclosed herein so that data agent 321 may operate in its coordinator role even if it does not take on any storage operation tasks for itself. At block 904, system 300 receives data entries from a system administrator (e.g., using endpoint 351 via command center server 350) that includes options for protecting data in production cluster 301 using auto-scaled on-demand protection resources. More details are given in a subsequent figure. At block 906, system 300 deploys coordinator data agent 321. Illustratively, using the stored container image, storage manager 340 deploys coordinator data agent 321 as a pod within a production cluster 301, or in other embodiments within an infrastructure cluster 701. More details are given in a subsequent figure. At block 908, system 300 (e.g., using storage manager 340) initiates a storage operation of data source(s) 312 in production cluster 301. This comprises notifying coordinator data agent 321 of the storage operation and may further include notifying agent 321 that cluster 301 is enabled for auto-scale. This may further comprise designating data agent 321 as the coordinator data agent and notifying agent 321 that it has been so designated. As a result, data agent 321 takes on the auto-scale coordinator role as described in more detail herein. The examples herein disclose a backup job as the storage operation, but the invention is not limited to backup jobs; thus archiving, replication, and/or restore jobs may be executed as the auto-scaled storage operation, without limitation. In some embodiments, block 906 is triggered by block 908, i.e., the initial deployment of data agent 321 is triggered by the first storage operation being initiated for production cluster 301. In other embodiments, block 906 is triggered by the completion of block 904, which establishes the administrative settings, and thus deployment of coordinator data agent 321 and/or it accompanying media agent 144 does not wait for the storage operation to be initiated.

At block 910A/910B/910C, system 300 (e.g., using coordinator data agent 321) auto-scales to suit the present data source. More details are given in FIGS. 12A-12C. At block 912, which occurs after the storage operation (e.g., backup job) that was initiated at block 908 completes, system 300 (e.g., using coordinator data agent 321) causes the on-demand data protection resources and/or the pods hosting them to be taken down or deactivated. Accordingly, coordinator data agent 321 requests and/or instructs the teardown of these resources by communicating accordingly with the control plane of production cluster 301 and/or the control plane of infrastructure cluster 701. As a result, the on-demand agents and their host pods are deactivated within their respective cluster. In some embodiments, coordinator data agent 321 is aware of another pending storage operation for data sources in the production cluster and consequently retains some or all of the on-demand data protection resources for the pending operation. In some embodiments, infrastructure cluster 701 (e.g., its control plane) is aware of other requests for on-demand data agents 721, and by way of its control plane 710, may retain one or more pods 703 and containerized agents 721/144 therein as appropriate to the pending request. Method 900 ends here.

Figure 10A:
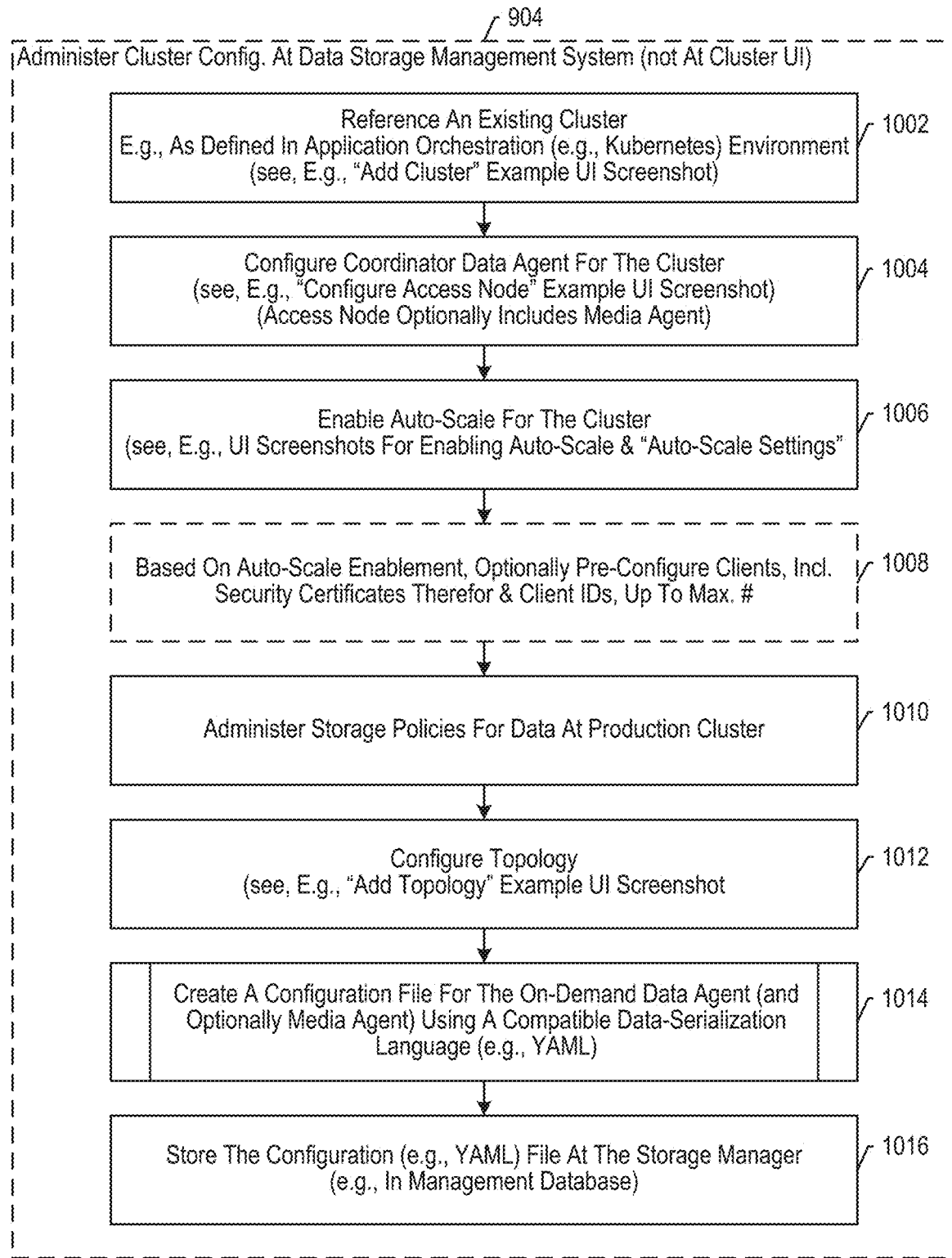
FIG. 10A depicts some salient operations of block 904 of method 900 according to an illustrative embodiment.

FIG. 10A depicts some salient operations of block 904 of method 900 according to an illustrative embodiment. Block 904 is generally directed at administering configuration information for production cluster 301 at the data storage management system 300—not at the cluster's user interface, i.e., not in the Kubernetes environment. In other words, this operation pre-supposes that cluster 301 is already in existence in its computing environment. Likewise, for production cluster 770, the administration operations occur at system 300 not at the cluster's native interface. Illustratively, an administrator at endpoint 351 uses a GUI presented by command center server 350 to make the entries. Storage manager 340 intakes and processes the entries and stores the information in management database 346.

At block 1002, an existing cluster as defined in the application orchestration (e.g., Kubernetes) computing environment, e.g., cluster 301, is referenced and "added" as an entity recognized by data storage management system 300. See, e.g., "Add cluster" example UI screenshot in FIG. 14A. Likewise for other-than-Kubernetes production cluster 770. At block 1004, coordinator data agent 321 is administered for production cluster 301. See, e.g., "Configure Access Node" example UI screenshot in FIG. 14B. As noted earlier, the "access node" refers to a unit of system 300 (e.g., a host of data agent and media agent), not to a Kubernetes node deployment. At block 1006, auto-scale is enabled for production cluster 301. See, e.g., UI screenshots for enabling auto-scale (FIG. 14C) and establishing "auto-scale settings" (FIG. 14D). At block 1008, which is implemented in some embodiments, system 300 pre-configures "phantom clients" as explained in regard to data structures 806 and 808. This may be triggered by the completion of block 1006, i.e., auto-scale enablement. In some embodiments, a maximum number of phantom clients is pre-configured here. If the auto-scale feature ultimately requires more on-demand data agents than this pre-configured maximum, more clients will be created in realtime as needed. At block 1010, additional data entries define policies (e.g., 148, 802) for cluster 301 that specify scheduling, retention, media agents, data stream counts, secondary storage targets, etc. Here, system 300 creates new and/or modifies existing policies for data sources 312 in cluster 301. At block 1012, system 300 configures topology, such as indicating that a gateway proxy might be configured in relation to cluster 301, storage manager 340, and/or cluster 701, as appropriate. See, e.g., "Add Topology" example UI screenshot in FIG. 14E.

At block 1014, data storage management system 300, e.g., using storage manager 340 or a separate toolset, creates one or more configuration files (e.g., 804) that act as templates for instantiating and containerizing on-demand data agents 521/621/721. In a Kubernetes environment, the configuration file is written in YAML, which is a data serialization language. More details on block 1014 are given in a subsequent figure. At block 1016, the system (e.g., using storage manager 340) stores the configuration file (e.g., YAML file 804) at the storage manager, e.g., in management database 346.

Figure 10B:
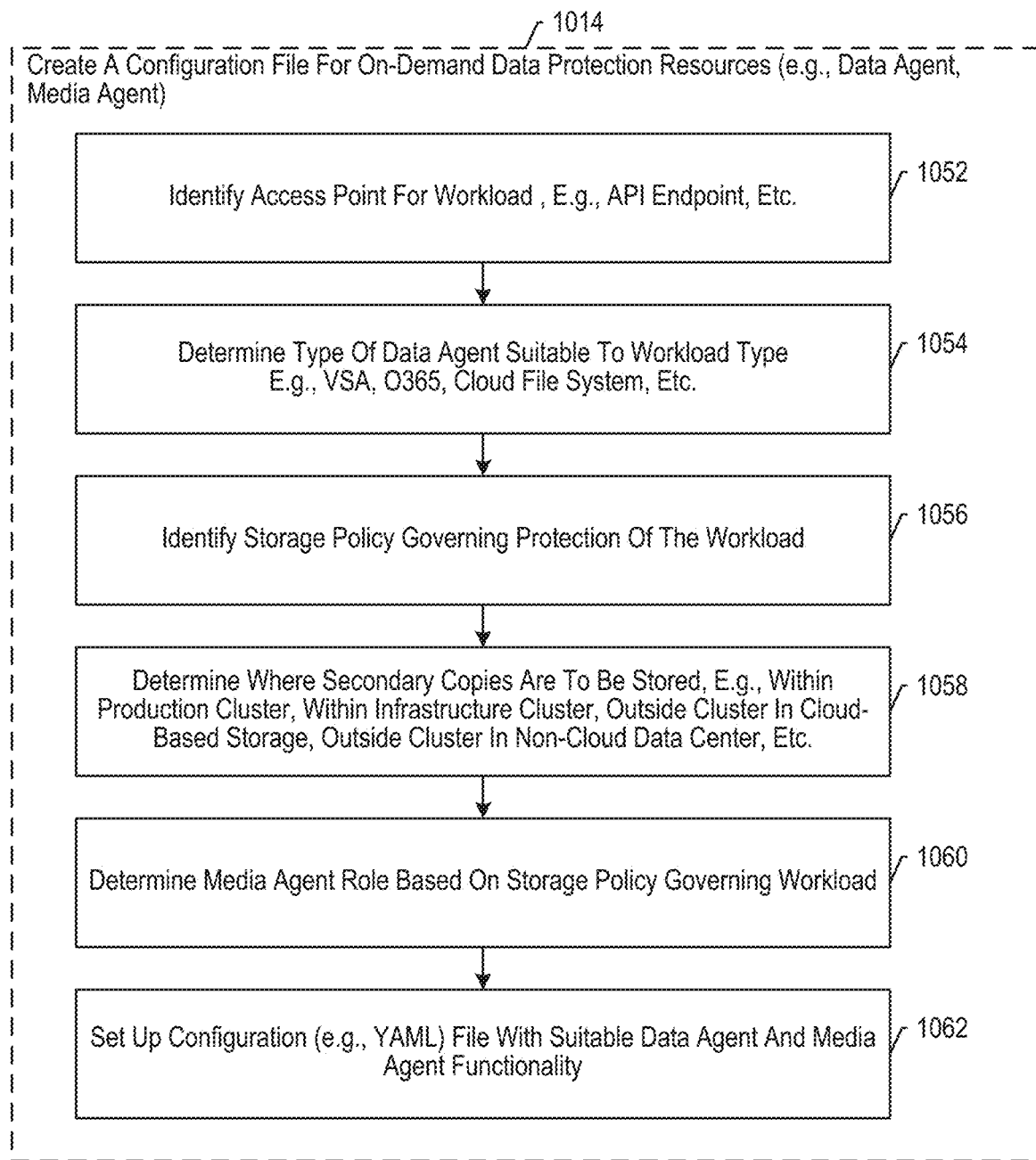
FIG. 10B depicts some salient operations of block 1014 of block 904 in method 900 according to an illustrative embodiment.

FIG. 10B depicts some salient operations of block 1014 of block 904 in method 900 according to an illustrative embodiment. Block 1014 is generally directed to creating, e.g., by storage manager 340, one or more configuration files 804 as templates for on-demand data protection resources, e.g., data agents 521/621/721 and/or media agent 144. At block 1052, system 300 (e.g., using storage manager 340) identifies an access point for the data source, e.g., API endpoint 305, etc. as appropriate to the production environment. At block 1054, system 300 (e.g., using storage manager 340) determines a type of data agent suitable to the type of data source, e.g., VSA, O365 data agent, DBaaS-specific data agent, cloud file system data agent, etc. At block 1056, system 300 (e.g., using storage manager 340) identifies a storage policy governing protection of the data source, which will includes preferences and parameters governing how the data source is to be protected and when. At block 1058, system 300 (e.g., using storage manager 340) determines where secondary copies 116 are to be stored, e.g., within production cluster 301, within infrastructure cluster 701, outside cluster in cloud-based storage, outside cluster in non-cloud data center, etc. At block 1060, system 300 (e.g., using storage manager 340) determines a role for the media agent 144, based on the storage policy governing the data source. For example, whether the media agent will save secondary copies 116 to traditional media, e.g., disk, tape, etc.; whether the media agent will save secondary copies 116 to a particular cloud-native storage service and/or to a Kubernetes-native storage configuration; and/or whether the media agent will invoke the making of snapshots by the storage platform rather than the media agent generating secondary copies 116. The role may affect which executable features (e.g., APIs) are included in the media agent template. At block 1062, system 300 (e.g., using storage manager 340) creates the configuration file 804 with the data agent and/or media agent functionality suitable to the data source. There is no limit on how many different configuration files 804 system 300 may create and maintain in management database 346.

Figure 11:
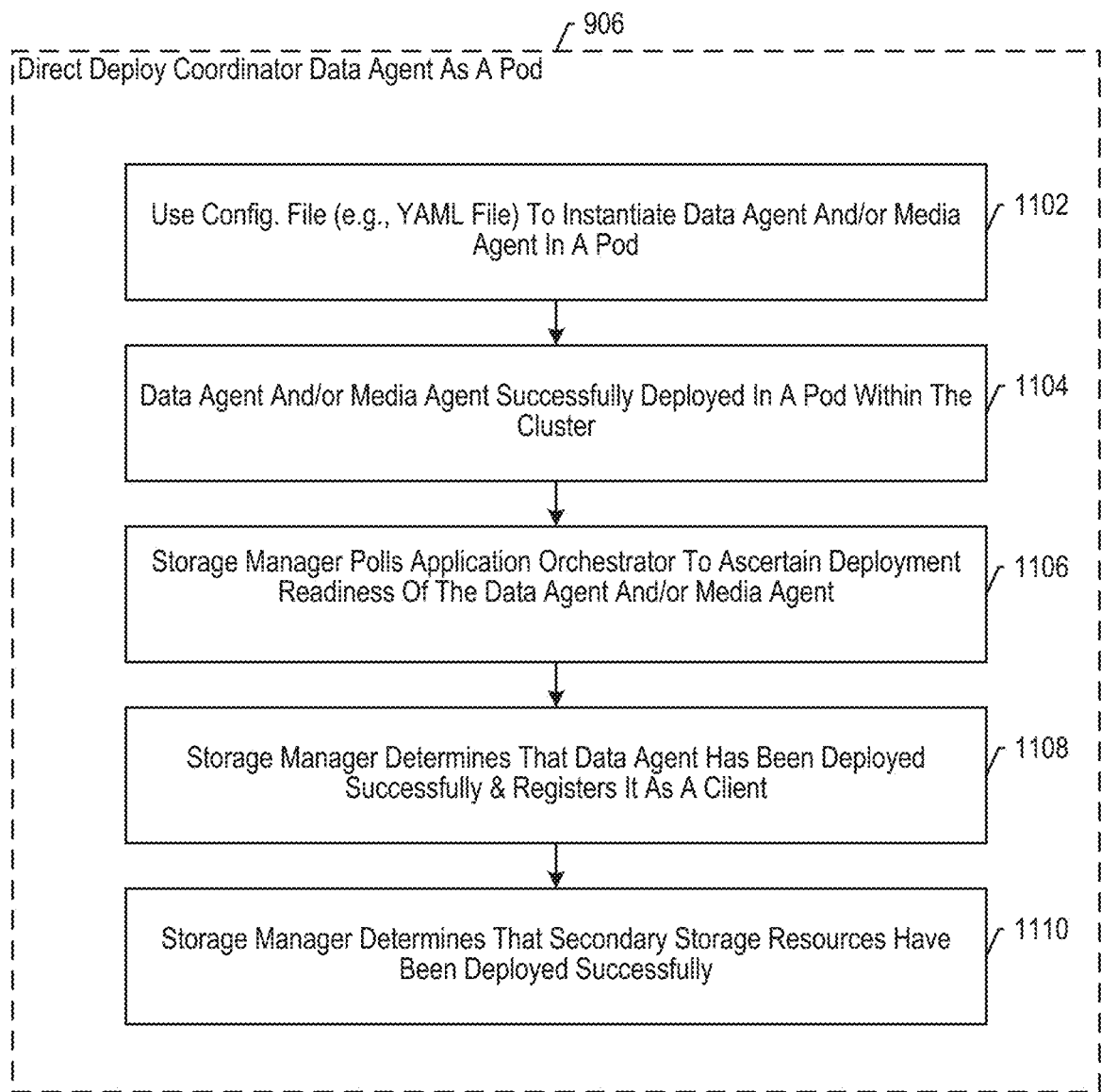
FIG. 11 depicts some salient operations of block 906 of method 900 according to an illustrative embodiment.

FIG. 11 depicts some salient operations of block 906 of method 900 according to an illustrative embodiment. Block 906 is generally directed at deploying coordinator data agent 321 as a containerized application in a pod of cluster 301 or cluster 701. At block 1102, the system (e.g., using storage manager 340) submits configuration file (e.g., YAML file) 804 to cluster 301/701 so that coordinator data agent 321 is deployed in a pod therein, e.g., 303. In a Kubernetes deployment, the YAML file 804 is submitted or "posted" to a RESTful API exposed by API endpoint 305. The YAML file (or "manifesto") 804 describes the desired state of the data agent 321 as an application, which comprises which container image to use (see, e.g., block 902), which ports to expose, etc. This YAML file indicates that the container image of data agent 321 is the one to deploy in cluster 301/701. On receiving the YAML file 804, cluster 301/701 (e.g., using its cluster control plane, e.g., 710) creates a pod 303 that executes data agent 321 and/or media agent 144, according to the preferred embodiment. At block 1104, on completion of block 1102, data agent 321 has successfully deployed in a pod within production cluster 301.

At block 1106, the system (e.g., using storage manager 340) polls the application orchestrator (e.g., communicating with the cluster control plane) to ascertain the deployment readiness of data agent 321 and/or media agent 144. At block 1108, the system (e.g., using storage manager 340) determines that data agent 321 and/or media agent 144 has been deployed successfully. Data agent 321 registers as a client with storage manager 340. At block 1110, the system (e.g., using storage manager 340) further determines that secondary storage resources have been deployed successfully, e.g., media agent 144, storage resources 408, 418, etc. This might also include media agents 144 deployed outside cluster 301/701, secondary storage 108 also deployed outside cluster 301/701, etc., without limitation. Block 906 ends when storage manager 340 is satisfied that its persistent set of data protection resources (i.e., not on-demand resources) have been successfully deployed.

Figure 12A:
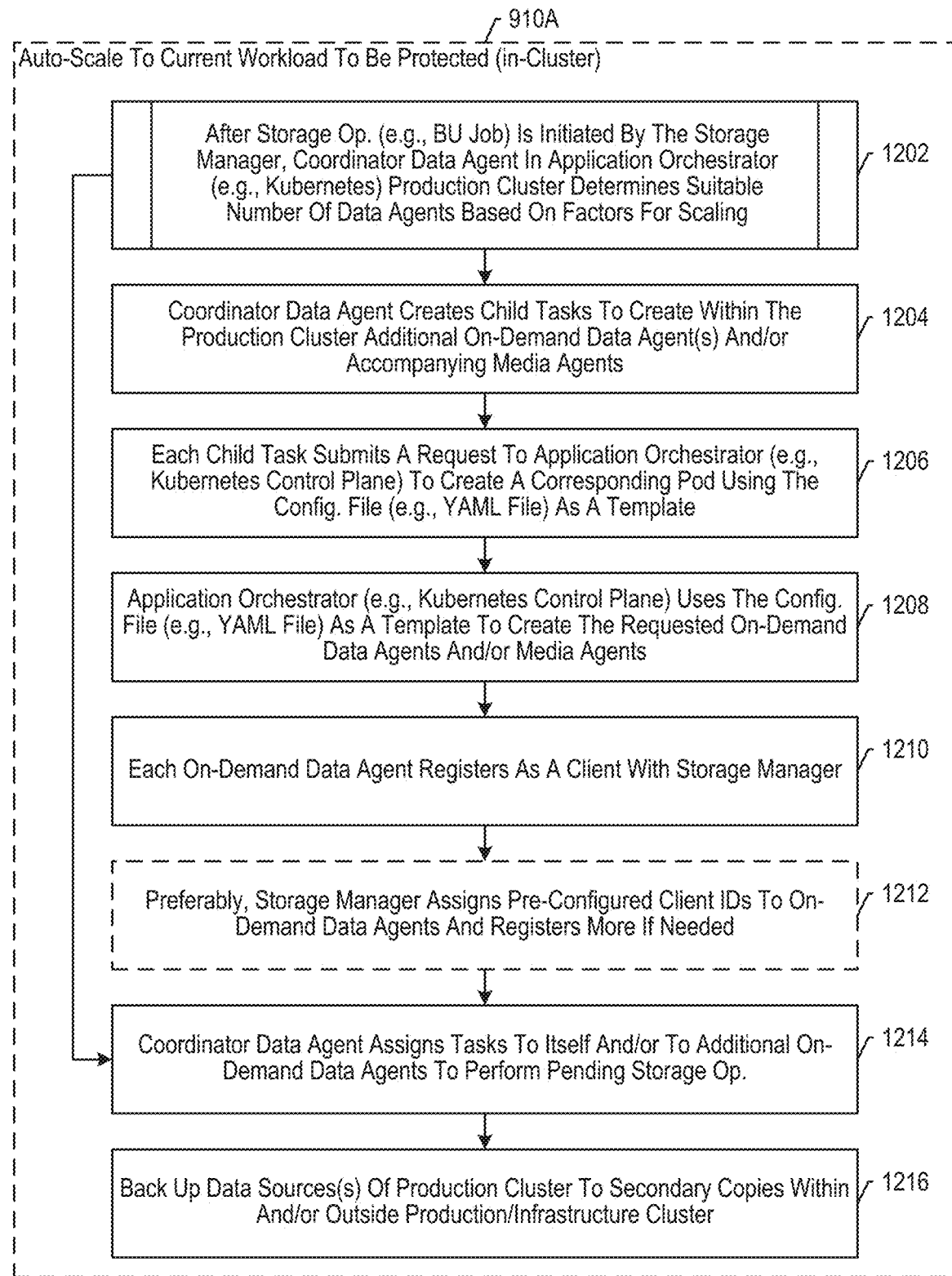
FIG. 12A depicts some salient operations of block 910A of method 900 according to an illustrative embodiment.

FIG. 12A depicts some salient operations of block 910A of method 900 according to an illustrative embodiment. Block 910A is generally directed to the auto-scale feature as applied to in-cluster configurations, such as the example depicted in FIG. 5, i.e., in reference to production cluster 301 hosting the on-demand data protection resources. At block 1202, having been notified of a storage operation by storage manager 340, coordinator data agent 321 analyzes the pending storage operation and the existing environment, and applies a number of scaling factors to determine how many data agents are needed for the storage operation. Examples of scaling factors are given in FIG. 13. Part of the analysis here is whether coordinator data agent 321 itself will perform any of the tasks of the pending storage operation. In some scenarios, coordinator data agent 321 will take on all the tasks and determine that no additional data agents are needed. In such a scenario, no on-demand data agents will be needed and control passes to block 1214. However, if coordinator data agent 321 determines that one or more additional data agents are needed for the pending storage operation, control passes to block 1204. At block 1204, coordinator data agent 321 creates child tasks to create on-demand data agents, e.g., 521. At block 1206, coordinator data agent 321, by way of each child task, submits a request to the host application orchestrator (e.g., Kubernetes cluster 301's control plane) to create a corresponding pod for each additional on-demand data protection agent using the configuration file (e.g., YAML file 804) as a template.

At block 1208, the application orchestrator (e.g., Kubernetes cluster control plane) uses the configuration file (e.g., YAML file 804) as a template to create the requested number of additional data agents 521 and/or media agents 144, each one executing as a containerized application, which are deployed in a pod 303. At block 1210, each on-demand data agent 521 registers as a client with storage manager 340. In embodiments where no or not enough pre-configured client entities (phantom clients) have been created, the present operation requires storage manager 340, for each on-demand data agent, to create a new client entity, create and sign a security certificate therefor, and exchange security credentials with the new on-demand data agent; control then passes to block 1214 after the on-demand data agent notifies coordinator data agent 321 that client registration is complete. In embodiments where client entities (phantom clients) are pre-configured, control passes to block 1212. At block 1212, which occurs in embodiments with pre-configured client entities (phantom clients), storage manager 340 preferably assigns pre-configured client IDs to the instantiated on-demand data agents (see also FIG. 8) and registers more clients if need be, as described in block 1210. On registration completion, the on-demand data agent notifies coordinator data agent 321 of registration completion. At block 1214, coordinator data agent 321 assigns tasks to itself and/or to the on-demand data agents to perform the pending storage operation (e.g., backup job for one or more data sources 312). This includes assigning each data agent to communicate with one or more media agents 144 via one or more data streams 322. At block 1216, system 300 is now ready and able to back up the data sources of production cluster 301. Secondary copies 116 are generated and stored to the designated storage targets, e.g., 108, 408, 418, etc. Data agents in conjunction with their accompanying media agents generate the secondary copies 116. Block 910A ends here.

Figure 12B:
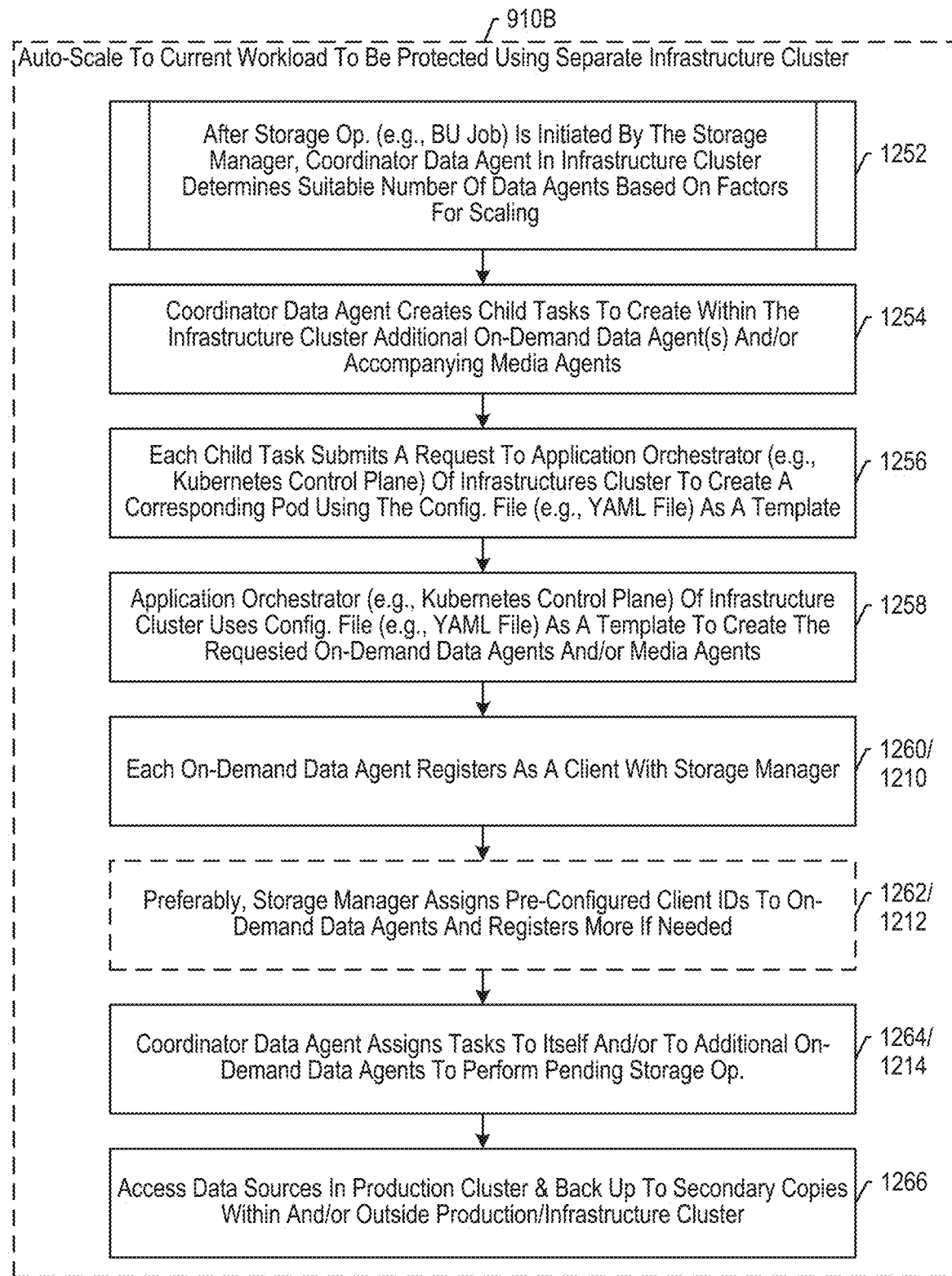
FIG. 12B depicts some salient operations of block 910B of method 900 according to another illustrative embodiment.

FIG. 12B depicts some salient operations of block 910B of method 900 according to another illustrative embodiment. Block 910B, which is disclosed here as an alternative to block 910A, is generally directed to the auto-scale feature as applied to using a separate infrastructure cluster 701 to protect an application orchestrator (e.g., Kubernetes) production cluster, such as the examples depicted in FIGS. 7A-7C. Blocks 1252 and 1254 are the same as or equivalent to block 1202 and 1204, respectively, of FIG. 12A, but taken in the context of auto-scaling as depicted in FIGS. 7A-7C. At block 1256, coordinator data agent 321 by way of each child task, submits a request to infrastructure cluster 701's control plane 710 to create a corresponding pod for each additional on-demand data agent and/or media agent using the configuration file (e.g., YAML file 804) as a template. Accordingly, the configuration file (e.g., YAML file 804) is posted to infrastructure cluster's 701 control plane 710, via API endpoint 705. Thus, even though coordinator data agent 321 is within cluster 701, it still communicates to the cluster control plane, e.g., via API endpoint 705, to cause additional pods to be instantiated. At block 1258, the application orchestrator of the infrastructure cluster (e.g., Kubernetes cluster 701's control plane 710) uses the configuration file (e.g., YAML file 804) as a template to create additional distinct pods 703, each one executing a containerized data agent 721 and/or media agent 144. As shown in FIGS. 6, 7A, and 7C, it may be necessary to invoke, within production cluster 301, some temporary pods 603 hosting containerized data agents 621 that are specially tasked with extracting data from data source 312 and transmitting it to a corresponding data agent 321/521/721 outside of production cluster 301. Accordingly, coordinator data agent 321 communicates with the cluster control plane of the production cluster 301 (not shown) to request the instantiation of these resources and confirm that they have been activated.

At block 1260, which is similar to block 1210 in FIG. 12A, each on-demand data agent 721 registers as a client with storage manager 340. In embodiments where no or not enough pre-configured client entities (phantom clients) have been created in advance, the present operation requires storage manager 340, for each on-demand data agent 721, to create a new client entity, create and sign a security certificate therefor, and exchange security credentials with the new on-demand data agent 721; control then passes to block 1264 after the on-demand data agent 721 notifies coordinator data agent 321 that client registration is complete. In embodiments where client entities (phantom clients) are pre-configured, control passes to block 1262. At block 1262, which is analogous to block 1212 in FIG. 12A, and which occurs in embodiments with pre-configured client entities (phantom clients), storage manager 340 preferably assigns pre-configured client IDs to the additional on-demand data agents 721 (see also FIG. 8) and registers more clients if need be, as described in block 1260. On registration completion, each on-demand data agent 721 notifies coordinator data agent 321 of registration completion. At block 1264, which is analogous to block 1214 in FIG. 12A, coordinator data agent 321 assigns tasks to itself and/or to the on-demand data agents 721 to perform the pending storage operation (e.g., backup job for one or more data sources 312 in production cluster 301). This includes assigning each data agent 321/721 to communicate with one or more media agents 144 via one or more data streams 322. At block 1266, system 300 is now ready and able to back up the data sources of production cluster 301. Secondary copies 116 are generated and stored to the designated storage targets, e.g., 108, 408, 418, etc. Data agents in conjunction with their accompanying media agents generate the secondary copies 116. Block 910B ends here.

Figure 12C:
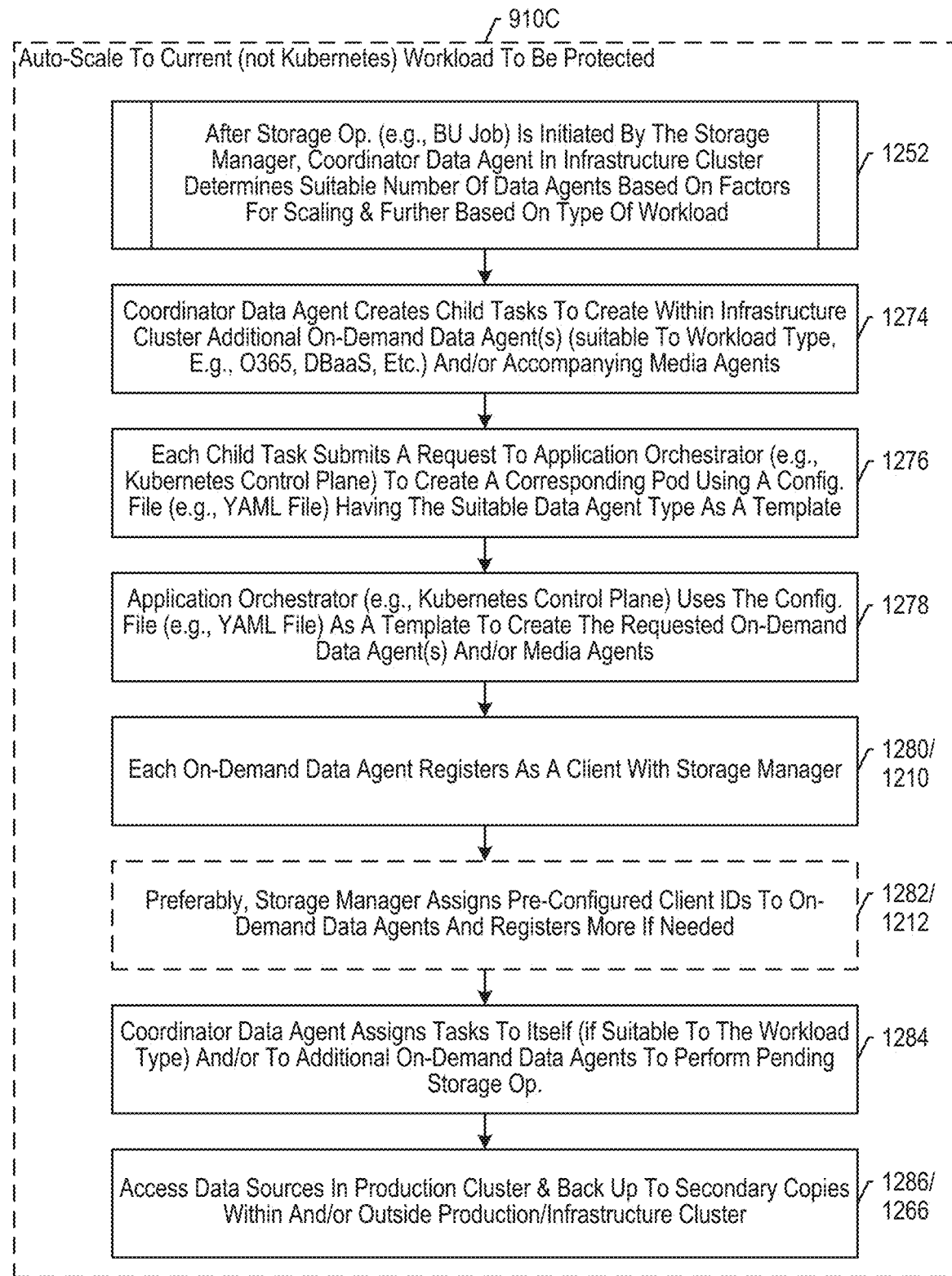
FIG. 12C depicts some salient operations of block 910C of method 900 according to another illustrative embodiment.

FIG. 12C depicts some salient operations of block 910C of method 900 according to another illustrative embodiment. Block 910C, which is disclosed here as an alternative to block 910A and 910B, is generally directed to the auto-scale feature as applied to using a separate infrastructure cluster 701 to protect an other-than-Kubernetes production cluster, such as the examples depicted in FIGS. 7D and 7E, without limitation. Block 1252 is the same as or equivalent to block 1252 of FIG. 12B.

At block 1274, coordinator data agent 321 creates child tasks to create within infrastructure cluster 701 additional on-demand data agent(s) that are suitable to the workload type, e.g., O365, DBaaS, etc. of the pending storage operation; as well as to create accompanying media agents 144, if any.

At block 1276, coordinator data agent 321 by way of each child task, submits a request to infrastructure cluster 701's control plane 710 to create a corresponding pod for each additional on-demand data agent and/or media agent using the configuration file 804 as a template. Accordingly, the configuration file (e.g., YAML file 804) is posted to infrastructure cluster's 701 control plane 710, via API endpoint 705. Thus, even though coordinator data agent 321 is within cluster 701, it still communicates to the cluster control plane, e.g., via API endpoint 705, to cause additional pods to be instantiated. At block 1278, the application orchestrator of the infrastructure cluster (e.g., Kubernetes cluster 701's control plane 710) uses the configuration file (e.g., YAML file 804) as a template to create additional distinct pods 703, each one executing a containerized data agent 721 and/or media agent 144. Data agents 321/721 will be configured to gain access to source data 7112 in production cluster 770.

At block 1280, which is similar to block 1210 in FIG. 12A, each on-demand data agent 721 registers as a client with storage manager 340. In embodiments where no or not enough pre-configured client entities (phantom clients) have been created in advance, the present operation requires storage manager 340, for each on-demand data agent 721, to create a new client entity, create and sign a security certificate therefor, and exchange security credentials with the new on-demand data agent 721; control then passes to block 1284 after the on-demand data agent 721 notifies coordinator data agent 321 that client registration is complete. In embodiments where client entities (phantom clients) are pre-configured, control passes to block 1282. At block 1262, which is analogous to block 1212 in FIG. 12A, and which occurs in embodiments with pre-configured client entities (phantom clients), storage manager 340 preferably assigns pre-configured client IDs to the additional on-demand data agents 721 (see also FIG. 8) and registers more clients if need be, as described in block 1260. On registration completion, each on-demand data agent 721 notifies coordinator data agent 321 of registration completion. At block 1284, coordinator data agent 321 assigns tasks to itself (if data agent 321 is of a type that is suitable to the data source type) and/or to additional on-demand data agents 721 to perform the pending storage operation. Thus, in the example of FIG. 7D, where the workload is a DBaaS (e.g., Oracle Cloud Infrastructure, without limitation), coordinator data agent 321 would not take on any backup tasks if it was a virtual server agent (VSA) that is not suited for Oracle cloud-based database backups. Thus, coordinator data agent 321 is said to be workload-aware or type-aware, such that it recognizes that it is not suitable to backing up certain data sources, yet it is suitable to coordinate the auto-scaling of other data protection resources on demand as disclosed herein. At block 1286, which is analogous to block 1266 in FIG. 12B, system 300 is now ready and able to back up the data sources of production cluster 301. Secondary copies 116 are generated and stored to the designated storage targets, e.g., 108, 408, 418, etc. Data agents in conjunction with their accompanying media agents generate the secondary copies 116.

Figure 13:
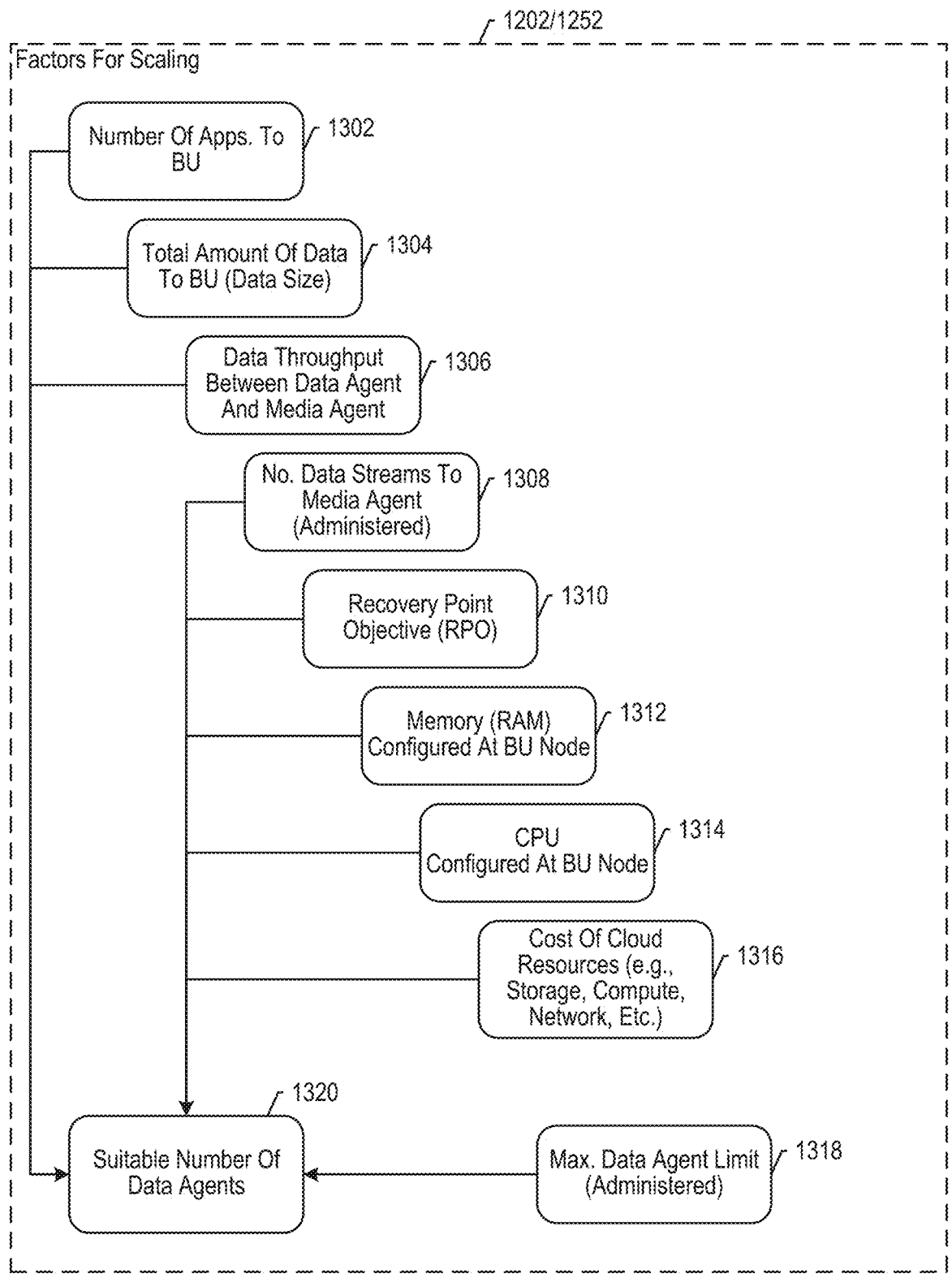
FIG. 13 depicts a number of factors that are used for determining how many data agents to deploy for a storage operation, according to an illustrative embodiment.

FIG. 13 depicts a number of factors for scaling that are used for determining how many data agents to deploy for a storage operation, according to an illustrative embodiment. As noted in block 1202, after a storage operation (e.g., backup job) is initiated by the storage manager, coordinator data agent 321 evaluates the pending storage operation and the existing environment, and applies a number of scaling factors to determine how many data agents are needed for the storage operation. The analysis is preferably performed anew for each new storage operation (e.g., job). Examples of scaling factors are shown in the present figure, without limitation. One or more of these scaling factors are applied, depending on how coordinator data agent 321 is configured. In some embodiments, storage manager 340 instructs coordinator data agent 321 which scaling factors to apply to the analysis, rather than or in addition to relying on the initial configuration of coordinator data agent 321.

Block 1302 represents the number of applications 110 to be backed up. Thus, the data agent granularity is based on the number of applications 110. As discussed in the examples below, only one data agent 321/521/621/721 may be applied to a given application 110, so the number of applications may be a controlling factor. Block 1304 represents the amount of data or data size to be backed up. Coordinator data agent 321 is able to determine the data size by analyzing the one or more data sources 312 that are the subject of the pending storage operation. The data size also depends on the nature of the storage operation, e.g., full backup, incremental backup, archive, restore, etc. Block 1306 represents data throughput rate configured between the target media agent 144 and the source data agents 321/521/721. See, e.g., FIG. 3, where media agent 144 is topologically distant from a data agent such as 321. Block 1308 represents a number of data streams (e.g., 322) administered at the storage manager 340 for connections between a data agent and a media agent. See, e.g., FIG. 3; see also FIG. 7A. Block 1310 represents a recovery point objective (RPO) for one or more of the data sources 312 targeted by the pending storage operation. RPO is defined (e.g., in management database 346) as the maximum time period of data loss that the business will tolerate from a data source 312, e.g., 10 minutes, 1 hour, 1 day, etc. RPOs may differ for different data sources 312 and thus the shortest RPO would govern the analysis here.

Block 1312 represents the amount of random access memory (RAM) configured at coordinator data agent 321 and/or the amount of RAM that may be configured for an additional on-demand data agent 521/621/721. RAM affects how fast the data agent can perform its tasks. Block 1314 represents the processing power (a/k/a CPU measure) configured at coordinator data agent 321 and/or the processing power that may be configured for an additional on-demand data agent 521/621/721. Processing power affects how fast the data agent can perform its tasks. Block 1316 represents the economic cost of cloud resources (e.g., storage, compute RAM/CPU, network, transaction, etc.) available for resources such as data agents 321/521/621/721 and/or media agents 144. These figures are set by the cloud service provider that hosts the illustrative clusters 301/701/770 and/or other components described herein. Accordingly, the economic cost of deploying additional on-demand data protection agents may be taken into consideration in determining how many on-demand resources to add for performing the pending storage operation. In some embodiments, a maximum amount of spend may be configured to prevent excess costs, illustratively stored in management database 346. Block 1318 represents a maximum limit or threshold of the number of data agents 521/721 (expressed in some embodiments as a pod 503/703 count) that may be added on-demand. This number may be applied as a cap on the tentative count resulting from evaluating the preceding scaling factors. This cap prevents system 300 from creating a costly overabundance of on-demand resources.

Block 1320 represents the final outcome of the analysis, i.e., a suitable number of data protection agents for the pending storage operation. In some analyses, the maximum limit 1318 may be overridden by other considerations, e.g., meeting the RPO, or vice-versa, depending how the algorithm is configured within coordinator data agent 321. The analysis is based on heuristics devised by the present inventors. Here are some examples. Total number of applications to be backed up: 5 (five). Total data size to be backed up: 1000 GB. Data throughput to media agent: 30 GB/hour. RPO: 4 (four) hours. Estimated data processing rate per data agent 321/521/721 based on RPO duration at the given throughput: 4×30=120 GB. 1000 GB/120 GB=9 (nine) data agents. But only one data agent may be used per application to be backed up, Thus: min (9, 5)=5 data agents 321/521/721 are needed. This will violate the RPO objective of 4 hours for at least one of the data sources, but that is part of the analysis, and in another scenario the RPO may be easily met. If coordinator data agent 321 will participate in the pending storage operation: 5−1=4 (four) additional on-demand data agents 521/721 are needed. If coordinator data agent 321 will not participate, then 5 (five) additional on-demand data agents 521/721 are needed. If there are other data agents 521/721 already available from a preceding storage operation, e.g., 2 (two), and coordinator data agent 321 will participate, then 5−2−1=2 (two) on-demand data agents 521/721 are needed for the pending storage operation. If there is a pre-administered cost threshold corresponding to 4 (four) additional data agents (or pods 503/703), then the storage operation may proceed with coordinator data agent 321 and 4 (four) on-demand data agents 521/721. These examples are given here to ease the reader's understanding of the present disclosure and are not limiting.

Figure 14A:
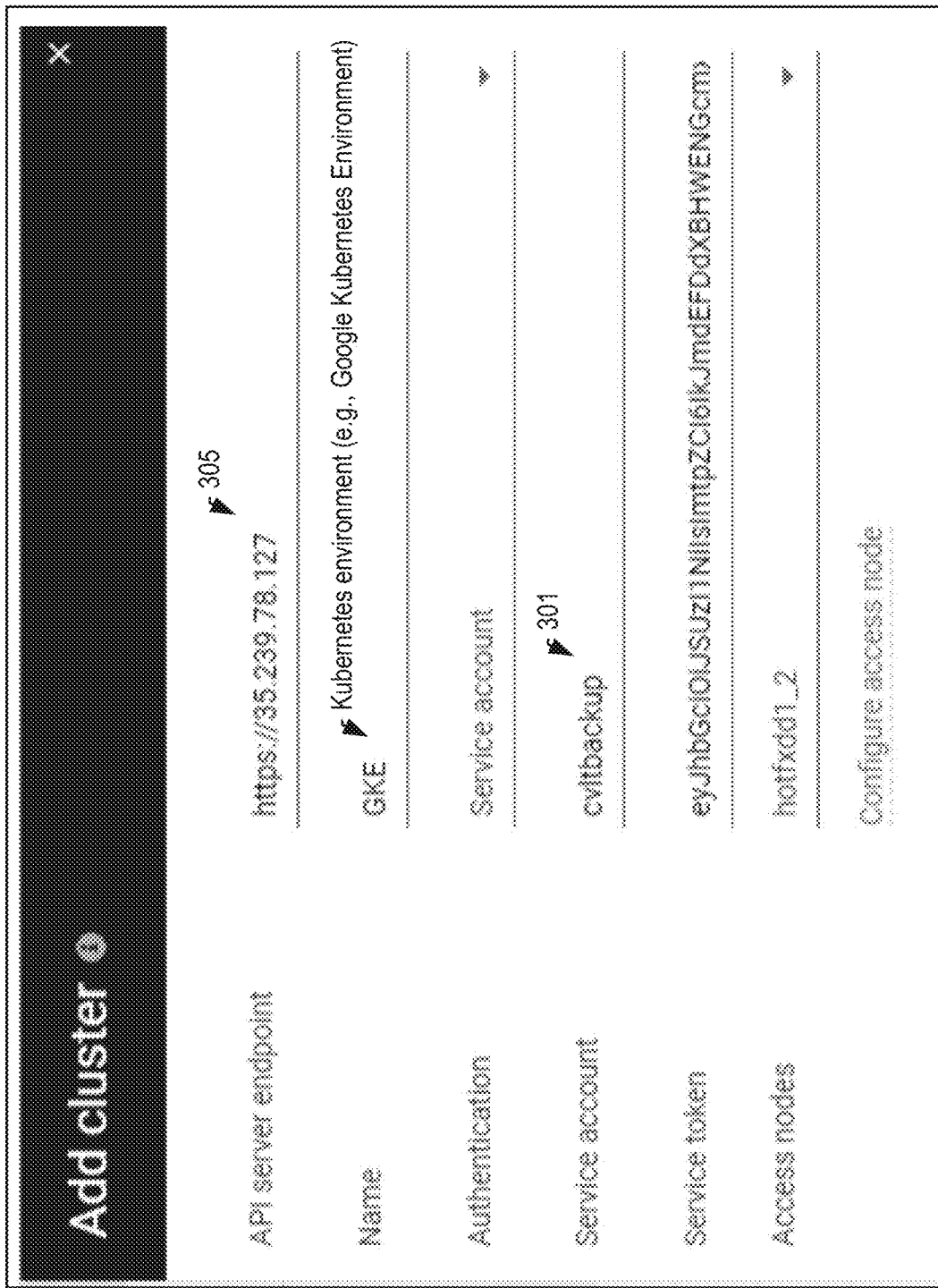
FIGS. 14A-14E depict illustrative screenshots of a graphical user interface for administering certain aspects of auto-scaling in the illustrative data storage management system.
Figure 14B:
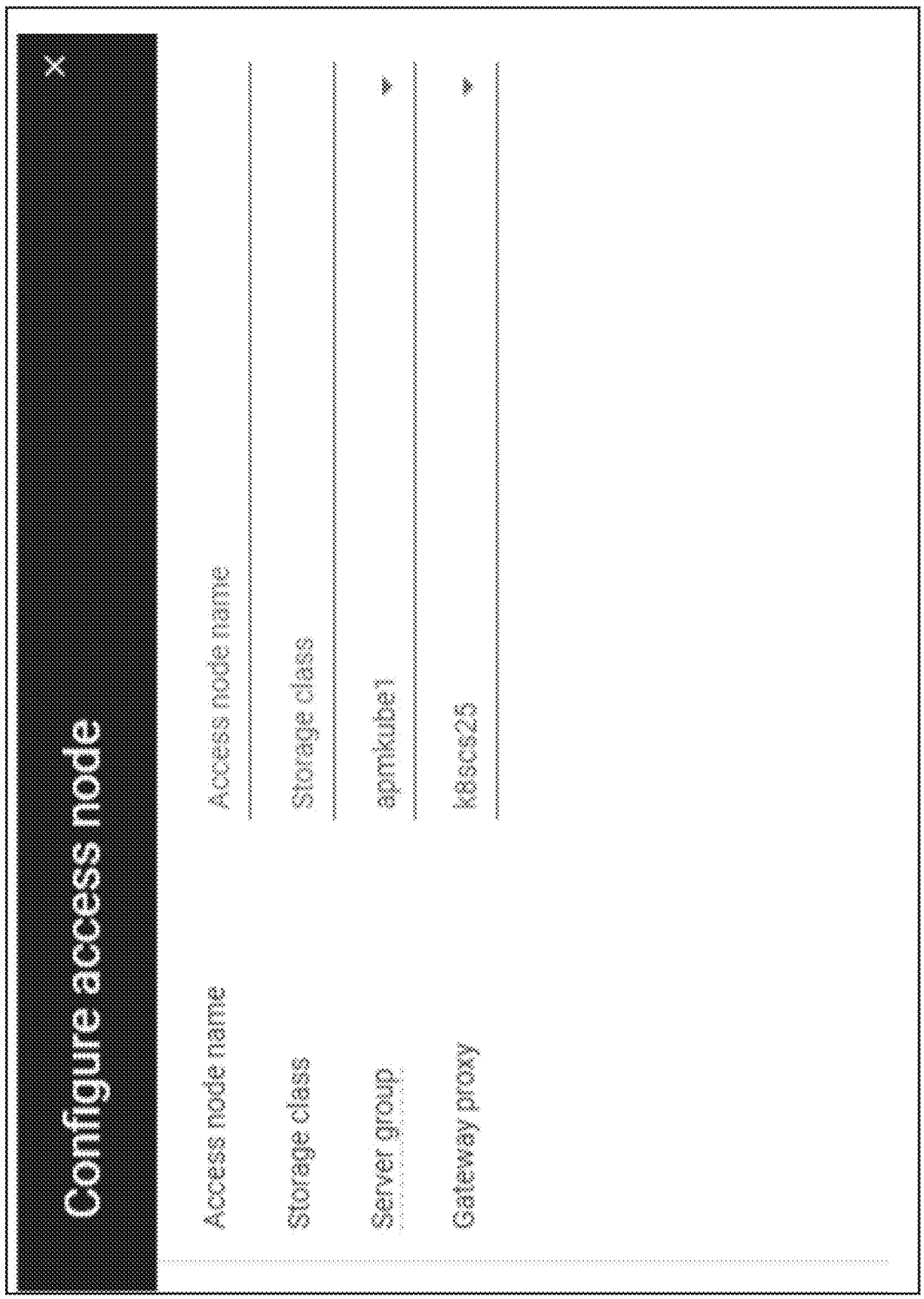
Figure 14C:
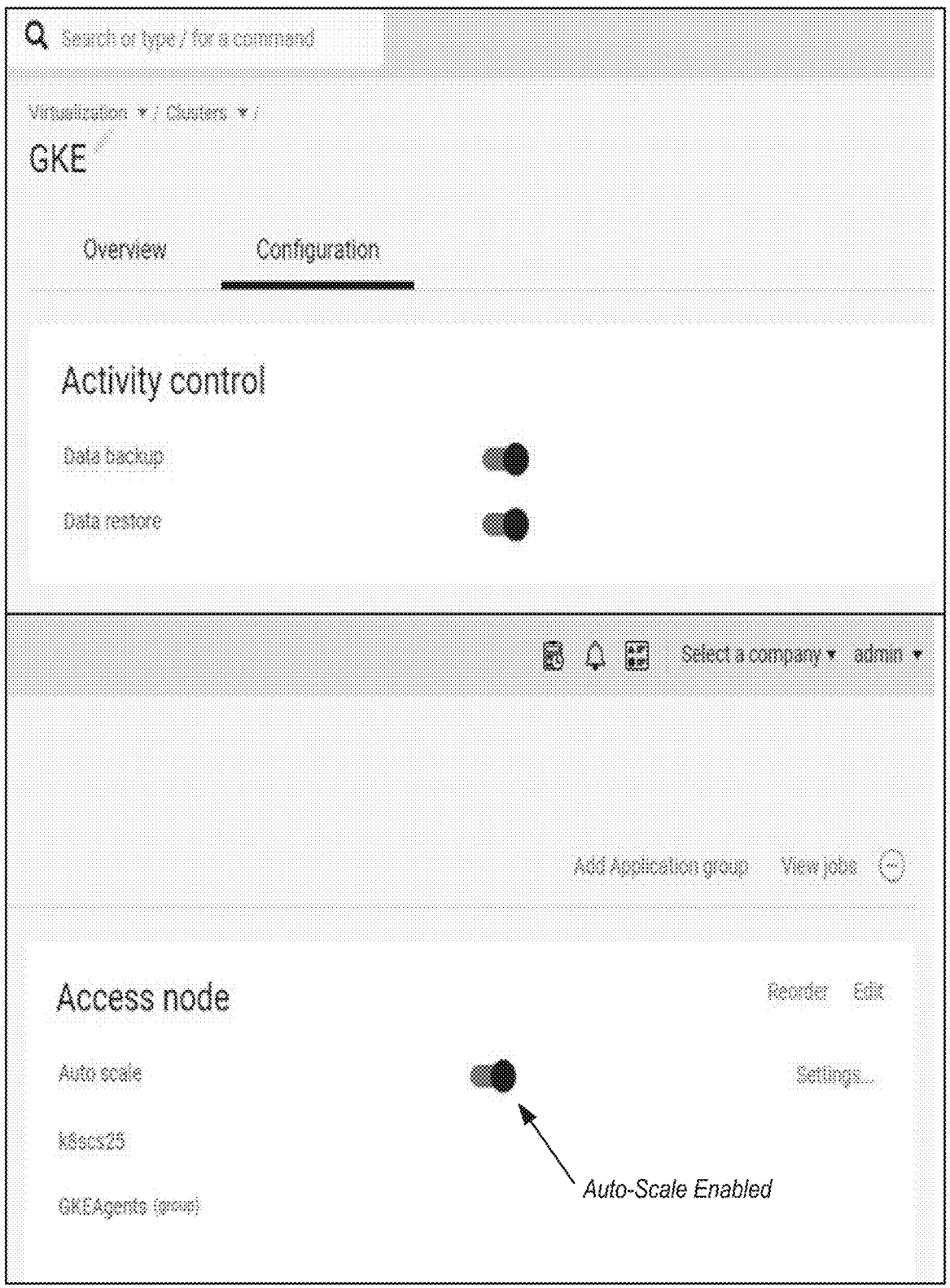
Figure 14D:
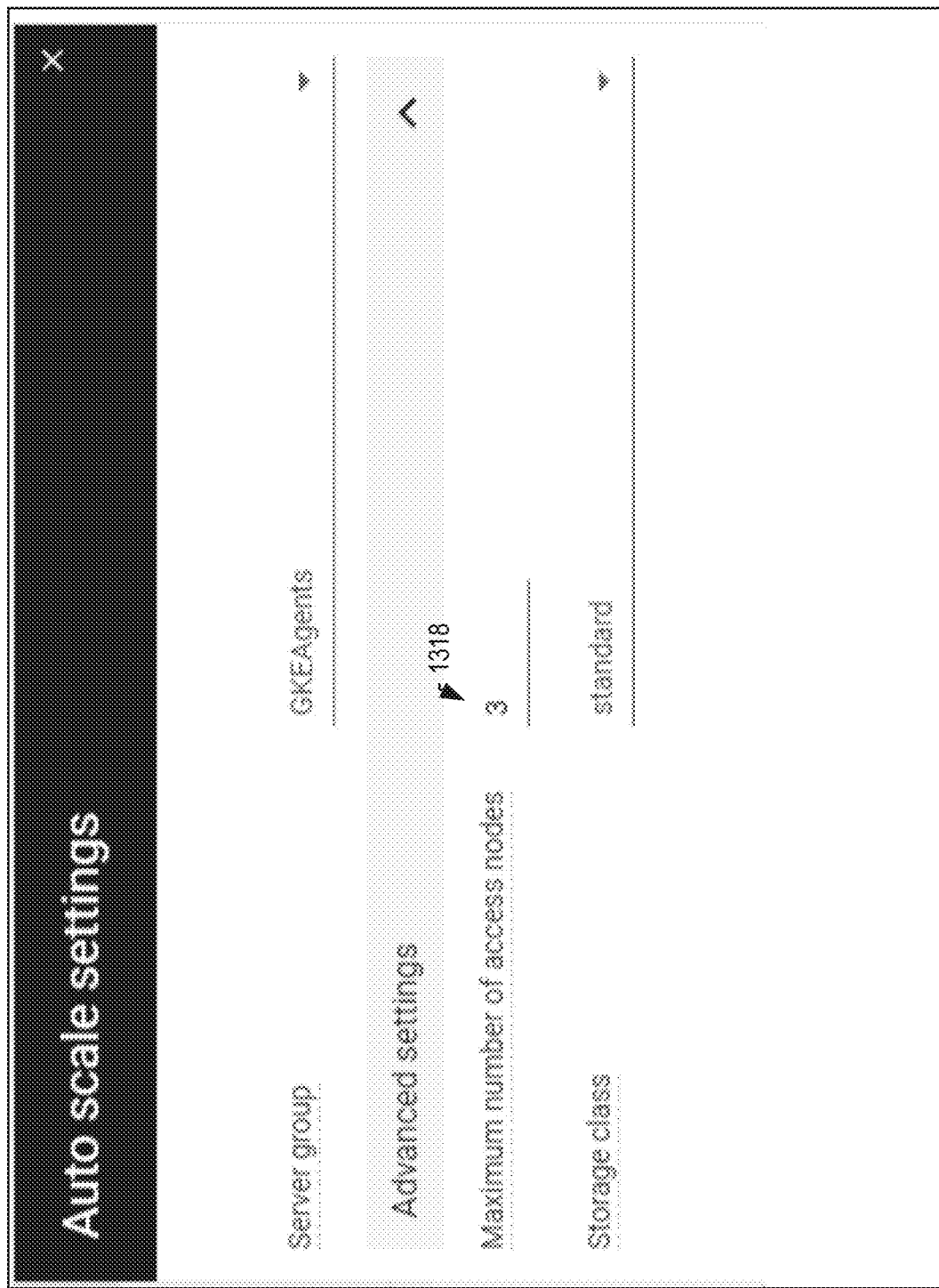
Figure 14E:
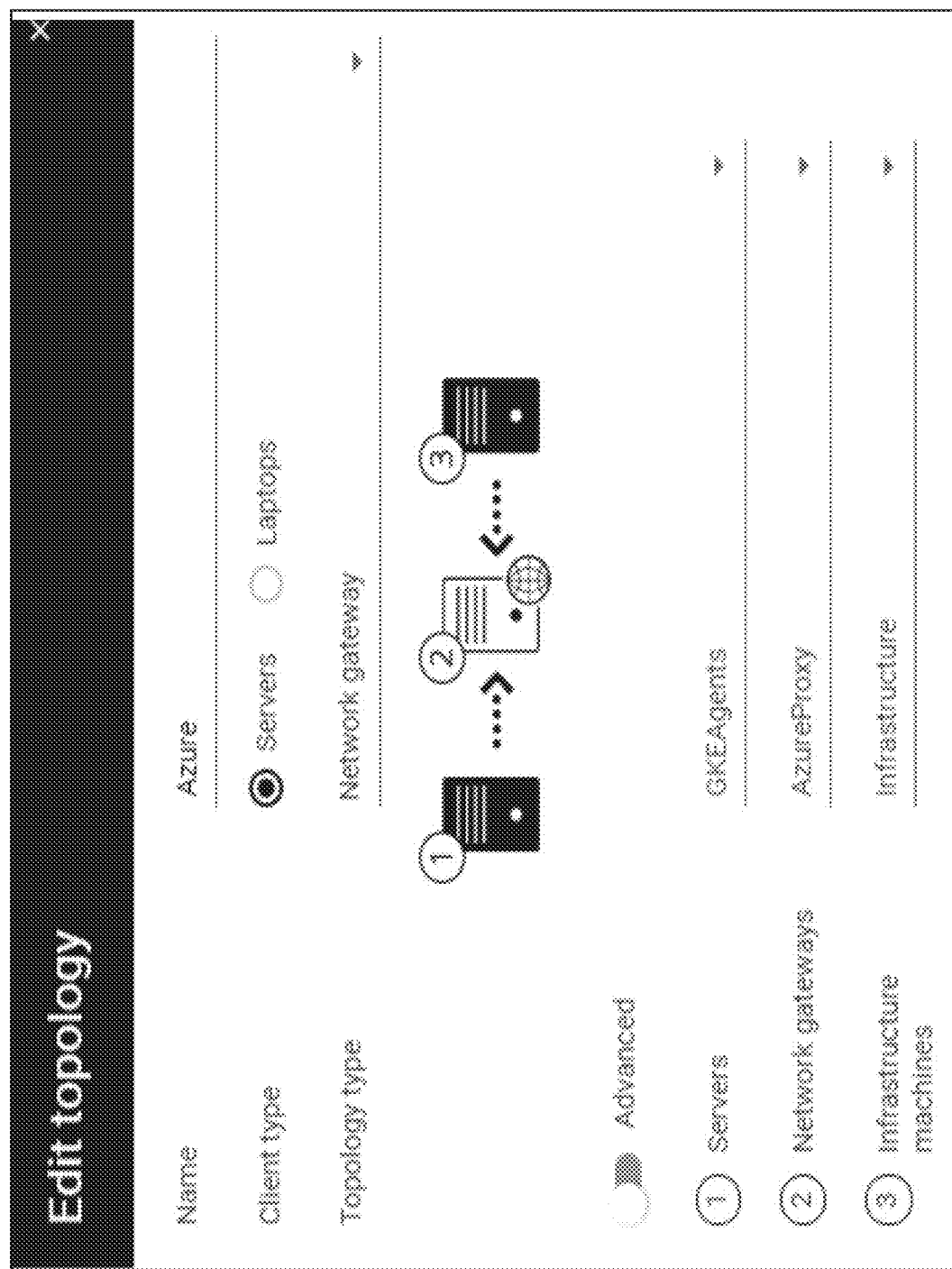

FIGS. 14A-14E depict illustrative screenshots of a graphical user interface for administering certain aspects of auto-scaling in the illustrative data storage management system 300. FIG. 14A depicts a screenshot for administratively adding a production cluster entity (e.g., 301, 770). A URL for API endpoint 305 and service account name for the production cluster are depicted. Illustratively, the Kubernetes environment is GKE. FIG. 14B depicts a screenshot for configuring a gateway proxy and data agent plus media agent (here labeled collectively as "access node") information for access to the production cluster from storage manager 340. FIG. 14C depicts a screenshot that, among other things, enables auto-scale for protecting the production cluster. Other features, such as data backup from and data restore to the production cluster also are enabled here. FIG. 14D depicts a screenshot for controlling auto-scale settings, such as setting a maximum threshold for the number of on-demand data protection resources (here "access nodes") allowed to be instantiated on demand for the production cluster, e.g., scaling factor 1318. FIG. 14E depicts a screenshot for administering network topology, including a network gateway for providing communicative coupling between storage manager 340 and data agent 321. These screens are shown here as examples to enhance the reader's understanding, but are not limiting on the invention.

In regard to the figures described herein, other embodiments are possible within the scope of the present invention, such that the above-recited scaling factors, computing environments, components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

Automatic scaling of data agent resources in an application orchestrator computing environment. According to an example embodiment, a computer-implemented method comprises: deploying a first data agent as a containerized application in an application orchestrator computing environment that comprises a plurality of data sources; by a storage manager that is distinct from the first data agent, initiating a storage operation for one or more data sources within the plurality of data sources, wherein the initiating comprises notifying the first data agent of the storage operation, and wherein the storage manager executes on a computing device comprising one or more hardware processors; by the first data agent, based on the application orchestrator computing environment being configured for automatic scaling, determining how many second data agents are needed for performing the storage operation in addition to the first data agent; by the first data agent, causing the second data agents to be deployed as respective containerized applications within the application orchestrator computing environment, wherein each second data agent, once deployed, registers as a client with the storage manager; by the first data agent, distributing tasks of the storage operation among the second data agents to perform the storage operation; and by the first data agent, after the storage operation completes, causing the second data agents to be deactivated within the application orchestrator computing environment, wherein the first data agent continues to operate within the application orchestrator computing environment. The above-recited embodiment, wherein the application orchestrator computing environment is configured as a Kubernetes cluster, and wherein each first and second data agent is deployed in a respective pod in the Kubernetes cluster. The above-recited embodiment, wherein the application orchestrator computing environment is based on a Kubernetes cluster deployment The above-recited embodiment, wherein each containerized application is deployed in a respective pod in the application orchestrator computing environment, which is based on a Kubernetes cluster deployment. The above-recited embodiment, wherein the storage operation generates one or more secondary copies that are based on the one or more data sources, and wherein the storage operation stores the one or more secondary copies into data storage resources configured within the application orchestrator computing environment. The above-recited embodiment, wherein the storage operation generates one or more secondary copies that are based on the one or more data sources, and wherein the storage operation stores the one or more secondary copies into data storage resources configured outside the application orchestrator computing environment. The above-recited embodiment, wherein the application orchestrator computing environment executes in a cloud computing environment. The above-recited embodiment, wherein the storage manager and the application orchestrator computing environment execute in a cloud computing environment. The above-recited embodiment, wherein the storage manager executes outside the application orchestrator computing environment. The above-recited embodiment, wherein how many second data agents are needed for the storage operation is based on one or more of: (i) a number of applications to back up in the storage operation, (ii) a total amount of data in the one or more data sources of the storage operation, (iii) a data throughput rate between a second data agent and a media agent that stores secondary copies into data storage resources, (iv) a number of data streams administered to operate between a second data agent and a media agent that stores secondary copies into data storage resources, (v) a recovery point objective, expressed as a duration of time, for the one or more data sources, (vi) a random access memory (RAM) amount configured at the first data agent, (vii) an amount of computing resources (CPU) configured at the first data agent, and (viii) a pre-configured maximum value for how many second data agents to deploy. The above-recited embodiment, wherein how many second data agents are needed for the storage operation is based on one or more of: (i) a monetary cost of computing resources (CPU) in a cloud computing environment that hosts the application orchestrator computing environment, (ii) a monetary cost of network resources in the cloud computing environment that hosts the application orchestrator computing environment, (iii) a monetary cost of random access memory (RAM) in the cloud computing environment that hosts the application orchestrator computing environment and (iv) a pre-configured maximum value for how many second data agents to deploy. The above-recited embodiment, further comprising: before initiating the storage operation, pre-configuring by the storage manager a plurality of client entities, wherein each client entity is administered at the storage manager without a corresponding connection to a deployed second data agent, and wherein each client entity is assigned a unique client identifier; by each second data agent, which is deployed as a containerized application within the application orchestrator computing environment after the storage operation is initiated, requesting a client identifier from the storage manager to register as a client therewith; and by the storage manager, assigning to each requesting second data agent a unique client identifier from the plurality of client entities that were pre-configured at the storage manager. The above-recited embodiment, further comprising: after the second data agents are deactivated within the application orchestrator computing environment, de-registering each second data agent, wherein the storage manager re-uses the pre-configured plurality of client entities in a subsequent storage operation. The above-recited embodiment, wherein the first data agent distributes at least one task of the storage operation to itself. The above-recited embodiment, further comprising: by the storage manager, initiating an other storage operation of second data sources within the plurality of data sources; by the first data agent, determining how many third data agents are needed for the other storage operation in addition to the first data agent; by the first data agent, causing the third data agents to be deployed as containerized applications within the application orchestrator computing environment, wherein each third data agent registers as a client with the storage manager; by the first data agent, distributing tasks of the storage operation among the third data agents to perform the other storage operation; by the first data agent, after the other storage operation completes, causing the third data agents to be deactivated within the application orchestrator computing environment, wherein the first data agent continues to operate within the application orchestrator computing environment; and wherein how many third data agents are assigned to the other storage operation differs from how many second data agents were used for the storage operation, based on a difference in data source presented by the second data sources as compared to the one or more data sources.

According to another example embodiment, a computer-implemented method comprises: deploying a pod within an application orchestrator computing environment, which is configured as a Kubernetes cluster in a cloud computing environment, wherein the pod comprises a first data agent operating as a containerized application and further comprises a media agent operating as a containerized application, and wherein the media agent is communicatively coupled to data storage resources configured at least one of: inside the Kubernetes cluster and outside the Kubernetes cluster, and wherein the Kubernetes cluster comprises a plurality of data sources; by a storage manager, initiating a storage operation for one or more data sources within the plurality of data sources, wherein the initiating comprises notifying the first data agent of the storage operation, and wherein the storage manager executes outside the Kubernetes cluster, on a computing device comprising one or more hardware processors; by the first data agent, determining how many second data agents are needed for performing the storage operation in addition to the first data agent; by the first data agent, causing the second data agents to be deployed as containerized applications in respective pods within the Kubernetes cluster; by the first data agent, distributing tasks of the storage operation among the second data agents to perform the storage operation, wherein each second data agent transmits first data collected from one of the one or more data sources to a corresponding media agent; by each corresponding media agent, generating one or more secondary copies based on the first data and storing the one or more secondary copies in the data storage resources; and by the first data agent, after the storage operation completes, causing the second data agents to be deactivated, wherein the first data agent continues to operate within the Kubernetes cluster. The above-recited embodiment, wherein how many second data agents are needed for the storage operation is based on one or more of: (i) a number of applications to back up in the storage operation, (ii) a total amount of data in the one or more data sources of the storage operation, (iii) a data throughput rate between a second data agent and a media agent that stores secondary copies into data storage resources, (iv) a number of data streams administered to operate between a second data agent and a media agent that stores secondary copies into data storage resources, (v) a recovery point objective, expressed as a duration of time, for the one or more data sources, (vi) a random access memory (RAM) amount configured at the first data agent, (vii) an amount of computing resources (CPU) configured at the first data agent, and (viii) a pre-configured maximum value for how many second data agents to deploy. The above-recited embodiment, further comprising: before initiating the storage operation, pre-configuring by the storage manager a plurality of client entities, wherein each client entity is administered at the storage manager without having a corresponding connection to a deployed data agent, and wherein each client entity is assigned a unique client identifier; wherein each second data agent, which is deployed as a containerized application within the Kubernetes cluster after the storage operation is initiated, requests a client identifier from the storage manager to register as a client with the storage manager; by the storage manager, assigning to each requesting second data agent a unique client identifier from the plurality of client entities that were pre-configured; and after the second data agents are deactivated within the Kubernetes cluster, de-registering each second data agent, wherein the storage manager re-uses the pre-configured plurality of client entities in a subsequent storage operation. The above-recited embodiment, wherein the first data agent distributes at least one task of the storage operation to itself. The above-recited embodiment, further comprising: by the storage manager, initiating an other storage operation of second data sources within the plurality of data sources; by the first data agent, determining how many third data agents are needed for the other storage operation in addition to the first data agent; by the first data agent, causing the third data agents to be deployed as containerized applications in respective pods within the Kubernetes cluster; by the first data agent, distributing tasks of the other storage operation among the third data agents to perform the other storage operation; on completion of the other storage operation, by the first data agent, causing the third data agents to be deactivated within the Kubernetes cluster, wherein the first data agent continues to operate within the Kubernetes cluster; and wherein how many third data agents are assigned to the other storage operation differs from how many second data agents were used for the storage operation, based on a difference in data source presented by the second data sources as compared to the one or more data sources.

Example embodiments of using an application orchestrator computing environment to deploy data protection resources needed for data generated in another application orchestrator computing environment. According to an example embodiment, a method implemented on one or more computing devices that comprise one or more hardware processors comprises: deploying a first data agent as a containerized application within a first application orchestrator computing environment; by a storage manager, initiating a storage operation for one or more data sources of a second application orchestrator computing environment, which is distinct from the first application orchestrator computing environment, wherein the initiating comprises notifying the first data agent of the storage operation, and wherein the storage manager executes on a computing device comprising one or more hardware processors, wherein the computing device operates outside the first application orchestrator computing environment; by the first data agent, causing a first number of second data agents to be deployed in the first application orchestrator computing environment, in addition to the first data agent, wherein each second data agent is deployed as a containerized application in a respective pod within the first application orchestrator computing environment; by the first data agent, distributing tasks of the storage operation among the first number of second data agents; and by the first data agent, after the storage operation completes, causing each pod that comprises a second data agent to be deactivated, wherein the first data agent continues to operate within the first application orchestrator computing environment. The above-recited embodiment, wherein the storage operation generates one or more secondary copies of the one or more data sources, and wherein the storage operation stores the one or more secondary copies into data storage resources, which are configured in one or more of: inside the first application orchestrator computing environment, and outside the first application orchestrator computing environment. The above-recited embodiment, wherein the first application orchestrator computing environment is configured as a first Kubernetes cluster, wherein the second application orchestrator computing environment is configured as a second Kubernetes cluster distinct from the first Kubernetes cluster, wherein the storage operation generates one or more secondary copies of the one or more data sources, and wherein the storage operation stores the one or more secondary copies into data storage resources, which are configured in one or more of: inside the first Kubernetes cluster and outside the first Kubernetes cluster. The above-recited embodiment, wherein the first number of second data agents needed for the storage operation is based on one or more of: (i) a number of applications among the one or more data sources, (ii) a total amount of data in the one or more data sources, (iii) a data throughput rate between a deployed second data agent and a media agent that stores secondary copies, generated by the storage operation, into data storage resources, (iv) a number of data streams administered to operate between a deployed second data agent and a media agent that stores secondary copies, generated by the storage operation, into data storage resources, (v) a recovery point objective, expressed as a duration of time, for the one or more data sources, (vi) an amount of random access memory (RAM) configured at the first data agent, (vii) an amount of computing resources (CPU) configured at the first data agent, and (viii) a pre-configured maximum value for the first number of second data agents. The above-recited embodiment, wherein the first application orchestrator computing environment and the second application orchestrator computing environment operate in a cloud computing environment. The above-recited embodiment, wherein at least one of the first application orchestrator computing environment and the second application orchestrator computing environment operates in a non-cloud data center. The above-recited embodiment, further comprising: by each second data agent during the storage operation, transmitting to a media agent, via one or more data streams, first data obtained from one of the one or more data sources, wherein the media agent executes on a computing device comprising one or more hardware processors; and by the media agent, generating one or more secondary copies that are based on the first data, and storing the one or more secondary copies in one or more data storage resources.

The above-recited embodiment, wherein each second data agent is deployed as a containerized application in a respective pod that further comprises a media agent, which is deployed as a containerized application; and further comprising: by each second data agent during the storage operation, transmitting to the media agent within the respective pod, first data obtained from one of the one or more data sources; and by each media agent, generating one or more secondary copies that are based on the first data received from the second data agent in the respective pod, and storing the one or more secondary copies in one or more data storage resources. The above-recited embodiment, further comprising: before initiating the storage operation, pre-configuring by the storage manager, a plurality of client entities, wherein each client entity among the plurality of client entities is administered at the storage manager and is assigned a unique client identifier, without having a corresponding connection to a deployed data agent; by each second data agent deployed in the first application orchestrator computing environment, requesting a client identifier from the storage manager to register as a client with the storage manager; by the storage manager, assigning to each requesting second data agent a unique client identifier from the plurality of client entities that were pre-configured; and after each pod comprising a respective second data agents is deactivated, de-registering, by the storage manager, the respective second data agent; by the storage manager, after the de-registering, re-using in subsequent storage operations at least one client entity among the pre-configured plurality of client entities. The above-recited embodiment, further comprising: by the storage manager, initiating an other storage operation of second data sources of the second application orchestrator computing environment; by the first data agent, determining a second number of second data agents needed for the other storage operation; and wherein the second number differs from the first number, wherein the second number differs from the first number, based on a difference between the second data sources and the one or more data sources.

According to another example embodiment, a computer-implemented method comprises: deploying a pod within a first Kubernetes cluster, wherein the pod comprises a first data agent operating as a containerized application, and wherein a second Kubernetes cluster, which is distinct from the first Kubernetes cluster, comprises a plurality of data sources; by a storage manager, initiating a storage operation for one or more data sources within the plurality of data sources of the second Kubernetes cluster, wherein the initiating comprises notifying the first data agent of the storage operation, and wherein the storage manager executes outside the second Kubernetes cluster, on a computing device comprising one or more hardware processors; by the first data agent, causing a first number of second data agents, in addition to the first data agent, to be deployed in the first Kubernetes cluster, wherein each second data agent is deployed as a containerized application in a respective pod within the first Kubernetes cluster; by the first data agent, distributing tasks of the storage operation among the first number of second data agents to perform the storage operation; and by the first data agent, after the storage operation completes, causing pods that comprise a second data agent to be deactivated, wherein the first data agent continues to operate within the first Kubernetes cluster. The above-recited embodiment, wherein the first Kubernetes cluster and the second Kubernetes cluster operate in a cloud computing environment. The above-recited embodiment, wherein the storage manager operates within the cloud computing environment. The above-recited embodiment, wherein the storage manager operates outside the cloud computing environment. The above-recited embodiment, wherein the storage manager designates the first data agent as a coordinator data agent for the storage operation. The above-recited embodiment, wherein the storage manager designates the first data agent as a coordinator data agent for the storage operation, and wherein the first data agent does not distribute tasks of the storage operation to itself. The above-recited embodiment, wherein the first data agent is of a first type, which is different from a second type of the one or more data sources, and wherein the first type of data agent is unsuitable for performing the storage operation for the one or more data sources. The above-recited embodiment, wherein the first data agent distributes at least one task of the storage operation to itself. The above-recited embodiment, further comprising: by the storage manager, administratively enabling automatic scaling for the first Kubernetes cluster; and by the first data agent, based on automatic scaling being enabled for the first Kubernetes cluster, determining the first number of second data agents needed for the storage operation. The above-recited embodiment, further comprising: by the storage manager, administratively enabling automatic scaling for the second Kubernetes cluster; and by the first data agent, based on automatic scaling being enabled for the second Kubernetes cluster, determining the first number of second data agents needed for the storage operation.

The above-recited embodiment, further comprising: by each second data agent during the storage operation, transmitting to a media agent, via one or more data streams, first data obtained from one of the one or more data sources, wherein the media agent executes on a computing device comprising one or more hardware processors; and by the media agent, generating one or more secondary copies based on the first data and storing the one or more secondary copies in one or more persistent data storage resources. The above-recited embodiment, wherein the pods comprising the second data agents are deployed on demand within the first Kubernetes cluster, for the storage operation, as instructed by the first data agent. The above-recited embodiment, wherein each second data agent is deployed as a containerized application in a respective pod that further comprises a media agent deployed as a containerized application; and further comprising: by each second data agent during the storage operation, transmitting to a media agent within the respective pod, first data obtained from one of the one or more data sources; and by each media agent, generating one or more secondary copies, based on the first data, and storing the one or more secondary copies in data storage resources. The above-recited embodiment, wherein the data storage resources are configured in one or more of: inside and outside the first Kubernetes cluster. The above-recited embodiment, further comprising: before initiating the storage operation, pre-configuring by the storage manager a plurality of client entities, wherein each client entity is administered at the storage manager without having a corresponding connection to a deployed data agent, and wherein each client entity is assigned a unique client identifier; wherein each second data agent requests a client identifier from the storage manager to register as a client with the storage manager; by the storage manager, assigning to each requesting second data agent a unique client identifier from the plurality of client entities that were pre-configured; and after the pods comprising the second data agents are deactivated, de-registering each second data agent, wherein the storage manager re-uses the pre-configured plurality of client entities in a subsequent storage operation. The above-recited embodiment, further comprising: by the storage manager, initiating an other storage operation of second data sources within the plurality of data sources; by the first data agent, determining a second number of second data agents needed for the other storage operation; and wherein the second number differs from the first number, wherein the second number differs from the first number, based on a difference between the second data sources and the one or more data sources.

According to yet another example embodiment, a computer-implemented method comprises: deploying a pod within a first application orchestrator computing environment, wherein the pod comprises a first data agent operating as a containerized application, and wherein a second application orchestrator computing environment comprises a plurality of data sources; by a storage manager, initiating a storage operation for one or more data sources within the plurality of data sources of the second application orchestrator computing environment, wherein the initiating comprises notifying the first data agent of the storage operation, and wherein the storage manager executes outside the first application orchestrator computing environment, on a computing device comprising one or more hardware processors; by the first data agent, causing a first number of second data agents to be deployed in the first application orchestrator computing environment, in addition to the first data agent, wherein each second data agent is deployed as a containerized application in a respective pod within the first application orchestrator computing environment; by the first data agent, distributing tasks of the storage operation among the first number of second data agents to perform the storage operation; and by the first data agent, after the storage operation completes, causing pods that comprise a second data agent to be deactivated, wherein the first data agent continues to operate within the first application orchestrator computing environment. The above-recited embodiment, wherein the first application orchestrator computing environment is configured as a first Kubernetes cluster, wherein the second application orchestrator computing environment is configured as a second Kubernetes cluster distinct from the first Kubernetes cluster, and wherein the storage operation generates one or more secondary copies of the one or more data sources. The above-recited embodiment, wherein the storage operation stores the one or more secondary copies into data storage resources, which are configured in one or more of: inside and outside the first Kubernetes cluster. The above-recited embodiment, wherein the first number of second data agents needed for the storage operation is based on one or more of: (i) a number of applications to back up in the storage operation, (ii) a total amount of data in the one or more data sources of the storage operation, (iii) a data throughput rate between a deployed second data agent and a media agent that stores secondary copies into data storage resources, (iv) a number of data streams administered to operate between a deployed second data agent and a media agent that stores secondary copies into data storage resources, (v) a recovery point objective, expressed as a duration of time, for the one or more data sources, (vi) a random access memory (RAM) amount configured at the first data agent, (vii) an amount of computing resources (CPU) configured at the first data agent, and (viii) a pre-configured maximum value for the first number.

The above-recited embodiment, wherein the first application orchestrator computing environment and the second application orchestrator computing environment operate in a cloud computing environment. The above-recited embodiment, further comprising: by each second data agent during the storage operation, transmitting to a media agent, via one or more data streams, first data obtained from one of the one or more data sources, wherein the media agent executes on a computing device comprising one or more hardware processors; and by the media agent, generating one or more secondary copies based on the first data and storing the one or more secondary copies in one or more persistent data storage resources. The above-recited embodiment, wherein each second data agent is deployed as a containerized application in a respective pod that further comprises a media agent deployed as a containerized application; and further comprising: by each second data agent during the storage operation, transmitting to the media agent within the respective pod, first data obtained from one of the one or more data sources; and by each media agent, generating one or more secondary copies, based on the first data, and storing the one or more secondary copies in one or more persistent data storage resources. The above-recited embodiment, further comprising: before initiating the storage operation, pre-configuring by the storage manager a plurality of client entities, wherein each client entity is administered at the storage manager without having a corresponding connection to a deployed data agent, and wherein each client entity is assigned a unique client identifier; by each second data agent, requesting a client identifier from the storage manager to register as a client with the storage manager; by the storage manager, assigning to each requesting second data agent a unique client identifier from the plurality of client entities that were pre-configured; and after the pods comprising the second data agents are deactivated, de-registering each second data agent, wherein the storage manager re-uses the pre-configured plurality of client entities in subsequent storage operations. The above-recited embodiment, further comprising: by the storage manager, initiating an other storage operation of second data sources within the plurality of data sources; by the first data agent, determining a second number of second data agents needed for the other storage operation; and wherein the second number differs from the first number, based on a difference in data source presented by the second data sources as compared to the one or more data sources. The above-recited embodiment, further comprising: by the first data agent, for each second data agent to be deployed in the first application orchestrator computing environment, cause a corresponding third data agent to be deployed as a containerized application in a respective pod within the second application orchestrator computing environment, wherein each second data agent uses its corresponding third data agent to access one of the one or more data sources in the second application orchestrator computing environment. The above-recited embodiment, further comprising: by the first data agent, after the storage operation completes, causing the second application orchestrator computing environment to deactivate each pod that comprises a third data agent. The above-recited embodiment, further comprising: by each second data agent, after the storage operation completes, causing the second application orchestrator computing environment to deactivate each pod that comprises a corresponding third data agent.

Example embodiments of using an application orchestrator computing environment to deploy data protection resources needed for data generated in a production cluster that is distinct from the application orchestrator, such as a production cluster that comprises an application suite. According to an example embodiment, a method implemented on one or more computing devices comprising one or more hardware processors comprises: deploying a pod within an application orchestrator computing environment, wherein the pod comprises a first data agent operating as a containerized application, and wherein the first data agent is communicatively coupled to an application suite that operates in a computing environment that is distinct from the application orchestrator computing environment; by the first data agent, receiving from a storage manager, instructions to perform a storage operation for one or more first data sources of the application suite, wherein the storage manager executes on a computing device comprising one or more hardware processors, wherein the computing device operates outside the first application orchestrator computing environment; by the first data agent, causing a first number of second data agents to be deployed in the first application orchestrator computing environment, in addition to the first data agent, wherein each second data agent among the first number of second data agents is deployed as a containerized application in a respective pod within the first application orchestrator computing environment; by the first data agent, distributing tasks of the storage operation among the first number of second data agents; and by the first data agent, after the storage operation completes, causing each pod that comprises a second data agent to be deactivated, wherein the first data agent continues to operate within the first application orchestrator computing environment. The above-recited embodiment, wherein the application suite comprises a database-as-a-service deployed in a cloud computing environment. The above-recited embodiment, wherein the application suite comprises an office productivity suite deployed in a cloud computing environment. The above-recited embodiment, wherein the application suite comprises a virtual machine farm deployed in a non-cloud data center. The above-recited embodiment, wherein the application suite comprises an executable application deployed in one of: a cloud computing environment, and a non-cloud data center. The above-recited embodiment, wherein the storage operation generates one or more secondary copies of the one or more data sources, and wherein the storage operation stores the one or more secondary copies into data storage resources, which are configured in one or more of: inside the first application orchestrator computing environment, outside the first application orchestrator computing environment, inside the computing environment of the application suite, and outside the computing environment of the application suite. The above-recited embodiment, wherein the first application orchestrator computing environment is configured as a first Kubernetes cluster, wherein the storage operation generates one or more secondary copies of the one or more data sources, and wherein the storage operation stores the one or more secondary copies into data storage resources, which are configured in one or more of: inside the first Kubernetes cluster, outside the first Kubernetes cluster, inside the computing environment of the application suite, and outside the computing environment of the application suite. The above-recited embodiment, further comprising: determining the first number of second data agents needed for the storage operation; and causing the first number of second data agents to perform tasks of the storage operation; wherein the first data agent distributes none of the tasks of the storage operation to itself. The above-recited embodiment, wherein the first data agent distributes at least one task of the storage operation to itself. The above-recited embodiment, wherein one or more of: the first application orchestrator computing environment and the application suite operates in a cloud computing environment; and wherein the storage manager operates in one of: the cloud computing environment, and outside the cloud computing environment.

According to another example embodiment, a method comprises: deploying a pod within an application orchestrator computing environment, wherein the pod comprises a first data agent operating as a containerized application, and wherein the first data agent is communicatively coupled to an application suite that generates a plurality of data sources, wherein the application suite operates in a computing environment that is distinct from the application orchestrator computing environment of the first data agent; by the first data agent, receiving from a storage manager, instructions to perform a storage operation for one or more first data sources within the plurality of data sources of the application suite, wherein the storage manager executes outside the first application orchestrator computing environment, on a computing device comprising one or more hardware processors; by the first data agent, causing a first number of second data agents to be deployed in the first application orchestrator computing environment, in addition to the first data agent, wherein each second data agent is deployed as a containerized application in a respective pod within the first application orchestrator computing environment; by the first data agent, distributing tasks of the storage operation among the first number of second data agents to perform the storage operation; and by the first data agent, after the storage operation completes, causing pods that comprise a second data agent to be deactivated, wherein the first data agent continues to operate within the first application orchestrator computing environment. The above-recited embodiment, wherein the first application orchestrator computing environment is configured as a first Kubernetes cluster, and wherein the storage operation generates one or more secondary copies of the one or more data sources. The above-recited embodiment, wherein the storage operation stores the one or more secondary copies into data storage resources, which are configured in one or more of: inside and outside the first Kubernetes cluster. The above-recited embodiment, wherein the storage operation stores the one or more secondary copies into data storage resources, which are configured in one or more of: inside and outside computing environment of the application suite. The above-recited embodiment, wherein the application suite comprises a database-as-a-service deployed in a cloud computing environment. The above-recited embodiment, wherein the application suite comprises an office productivity suite deployed in a cloud computing environment. The above-recited embodiment, wherein the application suite comprises a virtual machine farm deployed in a non-cloud data center. The above-recited embodiment, wherein the application suite comprises an executable application deployed in a cloud computing environment. The above-recited embodiment, wherein the first data agent is configured to determine the first number and to cause the first number of second agents suitable to perform the storage operation and to cause, and further wherein the first data agent is not configured to perform any of the tasks of the storage operation. The above-recited embodiment, wherein the first number of second data agents needed for the storage operation is based on one or more of: (i) a number of applications to back up in the storage operation, (ii) a total amount of data in the one or more data sources of the storage operation, (iii) a data throughput rate between a deployed second data agent and a media agent that stores secondary copies into data storage resources, (iv) a number of data streams administered to operate between a deployed second data agent and a media agent that stores secondary copies into data storage resources, (v) a recovery point objective, expressed as a duration of time, for the one or more data sources, (vi) a random access memory (RAM) amount configured at the first data agent, (vii) an amount of computing resources (CPU) configured at the first data agent, and (viii) a pre-configured maximum value for the first number. The above-recited embodiment, wherein the first application orchestrator computing environment and the application suite operate in a cloud computing environment. The above-recited embodiment, wherein the storage manager operates in the cloud computing environment. The above-recited embodiment, wherein the storage manager operates outside the cloud computing environment. The above-recited embodiment, further comprising: by each second data agent during the storage operation, transmitting to a media agent, via one or more data streams, first data obtained from one of the one or more data sources, wherein the media agent executes on a computing device comprising one or more hardware processors; and by the media agent, generating one or more secondary copies based on the first data and storing the one or more secondary copies in one or more persistent data storage resources. The above-recited embodiment, wherein each second data agent is deployed as a containerized application in a respective pod that further comprises a media agent deployed as a containerized application; and further comprising: by each second data agent during the storage operation, transmitting to the media agent within the respective pod, first data obtained from one of the one or more data sources; and by each media agent, generating one or more secondary copies, based on the first data, and storing the one or more secondary copies in one or more persistent data storage resources. The above-recited embodiment, further comprising: before initiating the storage operation, pre-configuring by the storage manager a plurality of client entities, wherein each client entity is administered at the storage manager without having a corresponding connection to a deployed data agent, and wherein each client entity is assigned a unique client identifier; by each second data agent, requesting a client identifier from the storage manager to register as a client with the storage manager; by the storage manager, assigning to each requesting second data agent a unique client identifier from the plurality of client entities that were pre-configured; and after the pods comprising the second data agents are deactivated, de-registering each second data agent, wherein the storage manager re-uses the pre-configured plurality of client entities in subsequent storage operations. The above-recited embodiment, further comprising: by the storage manager, initiating an other storage operation of second data sources within the plurality of data sources; by the first data agent, determining a second number of second data agents needed for the other storage operation; and wherein the second number differs from the first number, based on a difference in data source presented by the second data sources as compared to the one or more data sources. The above-recited embodiment, further comprising: by the first data agent, accessing the application suite via an application programming interface. The above-recited embodiment, wherein the first data agent distributes at least one task of the storage operation to itself. The above-recited embodiment, further comprising: by the storage manager, administratively enabling automatic scaling for the application orchestrator computing environment; and by the first data agent, based on automatic scaling being enabled for the application orchestrator computing environment, determining the first number of second data agents needed for the storage operation. The above-recited embodiment, further comprising: by the storage manager, administratively enabling automatic scaling for the application suite; and by the first data agent, based on automatic scaling being enabled for the application suite, determining the first number of second data agents needed for the storage operation.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. section 112(f) (AIA), other aspects may likewise be embodied as a means-plus-function claim, or in other forms, such as being embodied in a computer-readable medium. Any claims intended to be treated under 35 U.S.C. section 112(f) will begin with the words "means for," but use of the term "for" in any other context is not intended to invoke treatment under 35 U.S.C. section 112(f). Accordingly, the applicant reserves the right to pursue additional claims after filing this application, in either this application or in a continuing application.

What is claimed is:

1. A method implemented on one or more computing devices that comprise one or more hardware processors, the method comprising:
    deploying a first data agent as a containerized application within a first application orchestrator computing environment;
    by a storage manager, initiating a storage operation for one or more data sources of a second application orchestrator computing environment, which is distinct from the first application orchestrator computing environment, wherein the initiating comprises notifying the first data agent of the storage operation, and
    wherein the storage manager executes on a computing device comprising one or more hardware processors, wherein the computing device operates outside the first application orchestrator computing environment;
    by the first data agent, causing a first number of second data agents to be deployed in the first application orchestrator computing environment, in addition to the first data agent, wherein each second data agent is deployed as a containerized application in a respective pod within the first application orchestrator computing environment;
    by the first data agent, distributing tasks of the storage operation among the first number of second data agents; and
    by the first data agent, after the storage operation completes, causing each pod that comprises a second data agent to be deactivated, wherein the first data agent continues to operate within the first application orchestrator computing environment.

2. The method of claim 1, wherein the storage operation generates one or more secondary copies of the one or more data sources, and wherein the storage operation stores the one or more secondary copies into data storage resources, which are configured in one or more of: inside the first application orchestrator computing environment, and outside the first application orchestrator computing environment.

3. The method of claim 1, wherein the first application orchestrator computing environment is configured as a first Kubernetes cluster, wherein the second application orchestrator computing environment is configured as a second Kubernetes cluster distinct from the first Kubernetes cluster, wherein the storage operation generates one or more secondary copies of the one or more data sources, and wherein the storage operation stores the one or more secondary copies into data storage resources, which are configured in one or more of: inside the first Kubernetes cluster and outside the first Kubernetes cluster.

4. The method of claim 1, wherein the first number of second data agents needed for the storage operation is based on one or more of: (i) a number of applications among the one or more data sources, (ii) a total amount of data in the one or more data sources, (iii) a data throughput rate between a deployed second data agent and a media agent that stores secondary copies, generated by the storage operation, into data storage resources, (iv) a number of data streams administered to operate between a deployed second data agent and a media agent that stores secondary copies, generated by the storage operation, into data storage resources, (v) a recovery point objective, expressed as a duration of time, for the one or more data sources, (vi) an amount of random access memory (RAM) configured at the first data agent, (vii) an amount of computing resources (CPU) configured at the first data agent, and (viii) a pre-configured maximum value for the first number of second data agents.

5. The method of claim 1, wherein the first application orchestrator computing environment and the second application orchestrator computing environment operate in a cloud computing environment.

6. The method of claim 1, wherein at least one of the first application orchestrator computing environment and the second application orchestrator computing environment operates in a non-cloud data center.

7. The method of claim 1 further comprising:
    by each second data agent during the storage operation, transmitting to a media agent, via one or more data streams, first data obtained from one of the one or more data sources, wherein the media agent executes on a computing device comprising one or more hardware processors; and
    by the media agent, generating one or more secondary copies that are based on the first data, and storing the one or more secondary copies in one or more data storage resources.

8. The method of claim 1, wherein each second data agent is deployed as a containerized application in a respective pod that further comprises a media agent, which is deployed as a containerized application; and further comprising:
    by each second data agent during the storage operation, transmitting to the media agent within the respective pod, first data obtained from one of the one or more data sources; and
    by each media agent, generating one or more secondary copies that are based on the first data received from the second data agent in the respective pod, and storing the one or more secondary copies in one or more data storage resources.

9. The method of claim 1, further comprising:
    before initiating the storage operation, pre-configuring by the storage manager, a plurality of client entities, wherein each client entity among the plurality of client entities is administered at the storage manager and is assigned a unique client identifier, without having a corresponding connection to a deployed data agent;

by each second data agent deployed in the first application orchestrator computing environment, requesting a client identifier from the storage manager to register as a client with the storage manager;

by the storage manager, assigning to each requesting second data agent a unique client identifier from the plurality of client entities that were pre-configured; and after each pod comprising a respective second data agents is deactivated, de-registering, by the storage manager, the respective second data agent;

by the storage manager, after the de-registering, re-using in subsequent storage operations at least one client entity among the pre-configured plurality of client entities.

10. The method of claim 1 further comprising:

by the storage manager, initiating an other storage operation of second data sources of the second application orchestrator computing environment;

by the first data agent, determining a second number of second data agents needed for the other storage operation; and wherein the second number differs from the first number, based on a difference between the second data sources and the one or more data sources.

11. A method implemented on one or more computing devices comprising one or more hardware processors, the method comprising:

deploying a pod within an application orchestrator computing environment, wherein the pod comprises a first data agent operating as a containerized application, and wherein the first data agent is communicatively coupled to an application suite that operates in a computing environment that is distinct from the application orchestrator computing environment;

by the first data agent, receiving from a storage manager, instructions to perform a storage operation for one or more first data sources of the application suite, wherein the storage manager executes on a computing device comprising one or more hardware processors, wherein the computing device operates outside the first application orchestrator computing environment;

by the first data agent, causing a first number of second data agents to be deployed in the first application orchestrator computing environment, in addition to the first data agent, wherein each second data agent among the first number of second data agents is deployed as a containerized application in a respective pod within the first application orchestrator computing environment;

by the first data agent, distributing tasks of the storage operation among the first number of second data agents; and by the first data agent, after the storage operation completes, causing each pod that comprises a second data agent to be deactivated, wherein the first data agent continues to operate within the first application orchestrator computing environment.

12. The method of claim 11, wherein the application suite comprises a database-as-a-service deployed in a cloud computing environment.

13. The method of claim 11, wherein the application suite comprises an office productivity suite deployed in a cloud computing environment.

14. The method of claim 11, wherein the application suite comprises a virtual machine farm deployed in a non-cloud data center.

15. The method of claim 11, wherein the application suite comprises an executable application deployed in one of: a cloud computing environment, and a non-cloud data center.

16. The method of claim 11, wherein the storage operation generates one or more secondary copies of the one or more data sources, and wherein the storage operation stores the one or more secondary copies into data storage resources, which are configured in one or more of: inside the first application orchestrator computing environment, outside the first application orchestrator computing environment, inside the computing environment of the application suite, and outside the computing environment of the application suite.

17. The method of claim 11, wherein the first application orchestrator computing environment is configured as a first Kubernetes cluster, wherein the storage operation generates one or more secondary copies of the one or more data sources, and wherein the storage operation stores the one or more secondary copies into data storage resources, which are configured in one or more of: inside the first Kubernetes cluster, outside the first Kubernetes cluster, inside the computing environment of the application suite, and outside the computing environment of the application suite.

18. The method of claim 11, further comprising:

determining the first number of second data agents needed for the storage operation; and causing the first number of second data agents to perform tasks of the storage operation;

wherein the first data agent distributes none of the tasks of the storage operation to itself.

19. The method of claim 11, wherein the first data agent distributes at least one task of the storage operation to itself.

20. The method of claim 11, wherein one or more of: the first application orchestrator computing environment and the application suite operates in a cloud computing environment; and wherein the storage manager operates in one of: the cloud computing environment, and outside the cloud computing environment.

* * * * *